United States Patent
Oladeji

(10) Patent No.: US 11,842,849 B2
(45) Date of Patent: Dec. 12, 2023

(54) ENERGY STORAGE DEVICE AND METHOD OF MAKING

(71) Applicant: Capacitech Energy Inc., Orlando, FL (US)

(72) Inventor: Isaiah Oladeji, Gotha, FL (US)

(73) Assignee: Capacitech Energy, Inc., Orlando, FL (US)

( * ) Notice: Subject to any disclaimer, the term of this patent is extended or adjusted under 35 U.S.C. 154(b) by 267 days.

(21) Appl. No.: 17/242,227

(22) Filed: Apr. 27, 2021

(65) Prior Publication Data

US 2021/0335555 A1 Oct. 28, 2021

Related U.S. Application Data

(60) Provisional application No. 63/101,358, filed on Apr. 27, 2020.

(51) Int. Cl.
| | |
|---|---|
| *H01G 11/08* | (2013.01) |
| *H01G 11/52* | (2013.01) |
| *H01G 11/24* | (2013.01) |
| *H01G 11/86* | (2013.01) |
| *H01G 11/46* | (2013.01) |
| *H01G 11/32* | (2013.01) |
| *H01G 11/74* | (2013.01) |
| *H01G 11/26* | (2013.01) |

(52) U.S. Cl.
CPC ............ *H01G 11/08* (2013.01); *H01G 11/24* (2013.01); *H01G 11/26* (2013.01); *H01G 11/32* (2013.01); *H01G 11/46* (2013.01); *H01G 11/52* (2013.01); *H01G 11/74* (2013.01); *H01G 11/86* (2013.01)

(58) Field of Classification Search
CPC ........ H01G 11/08; H01G 11/24; H01G 11/26; H01G 11/32; H01G 11/46; H01G 11/52; H01G 11/74; H01G 11/86
USPC .................................................. 361/502, 503
See application file for complete search history.

(56) References Cited

U.S. PATENT DOCUMENTS

| | | | |
|---|---|---|---|
| 8,993,172 B2 | 3/2015 | Upadhyaya | |
| 9,620,298 B2 | 4/2017 | Thomas et al. | |
| 2006/0166810 A1 | 7/2006 | Gunderman et al. | |
| 2011/0216476 A1 | 9/2011 | Fleischer et al. | |
| 2011/0235241 A1 | 9/2011 | Park et al. | |
| 2012/0009331 A1 | 1/2012 | Kwon et al. | |
| 2012/0100408 A1 | 4/2012 | Kwon et al. | |
| 2014/0160628 A1 | 6/2014 | Doyle et al. | |
| 2015/0162140 A1 | 6/2015 | Hucker et al. | |
| 2018/0061586 A1* | 3/2018 | Ha .......................... | G01J 1/429 |
| 2018/0233297 A1 | 8/2018 | Zhamu et al. | |
| 2018/0374659 A1* | 12/2018 | Kim ...................... | H01G 11/40 |

FOREIGN PATENT DOCUMENTS

CN 108831762 A 11/2018

* cited by examiner

*Primary Examiner* — Arun Ramaswamy
(74) *Attorney, Agent, or Firm* — Robert J. Lauf

(57) ABSTRACT

A coaxial supercapacitor and method of manufacture such that the supercapacitor has an elongated shape resembling that of a wire and which can be bent to a desired shape and which can optionally be used in place of a wire for a given application while providing the benefits and characteristics of a supercapacitor. The supercapacitor can be manufactured without the necessity of complex manufacturing techniques.

21 Claims, 45 Drawing Sheets

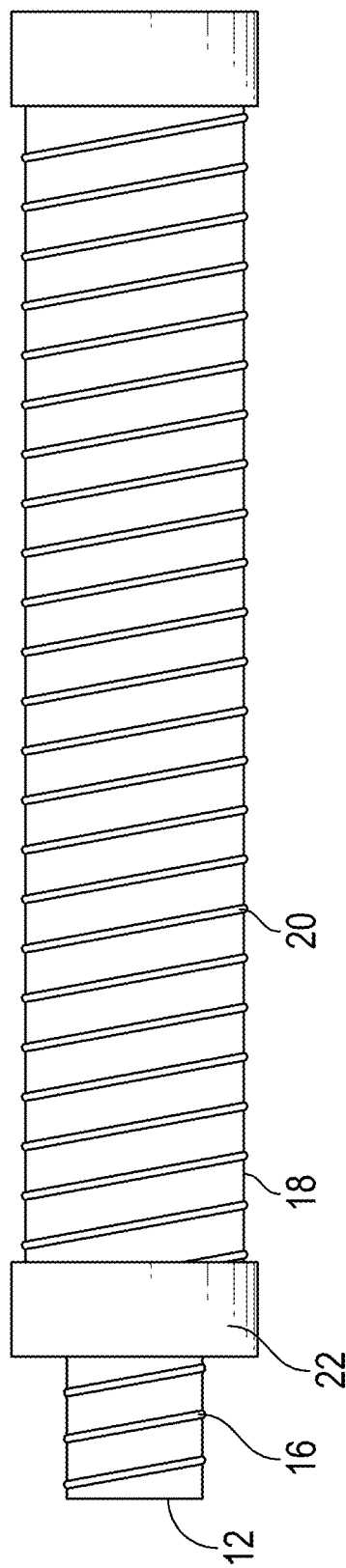
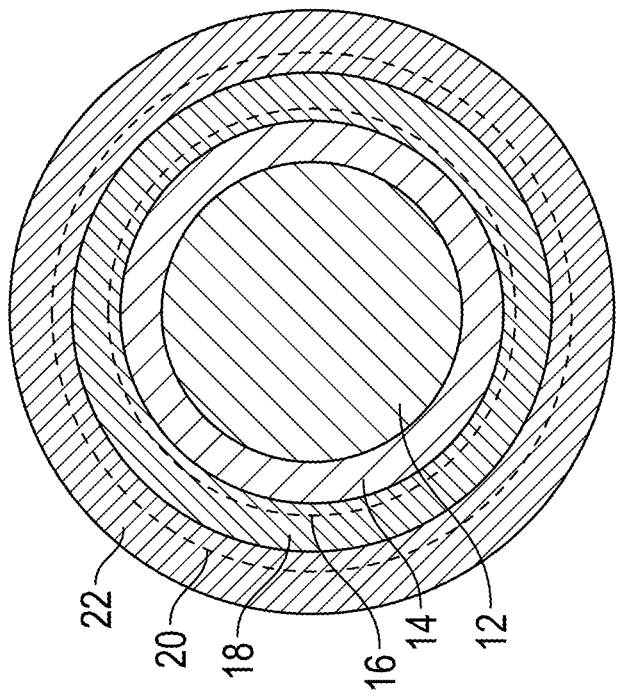
FIG. 7A
FIG. 7B

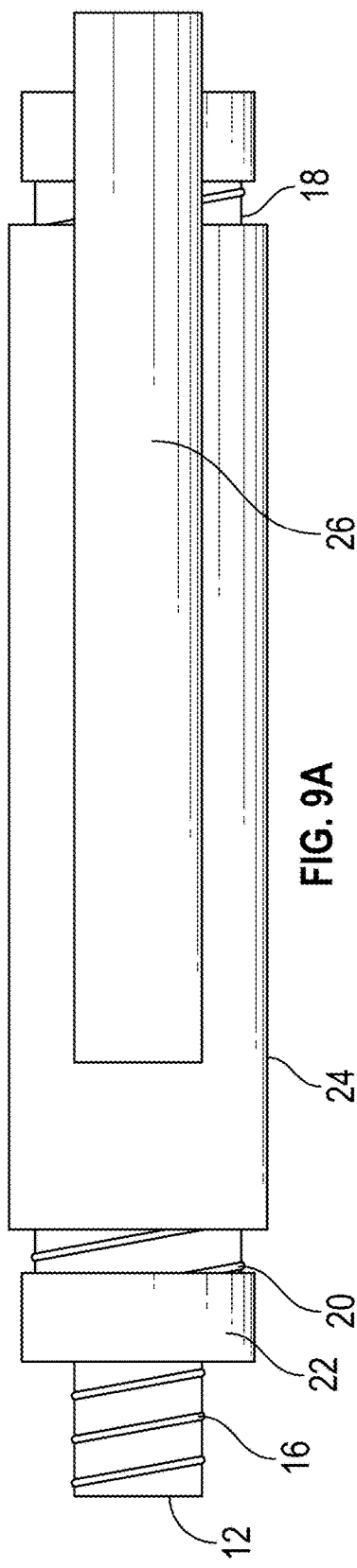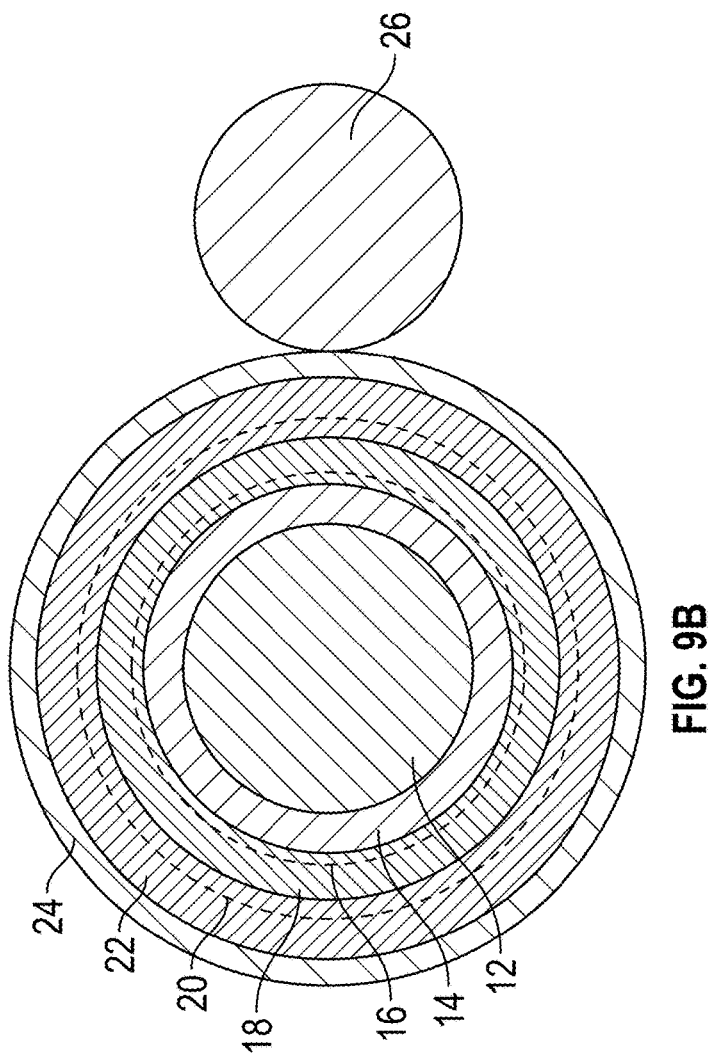

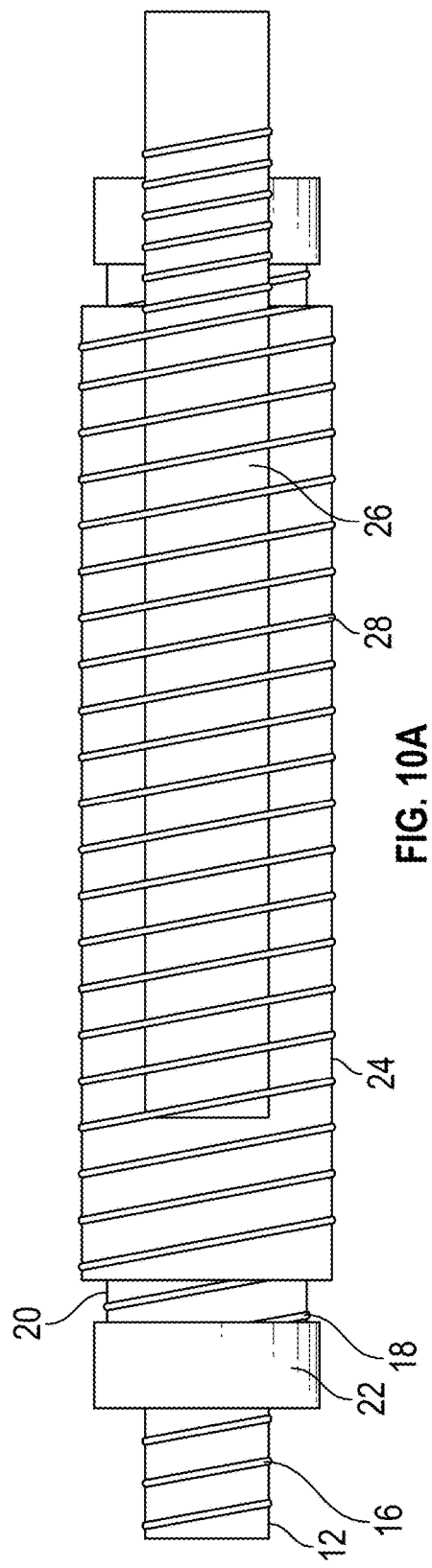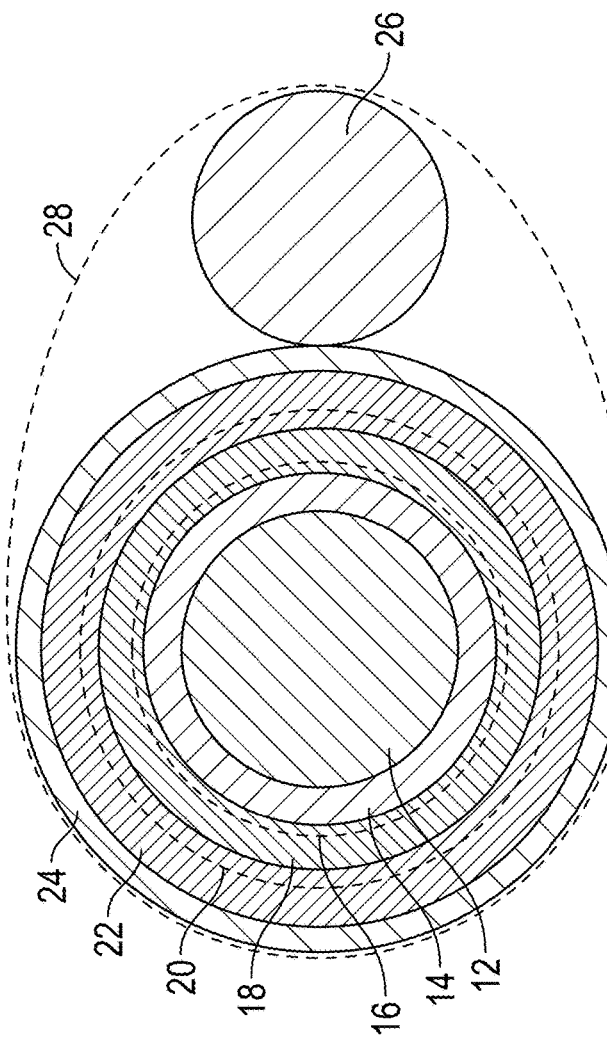
FIG. 10A
FIG. 10B

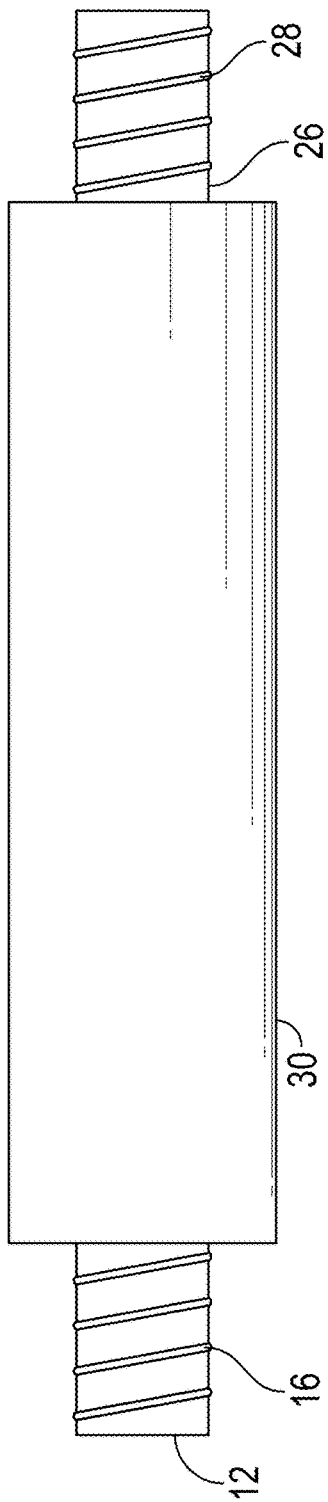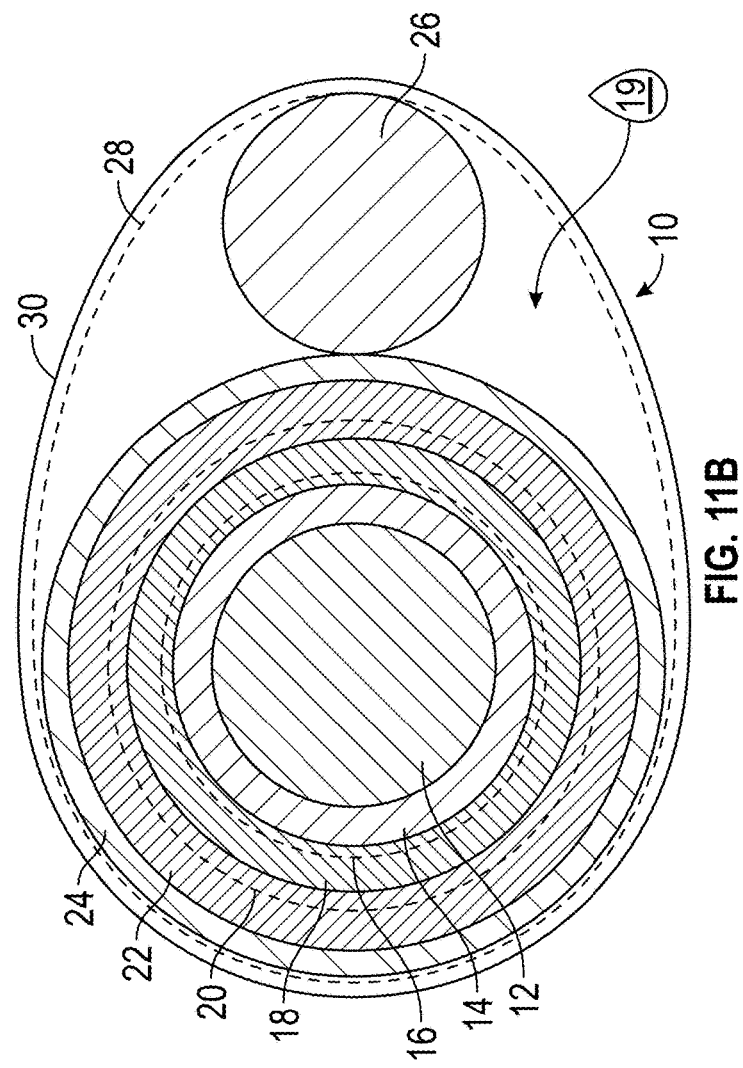

| Ample ID | Capacitor Length (cm) | ESR (Ohm) | Capacitance @10mA (mF) | Linear Capacitance (mF/cm) |
|---|---|---|---|---|
| CBC 725 A | 1 | 4 | 181 | 181 |
| CBC 725 B | 2 | 2.1 | 487.5 | 244 |
| CBC 725 C | 3 | 1.3 | 606.3 | 202 |
| CBC 725 D | 4 | 1.1 | 775 | 194 |
| CBC 606 C | 5 | 0.4 | 1130 | 226 |
| CBC 516 B | 10 | 0.16 | 2710 | 271 |

FIG. 19

| CBC No. | Capacitor Length (cm) | ESR (Ω) | Voltage (V) | Capacitance at 10 mA (mF) | Linear Capacitance (mF/cm) |
|---|---|---|---|---|---|
| 712-A | 1 | 3.3 | 1.6 | 237.5 | 237.5 |
| 712-B | 1 | 3.3 | 1.6 | 237.5 | 237.5 |
| 712-C | 1 | 4.6 | 1.6 | 156.25 | 156.25 |
| 712-D | 1 | 4.6 | 1.6 | 206.25 | 206.25 |
| 725-A | 1 | 4 | 1.6 | 181 | 181 |
| 725-B | 2 | 2.1 | 1.6 | 487.5 | 243.75 |
| 725-C | 3 | 1.3 | 1.6 | 606.25 | 202.08 |
| 725-D | 4 | 1.1 | 1.6 | 775 | 193.75 |
| 430-A | 5 | 0.37 | 1.6 | 1125 | 225 |
| 430-B | 5 | 0.51 | 1.6 | 1006 | 201.2 |
| 503-A | 5 | 0.28 | 1.6 | 1406 | 281.25 |
| 503-B | 5 | 0.38 | 1.6 | 1150 | 230 |
| 508-A | 5 | 3.33 | 1.6 | 2020 | 404 |
| 508-B | 5 | 1.83 | 1.6 | 1894 | 378.75 |
| 508-C | 5 | 0.65 | 1.6 | 1100 | 220 |
| 508-D | 5 | 0.54 | 1.6 | 1075 | 215 |
| 517-A | 5 | 0.45 | 1.6 | 990 | 198 |
| 517-B | 5 | 0.43 | 1.6 | 1390 | 278 |

FIG. 20

| | | | | | |
|---|---|---|---|---|---|
| 606-A | 5 | 0.42 | 1.6 | 1250 | 250 |
| 606-B | 5 | 0.52 | 1.6 | 1130 | 226 |
| 606-C | 5 | 0.36 | 1.6 | 1130 | 226 |
| 606-D | 5 | 0.54 | 1.6 | 995 | 199 |
| 801-A | 5 | 0.54 | 1.6 | 1140 | 228 |
| 801-B | 5 | 0.9 | 1.6 | 1110 | 222.2 |
| 801-A* | 5 | 0.54 | 3 | 2450 | 490 |
| 801-B* | 5 | 0.9 | 3 | 2260 | 452 |
| 808-C* | 5 | 1.1 | 2.2 | 2395.45 | 479.1 |
| 808-D* | 5 | 1.1 | 2.2 | 1886.36 | 377.27 |
| 516-A | 10 | 0.16 | 1.6 | 2700 | 270 |
| 516-B | 10 | 0.16 | 1.6 | 3575 | 357.5 |
| 516-C | 10 | 0.19 | 1.6 | 2731 | 273.1 |
| 516-D | 10 | 0.2 | 1.6 | 2418 | 483.75 |
| 614-A | 10 | 0.31 | 1.6 | 2143.7 | 214.37 |
| 614-B | 10 | 0.31 | 1.6 | 1675 | 167.5 |
| 621-A | 10 | 0.25 | 1.6 | 2406.3 | 240.63 |
| 621-B | 10 | 0.25 | 1.6 | 2131.3 | 213.13 |
| 719-A | 10 | 0.355 | 1.6 | 2543 | 254.3 |
| 719-B | 10 | 0.4 | 1.6 | 2956 | 295.6 |

FIG. 20 (Continued)

| CBC IN SERIES | Single Capacitor Length (cm) | Number in Series | Voltage (V) | Connection | ESR(Ω) | Capacitance @10mA (mF) |
|---|---|---|---|---|---|---|
| CBC 5607 | 0.7 | 2 | 3.2 | IN-SITU | 6.7 | 80 |
| CBC 628-A | 1 | 2 | 3.2 | IN-SITU | 5.1 | 84 |
| CBC 712-A and B | 1 | 2 | 3.2 | EX-SITU | 7.5 | |
| CBC 503-A and B | 5 | 2 | 3.2 | EX-SITU | 2.3 | 609 |
| CBC 606-C and D | 5 | 2 | 3.2 | EX-SITU | 1.2 | |
| CBC 628-B | 5 | 2 | 3.2 | IN-SITU | 1.05 | 678 |
| CBC 705-A | 5 | 4 | 6.4 | IN-SITU | 2.5 | 309 |
| CBC 705-B | 5 | 4 | 6.4 | IN-SITU | 3.3 | 317 |

FIG. 26

ENERGY STORAGE DEVICE AND METHOD OF MAKING

CROSS-REFERENCE TO RELATED APPLICATIONS

This application claims priority to and the benefit of the filing of U.S. Provisional Patent Application No. 63/101,358, entitled "ENERGY STORAGE DEVICE AND METHOD OF MAKING", filed on Apr. 27, 2020, and the specification thereof incorporated herein by reference.

BACKGROUND OF THE INVENTION

Embodiments of the present invention relate to an apparatus and method for energy storage, and more particularly to supercapacitors and a method for manufacturing them.

A supercapacitor, also called an ultracapacitor and/or an electric double layer capacitor, is a high-capacity capacitor with a capacitance value much higher than other capacitors, but with lower voltage limits, that bridges the gap between electrolytic capacitors and rechargeable batteries. They typically store 10 to 100 times more energy per unit volume or mass than electrolytic capacitors, can accept and deliver charge much faster than batteries, and tolerate many more charge and discharge cycles than rechargeable batteries. Supercapacitors are used in a variety of different applications requiring many rapid charge/discharge cycles and power bursts, rather than long term compact energy storage—such as in renewable energy systems, automobiles, buses, trains, cranes and elevators, where they are used for regenerative braking, short-term energy storage, or burst-mode power delivery. Smaller units are used as power backup for static random-access memory ("SRAM").

Unlike ordinary capacitors, supercapacitors do not use the conventional solid dielectric, but rather, they use electrostatic double-layer capacitance and electrochemical pseudocapacitance, both of which contribute to the total capacitance of the supercapacitor, with a few differences:

1. Electrostatic double-layer supercapacitors ("EDLCs") use carbon electrodes or derivatives with much higher electrostatic double-layer capacitance than electrochemical pseudocapacitance, achieving separation of charge in a Helmholtz double layer at the interface between the surface of a conductive electrode and an electrolyte. The separation of charge is of the order of a few angstroms ("Å") (0.3-0.8 nm), much smaller than in a conventional capacitor.
2. Electrochemical pseudocapacitors use metal oxide or conducting polymer electrodes with a high amount of electrochemical pseudocapacitance additional to the double-layer capacitance. Pseudocapacitance is achieved by Faradaic electron charge-transfer with redox reactions, intercalation or electrosorption.
3. Hybrid capacitors, such as the lithium-ion capacitor, use electrodes with differing characteristics: one exhibiting mostly electrostatic capacitance and the other mostly electrochemical capacitance.

The electrolyte forms an ionic conductive connection between the two electrodes which distinguishes them from conventional electrolytic capacitors where a dielectric layer always exists and the so-called electrolyte, e.g., $MnO_2$ or conducting polymer, is in fact part of the second electrode (the cathode, or more correctly the positive electrode). Supercapacitors are polarized by design with asymmetric electrodes, or, for symmetric electrodes, by a potential applied during manufacture.

Most capacitors are in planar form. And in many other cases the capacitors are made as a sandwich of electrode materials deposited on metallic foils and a separator, that is jelly-rolled and encased in a metallic can. These must be mounted in a circuit board to be used. With advances in technology, many applications will be better served by mounting the capacitors off the circuit board. Some attempts are therefore being made to create energy storage devices in a cable form.

disclosure also proposes using separate anode material coated wire, and cathode material coated wire, with polymer separator between them, and liquid electrolyte to form the battery.

Prior approaches in the fabrication of cable-shaped energy storage devices, employ deposition and integration schemes that are expensive, and potentially difficult to scale and manufacture. What is needed, therefore, is improved and manufacturable approach in the fabrication of cable shaped energy storage devices. And, most importantly, supercapacitors with new form factors, such as coaxial designs, as well as supercapacitors having the capability to operate while retaining their characteristically high capacitance and a low equivalent series resistance.

BRIEF SUMMARY OF EMBODIMENTS OF THE PRESENT INVENTION

Embodiments of the present invention relate to a cable supercapacitor that includes a first terminal, a first electrode disposed around the first terminal, a second electrode at least partially surrounding the first electrode, a separator disposed between the first electrode and the second electrode, a second terminal in electrical contact with the second electrode, the second terminal extending away from the first terminal such that the cable supercapacitor comprises an elongated cable-like structure with the first terminal at a first end thereof and with the second terminal at an opposing end thereof, and a first conductive filament, the conductive filament wrapped around at least one of the first terminal, the first electrode and/or the second electrode. The separator can include a flexible solid-state electrolyte and/or a non-conductive porous material with a liquid or gel electrolyte disposed therein. The non-conductive porous material can include comprises a fabric and/or an absorbent material.

In one embodiment, the cable supercapacitor can also include a second conductive filament. Optionally, the first conductive filament can be wrapped around the first electrode and the second conductive filament can be wrapped around the second electrode such that the second conductive filament lashes the second terminal to the second electrode. The first conductive filament and the second conductive filament can be formed from the same material. The cable supercapacitor can also include a non-conductive filament wrapped around the separator. In one embodiment, at least one of the first electrode or the second electrode includes a dry electrode material which can include an impregnated foam. Optionally, the dry foam material can include a dry electrode material having an impregnated metal foam. The first electrode or the second electrode can include a dry foam having a metal oxide material and the other of the first electrode or the second electrode can include a dry foam having activated carbon. The second terminal can be wrapped around the second electrode.

Embodiments of the present invention also relate to a method for manufacturing a cable supercapacitor, the method including disposing a first electrode around a first terminal, securing the first electrode to the first terminal by wrapping a first conductive filament around the first electrode, disposing a separator around the first electrode, disposing a second electrode around the separator, and placing a second terminal in electrical contact with the second electrode. Optionally, disposing a separator around the first electrode can include disposing a dry electrolyte around the first electrode. The method can also include saturating the separator with a liquid or gel electrolyte.

In one embodiment, placing a second terminal in electrical contact with the second electrode can include lashing the second terminal to the second electrode with a second conductive filament. Disposing a first electrode around a first terminal can include wrapping a dry foam around the first terminal. Disposing a second electrode around the separator can include wrapping a dry foam around the separator. The method can also include wrapping a non-conductive filament around the separator. Placing the second terminal in electrical contact with the second electrode can include wrapping the second terminal around the second electrode.

Embodiments of the present invention provide a supercapacitor that is mechanically flexible, in a coaxial form factor that does not require complex manufacturing techniques. Embodiments of the present invention can also provide a method of manufacture and a resulting supercapacitor that can be integrated into a power cable. Non-limiting embodiments of uses for the supercapacitor are also disclosed. These and other objects and advantages of the invention will become apparent from consideration of the following specification, read in conjunction with the drawings.

In one embodiment, a coaxial supercapacitor comprises a generally cylindrical assembly having a center conductor, a first electrode wrapped around the center conductor, a separator wrapped around the first electrode, a second electrode wrapped around the separator, an outer conductor wrapped around the second electrode, a liquid electrolyte, and a sealed enclosure surrounding the second electrode, with a portion of the center conductor extending from one end thereof and a portion of the outer conductor extending from the opposite end thereof.

In one embodiment, the present invention relates to a method for making a supercapacitor that includes the steps of forming a central conductor from wire of a selected length, wrapping a first electrode around the central conductor, securing the first electrode to the central conductor by overwinding with a first filament of a selected material, wrapping a separator around the first electrode, securing the separator to the first electrode by overwinding with a second filament of a selected material, wrapping a second electrode around the separator, wrapping an outer conductor around the second electrode, adding a liquid electrolyte, and surrounding the second electrode with a sealed enclosure, with a portion of the central conductor extending from one end thereof and a portion of the outer conductor extending from the opposite end thereof.

Embodiments of the present invention provide a supercapacitor that is mechanically flexible, in a coaxial form factor that does not require complex manufacturing techniques. Embodiments of the present invention can also provide a method of manufacture and a resulting supercapacitor that can be integrated into a power cable. Non-limiting embodiments of uses for the supercapacitor are also disclosed. These and other objects and advantages of the invention will become apparent from consideration of the following specification, read in conjunction with the drawings.

In one embodiment, a supercapacitor according to an embodiment of the present invention comprises a generally cylindrical assembly having a center conductor, a first electrode wrapped around the center conductor, a separator wrapped around the first electrode, a second electrode wrapped around the separator, an outer conductor wrapped around the second electrode, a liquid electrolyte, and a sealed enclosure surrounding the second electrode, with a portion of the center conductor extending from one end thereof and a portion of the outer conductor extending from the opposite end thereof.

In one embodiment, the present invention relates to a method for making a supercapacitor that includes the steps of forming a central conductor from wire of a selected length, wrapping a first electrode around the central conductor, securing the first electrode to the central conductor by overwinding with a first filament of a selected material, wrapping a separator around the first electrode, securing the separator to the first electrode by overwinding with a second filament of a selected material, wrapping a second electrode around the separator, wrapping an outer conductor around the second electrode, adding a liquid electrolyte, and surrounding the second electrode with a sealed enclosure, with a portion of the central conductor extending from one end thereof and a portion of the outer conductor extending from the opposite end thereof.

Embodiments of the present invention also relate to a method to power one or more automotive systems that includes disposing a cable-shaped supercapacitor within a portion of an automobile, the cable-shaped supercapacitor having a conductive filament, the conductive filament wrapped around one or more of a first terminal, a first electrode and/or a second electrode, and electrically connecting the cable-shaped supercapacitor to one or more circuits of the one or more automotive systems. The one or more automotive systems can include a regenerative breaking system and/or a primary motive power system for an electric vehicle.

Embodiments of the present invention also relate to a method to power one or more automotive accessories that includes disposing a cable-shaped supercapacitor within a portion of an automobile, the cable-shaped supercapacitor comprising a conductive filament, the conductive filament wrapped around one or more of a first terminal, a first electrode and/or a second electrode, and electrically connecting the cable-shaped supercapacitor to one or more circuits of the one or more automotive accessories. The one or more automotive accessories can include one or more heating elements and/or one or more displays. Disposing a cable-shaped supercapacitor within a portion of an automobile can include disposing a cable-shaped supercapacitor within a steering wheel of the automobile, within a seat of the automobile, and/or within upholstery of the automobile.

Embodiments of the present invention also relate to a method to power automotive infrastructure that includes disposing a cable-shaped supercapacitor within glass panels, the cable-shaped supercapacitor having a conductive filament, the conductive filament wrapped around one or more of a first terminal, a first electrode and/or a second electrode, and electrically connecting the cable-shaped supercapacitor to one or more circuits to provide automotive power.

Embodiments of the present invention also relate to a method to power automotive infrastructure that includes disposing a cable-shaped supercapacitor within support beams, the cable-shaped supercapacitor having a conductive filament, the conductive filament wrapped around one or more of a first terminal, a first electrode and/or a second electrode, and electrically connecting the cable-shaped supercapacitor to one or more circuits to provide automotive power.

Embodiments of the present invention also relate to a method to power automotive infrastructure that includes disposing a cable-shaped supercapacitor within an automobile chassis, the cable-shaped supercapacitor having a conductive filament, the conductive filament wrapped around one or more of a first terminal, a first electrode and/or a second electrode, and electrically connecting the cable-shaped supercapacitor to one or more circuits to provide automotive power.

Embodiments of the present invention also relate to a method to store energy on a bullet train that includes disposing a cable-shaped supercapacitor in a bullet train, the cable-shaped supercapacitor having a conductive filament, the conductive filament wrapped around one or more of a first terminal, a first electrode and/or a second electrode, and electrically connecting the cable-shaped supercapacitor to one or more circuits of the bullet train to store energy in the cable-shaped supercapacitor. Optionally, electrically connecting the cable-shaped supercapacitor can include electrically connecting the cable-shaped supercapacitor to one or more circuits of a regenerative braking system, electrically connecting the cable-shaped supercapacitor to one or more circuits of a magnetic levitation system, electrically connecting the cable-shaped supercapacitor to one or more circuits of an infotainment system, and/or electrically connecting the cable-shaped supercapacitor to one or more circuits of an communications system.

Embodiments of the present invention also relate to a method to store energy on an aircraft that includes disposing a cable-shaped supercapacitor in the aircraft, the cable-shaped supercapacitor having a conductive filament, the conductive filament wrapped around one or more of a first terminal, a first electrode and/or a second electrode, and electrically connecting the cable-shaped supercapacitor to one or more circuits of the aircraft to store energy in the cable-shaped supercapacitor.

Optionally, electrically connecting the cable-shaped supercapacitor can include electrically connecting the cable-shaped supercapacitor to one or more circuits of a fuel-burning aircraft or to one or more circuits of an electrically-powered aircraft. The electrically-powered aircraft can include a manned aircraft and/or an unmanned aircraft.

Embodiments of the present invention also relate to a method to store energy on an electric scooter that includes imbedding a cable-shaped supercapacitor within a portion of the scooter, the cable-shaped supercapacitor having a conductive filament, the conductive filament wrapped around one or more of a first terminal, a first electrode and/or a second electrode, and electrically connecting the cable-shaped supercapacitor to one or more circuits of the scooter to store energy in the cable-shaped supercapacitor. Electrically connecting the cable-shaped supercapacitor can include electrically connecting the cable-shaped supercapacitor to a regenerative breaking system of the electric scooter and/or electrically connecting the cable-shaped supercapacitor to a primary power source of the electric scooter.

Embodiments of the present invention also relate to a method to store energy on an electric bike that includes imbedding a cable-shaped supercapacitor within a portion of the electric bike, the cable-shaped supercapacitor having a conductive filament, the conductive filament wrapped around one or more of a first terminal, a first electrode and/or a second electrode, and electrically connecting the cable-shaped supercapacitor to one or more circuits of the electric bike to store energy in the cable-shaped supercapacitor. The step of imbedding the cable-shaped supercapacitor within a portion of the electric bike can include imbedding the cable-shaped supercapacitor within a frame of the electric bike. Optionally, the electric bike can include an electric motorcycle and/or a pedal-assist electric bike. Electrically connecting the cable-shaped supercapacitor to one or more circuits of the electric bike can include electrically connecting the cable-shaped supercapacitor to a wiring harness of the electric bike.

Embodiments of the present invention also relate to a method to store energy within a pair of jumper cables that includes imbedding a cable-shaped supercapacitor within a portion of the jumper cables, the cable-shaped supercapacitor having a conductive filament, the conductive filament wrapped around one or more of a first terminal, a first electrode and/or a second electrode, and electrically connecting the cable-shaped supercapacitor between the jumper cables.

Embodiments of the present invention also relate to a method to store energy within a wearable device that includes imbedding a cable-shaped supercapacitor within a portion of the wearable device, the cable-shaped supercapacitor having a conductive filament, the conductive filament wrapped around one or more of a first terminal, a first electrode and/or a second electrode, and electrically connecting the cable-shaped supercapacitor to one or more circuits of the wearable device. Optionally, the wearable device can include one or more of footwear, a jacket, pants, a shirt, a harness, animal clothing, an animal collar, a hat, a belt, a necklace, a bracelet, a vest, an exoskeleton, a virtual reality headset, a virtual reality input device, an augmented reality headset, an augmented reality input device, and/or a backpack.

Embodiments of the present invention also relate to a method to store energy within a wearable device that includes wrapping at least a portion of a cable-shaped supercapacitor around a portion of the wearable device, the cable-shaped supercapacitor having a conductive filament, the conductive filament wrapped around one or more of a first terminal, a first electrode and/or a second electrode, and electrically connecting the cable-shaped supercapacitor to one or more circuits of the wearable device. Optionally, the wearable device can include one or more of footwear, a jacket, pants, a shirt, a harness, animal clothing, an animal collar, a hat, a belt, a necklace, a bracelet, a vest, an exoskeleton, a virtual reality headset, a virtual reality input device, an augmented reality headset, an augmented reality input device, and/or a backpack.

Embodiments of the present invention also relate to a method to store energy within a piece of luggage that includes imbedding at least a portion of a cable-shaped supercapacitor within a portion of the luggage, the cable-shaped supercapacitor having a conductive filament, the conductive filament wrapped around one or more of a first terminal, a first electrode and/or a second electrode, and electrically connecting the cable-shaped supercapacitor to one or more circuits of the luggage.

Embodiments of the present invention also relate to a method to store energy within a bag or pack that includes imbedding at least a portion of a cable-shaped supercapacitor within a portion of the bag or pack, the cable-shaped supercapacitor having a conductive filament, the conductive filament wrapped around one or more of a first terminal, a first electrode and/or a second electrode, and electrically connecting the cable-shaped supercapacitor to one or more circuits of the bag or pack. Optionally, the bag or pack can include a purse.

Embodiments of the present invention also relate to a method to store energy within a piece of luggage that includes wrapping at least a portion of a cable-shaped supercapacitor back and forth across a portion of the luggage, the cable-shaped supercapacitor having a conductive filament, the conductive filament wrapped around one or more of a first terminal, a first electrode and/or a second electrode, and electrically connecting the cable-shaped supercapacitor to one or more circuits of the luggage.

Embodiments of the present invention also relate to a method to store energy within a bag or pack that includes wrapping at least a portion of a cable-shaped supercapacitor back and forth across a portion of the bag or pack, the cable-shaped supercapacitor having a conductive filament, the conductive filament wrapped around one or more of a first terminal, a first electrode and/or a second electrode, and electrically connecting the cable-shaped supercapacitor to one or more circuits of the bag or pack. Optionally, the bag or pack can include a purse.

Embodiments of the present invention also relate to a method to store energy within a wearable device that includes disposing at least a portion of a cable-shaped supercapacitor on a portion of the wearable device, the cable-shaped supercapacitor having a conductive filament, the conductive filament wrapped around one or more of a first terminal, a first electrode and/or a second electrode, and electrically connecting the cable-shaped supercapacitor to one or more circuits of the wearable device. Optionally, the wearable device can include one or more of footwear, a jacket, pants, a shirt, a harness, animal clothing, an animal collar, a hat, a belt, a necklace, a bracelet, a vest, an exoskeleton, a virtual reality headset, a virtual reality input device, an augmented reality headset, an augmented reality input device, glasses, and/or a backpack. Disposing at least a portion of the cable-shaped supercapacitor on a portion of the wearable device can include disposing at least a portion of the cable-shaped supercapacitor along an edge of the wearable device and/or wrapping at least a portion of the cable-shaped supercapacitor back and forth across an open area of the wearable device.

Embodiments of the present invention also relate to a method to store harvested energy from a renewable energy source within a cable-shaped supercapacitor that includes providing a cable-shaped supercapacitor which itself has a conductive filament, the conductive filament wrapped around one or more of a first terminal, a first electrode and/or a second electrode, and electrically connecting the cable-shaped supercapacitor to the renewable energy source. The method can further include wrapping the cable-shaped supercapacitor around a portion of a renewable energy generator and/or imbedding the cable-shaped supercapacitor within a portion of a renewable energy generator and/or on or in a structure connected to the renewable energy generator.

Embodiments of the present invention also relate to a method to store energy from an energy storage device within a cable-shaped supercapacitor comprising providing a cable-shaped supercapacitor which itself comprises a conductive filament, the conductive filament wrapped around one or more of a first terminal, a first electrode and/or a second electrode, and electrically connecting the cable-shaped supercapacitor to the energy storage device. Optionally, the energy storage device can include a fuel cell a flywheel and/or one or more batteries. The method can also optionally include wrapping the cable-shaped supercapacitor around at least a portion of the energy storage device.

Embodiments of the present invention also relate to the use of a cable supercapacitor to power one or more automotive systems, the use comprising: disposing a cable-shaped supercapacitor within a portion of an automobile, the cable-shaped supercapacitor comprising a conductive filament, the conductive filament wrapped around one or more of a first terminal, a first electrode and/or a second electrode, and electrically connecting the cable-shaped supercapacitor to one or more circuits of the one or more automotive systems.

Embodiments of the present invention also relate to the use of a cable supercapacitor to power one or more automotive accessories, the use comprising: disposing a cable-shaped supercapacitor within a portion of an automobile, the cable-shaped supercapacitor comprising a conductive filament, the conductive filament wrapped around one or more of a first terminal, a first electrode and/or a second electrode, and electrically connecting the cable-shaped supercapacitor to one or more circuits of the one or more automotive accessories.

Embodiments of the present invention also relate to the use of a cable supercapacitor to power automotive infrastructure, the use comprising: disposing a cable-shaped supercapacitor within glass panels, the cable-shaped supercapacitor comprising a conductive filament, the conductive filament wrapped around one or more of a first terminal, a first electrode and/or a second electrode, and electrically connecting the cable-shaped supercapacitor to one or more circuits to provide automotive power.

Embodiments of the present invention also relate to the use of a cable supercapacitor to power automotive infrastructure, the use comprising: disposing a cable-shaped supercapacitor within support beams, the cable-shaped supercapacitor comprising a conductive filament, the conductive filament wrapped around one or more of a first terminal, a first electrode and/or a second electrode, and electrically connecting the cable-shaped supercapacitor to one or more circuits to provide automotive power.

Embodiments of the present invention also relate to the use of a cable supercapacitor to power automotive infrastructure, the use comprising: disposing a cable-shaped supercapacitor within an automobile chassis, the cable-shaped supercapacitor comprising a conductive filament, the conductive filament wrapped around one or more of a first terminal, a first electrode and/or a second electrode, and electrically connecting the cable-shaped supercapacitor to one or more circuits to provide automotive power.

Embodiments of the present invention also relate to the use of a cable supercapacitor to store energy on a bullet train, the use comprising: disposing a cable-shaped supercapacitor in a bullet train, the cable-shaped supercapacitor comprising a conductive filament, the conductive filament wrapped around one or more of a first terminal, a first electrode and/or a second electrode, and electrically connecting the cable-shaped supercapacitor to one or more circuits of the bullet train to store energy in the cable-shaped supercapacitor.

Embodiments of the present invention also relate to the use of a cable supercapacitor to store energy on an aircraft, the use comprising: disposing a cable-shaped supercapacitor in the aircraft, the cable-shaped supercapacitor comprising a conductive filament, the conductive filament wrapped around one or more of a first terminal, a first electrode and/or a second electrode, and electrically connecting the cable-shaped supercapacitor to one or more circuits of the aircraft to store energy in the cable-shaped supercapacitor.

Embodiments of the present invention also relate to the use of a cable supercapacitor to store energy on an electric scooter, the use comprising: imbedding a cable-shaped supercapacitor within a portion of the scooter, the cable-shaped supercapacitor comprising a conductive filament, the conductive filament wrapped around one or more of a first terminal, a first electrode and/or a second electrode, and electrically connecting the cable-shaped supercapacitor to one or more circuits of the scooter to store energy in the cable-shaped supercapacitor.

Embodiments of the present invention also relate to the use of a cable supercapacitor to store energy on an electric bike, the use comprising: imbedding a cable-shaped supercapacitor within a portion of the electric bike, the cable-shaped supercapacitor comprising a conductive filament, the conductive filament wrapped around one or more of a first terminal, a first electrode and/or a second electrode, and electrically connecting the cable-shaped supercapacitor to one or more circuits of the electric bike to store energy in the cable-shaped supercapacitor.

Embodiments of the present invention also relate to the use of a cable supercapacitor to store energy within a pair of jumper cables, the use comprising: imbedding a cable-shaped supercapacitor within a portion of the jumper cables, the cable-shaped supercapacitor comprising a conductive filament, the conductive filament wrapped around one or more of a first terminal, a first electrode and/or a second electrode, and electrically connecting the cable-shaped supercapacitor between the jumper cables.

Embodiments of the present invention also relate to the use of a cable supercapacitor to store energy within a wearable device, the use comprising: imbedding a cable-shaped supercapacitor within a portion of the wearable device, the cable-shaped supercapacitor comprising a conductive filament, the conductive filament wrapped around one or more of a first terminal, a first electrode and/or a second electrode, and electrically connecting the cable-shaped supercapacitor to one or more circuits of the wearable device.

Embodiments of the present invention also relate to the use of a cable supercapacitor to store energy within a wearable device, the use comprising: wrapping at least a portion of a cable-shaped supercapacitor around a portion of the wearable device, the cable-shaped supercapacitor comprising a conductive filament, the conductive filament wrapped around one or more of a first terminal, a first electrode and/or a second electrode, and electrically connecting the cable-shaped supercapacitor to one or more circuits of the wearable device.

Embodiments of the present invention also relate to the use of a cable supercapacitor to store energy within a piece of luggage, the use comprising: imbedding at least a portion of a cable-shaped supercapacitor within a portion of the luggage, the cable-shaped supercapacitor comprising a conductive filament, the conductive filament wrapped around one or more of a first terminal, a first electrode and/or a second electrode, and electrically connecting the cable-shaped supercapacitor to one or more circuits of the luggage.

Embodiments of the present invention also relate to the use of a cable supercapacitor to store energy within a bag or pack, the use comprising: imbedding at least a portion of a cable-shaped supercapacitor within a portion of the bag or pack, the cable-shaped supercapacitor comprising a conductive filament, the conductive filament wrapped around one or more of a first terminal, a first electrode and/or a second electrode, and electrically connecting the cable-shaped supercapacitor to one or more circuits of the bag or pack.

Embodiments of the present invention also relate to the use of a cable supercapacitor to store energy within a piece of luggage, the use comprising: wrapping at least a portion of a cable-shaped supercapacitor back and forth across a portion of the luggage, the cable-shaped supercapacitor comprising a conductive filament, the conductive filament wrapped around one or more of a first terminal, a first electrode and/or a second electrode, and electrically connecting the cable-shaped supercapacitor to one or more circuits of the luggage.

Embodiments of the present invention also relate to the use of a cable supercapacitor to store energy within a bag or pack, the use comprising: wrapping at least a portion of a cable-shaped supercapacitor back and forth across a portion of the bag or pack, the cable-shaped supercapacitor comprising a conductive filament, the conductive filament wrapped around one or more of a first terminal, a first electrode and/or a second electrode, and electrically connecting the cable-shaped supercapacitor to one or more circuits of the bag or pack.

Embodiments of the present invention also relate to the use of a cable supercapacitor to store energy within a wearable device, the use comprising: disposing at least a portion of a cable-shaped supercapacitor on a portion of the wearable device, the cable-shaped supercapacitor comprising a conductive filament, the conductive filament wrapped around one or more of a first terminal, a first electrode and/or a second electrode, and electrically connecting the cable-shaped supercapacitor to one or more circuits of the wearable device.

Embodiments of the present invention also relate to the use of a cable supercapacitor to store harvested energy from a renewable energy source within a cable-shaped supercapacitor, the use comprising providing a cable-shaped supercapacitor which itself comprises a conductive filament, the conductive filament wrapped around one or more of a first terminal, a first electrode and/or a second electrode, and electrically connecting the cable-shaped supercapacitor to the renewable energy source.

Embodiments of the present invention also relate to the use of a cable supercapacitor to store energy from an energy storage device within a cable-shaped supercapacitor, the use comprising: providing a cable-shaped supercapacitor which itself comprises a conductive filament, the conductive filament wrapped around one or more of a first terminal, a first electrode and/or a second electrode, and electrically connecting the cable-shaped supercapacitor to the energy storage device.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIGS. 7A and 7B respectively illustrate a front perspective view and a cross sectional view of an insulator that has been applied at and around the end portions of the first electrode on the supercapacitor assembly according to an embodiment of the present invention;

FIGS. 9A and 9B respectively illustrate a front perspective view and a cross sectional view wherein a second terminal has been positioned against the second electrode of a supercapacitor according to an embodiment of the present invention;

FIGS. 10A and 10B respectively illustrate a front perspective view and a cross sectional view wherein a second electrode wrap has been disposed around the second electrode and the second terminal of a supercapacitor according to an embodiment of the present invention;

FIGS. 11A and 11B respectively illustrate a front perspective view and a cross sectional view of an enclosure that has been disposed on a supercapacitor according to an embodiment of the present invention;

FIG. 19 is a table that summarizes test results of different lengths of Ni wire/Ni foam/$MnO_2$/Ni foam/Activated carbon supercapacitors, with water based $Na_2SO_4$ electrolyte constructed according to an embodiment of the present invention;

FIG. 20 is a table that summarizes test results of a plurality of single Ni wire/Ni foam/$MnO_2$/Ni foam/Activated carbon supercapacitors with water based $Na_2SO_4$ electrolyte constructed according to an embodiment of the present invention;

FIG. 26 is a table which illustrates test results of cable supercapacitors connected in series according to an embodiment of the present invention;

FIGS. 30A and 30B are drawings which respectively illustrate a chart and an equivalent circuit wherein a supercapacitor is configured to provide backup power to a load when a regular power source fails;

FIGS. 31A and 31B are drawings which respectively illustrate a chart and an equivalent circuit wherein a supercapacitor is used to store energy from variable output power source;

DETAILED DESCRIPTION OF THE INVENTION

Figure 1A:
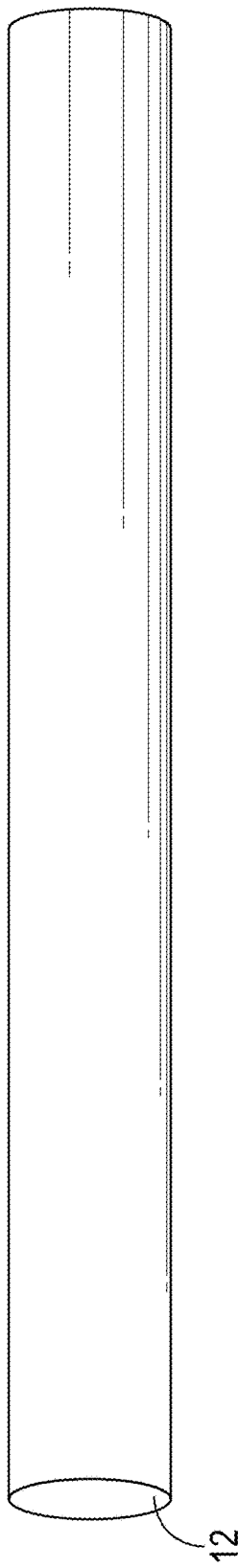
FIGS. 1A and 1B respectively illustrate a front perspective view and a cross sectional view of a first terminal of a supercapacitor according to an embodiment of the present invention.

Energy storage devices, including supercapacitors, batteries, and the like are typically packaged in various standardized materials and form factors, which can include a rectangular or a cylindrical shape and are available in a variety of sizes depending on such familiar engineering considerations as the amount of energy to be stored and the operating environment, as well as the type of circuit and assembly environment (wire leads versus surface mounting, for example).

The devices and methods described herein are in some cases generic to many form factors, and in other cases, particularly directed to coaxial form factors. The skilled artisan may readily adapt the invention to particular applications as may be desired.

The following examples pertain to methods to produce energy storage devices in a coaxial cable form factor instead of the traditional form factor.

The coaxial cable has been heavily used in the electronics industry and has several key advantages over the traditional form factor. A coaxial cable comprises a conductive core wire, which is wrapped with an outer conductive shield. This method to produce energy storage devices in the coaxial cable form factor can be used with a plethora of different electrode and electrolyte materials and combinations. The resulting performance of the coaxial cable energy storage device is thus tied to the materials used, as well as the length and width of the coaxial cable used. Depending on the materials used, performance can cover the ranges associated with those of a traditional capacitor, supercapacitor, or battery.

In some embodiments, building a symmetric supercapacitor construction, the active materials of cathode can optionally include $MnO_2$, $RuO_2$, $CoO_2$, $NaMnO_2$, $LiMnO_2$, $NaCoO_2$, and/or $LiCoO_2$ and the anode active materials can optionally include activated carbon, graphene, and/or $MoO_3$. To build a symmetric supercapacitor construction, the same material is preferably used for the cathode and anode, for example $MnO_2$, $RuO_2$, $CoO_2$, $NaMnO_2$, $LiMnO_2$, $NaCoO_2$, $LiCoO_2$, activated carbon, graphene, and/or $MoO_3$.

The wires and electrode materials can include any conductive metal including but not limited copper, nickel, gold, chromium, titanium, aluminum, and alloys and composites thereof. The electrode matrix can optionally be formed from foam, mesh, metal papers or felts, and other suitable forms as are known in the art.

The wrapped full cell can be singly encapsulated, or several cells can be bundled together in a parallel connection to increase the cell capacitance before encapsulating the bundle.

Additional stacking of separator/cathode/separator/anode can also be added to the first stack for in-situ series connection before encapsulating the cell to increase the cell voltage.

The output voltage of a thus-constructed cell depends on the electrolyte used: in some examples the output voltage is about 1.6 V for $Na_2SO_4$, or $Li_2SO_4$ aqueous electrolyte. In some examples the output voltage is about 2 V for super saturated $NaClO_4$ or $LiClO_4$ aqueous solution. The voltage rating, or output voltage, can be more than about 3 V if an ionic liquid electrolyte, LiFSI:Emim FSI, is used, or organic liquid electrolyte, $NaPF_6$ in EC/EMC, is used. As an alternative to using liquid electrolyte, solid-state electrolytes can also be used to replace the separator.

There are multiple methods to deposit/place the components (cathode, separator, which can comprise a solid-state electrolyte, and anode to form a supercapacitor according to embodiments of the present invention. Materials can optionally be pre-cut and wrapped around the core wire. Materials can optionally be extruded on top of one another in an additive approach. Furthermore, using a die, cast, or mold, materials can optionally be cured to the core wire in an additive process. Materials can also optionally be spirally wrapped around the core (first terminal wire).

Figure 1B:
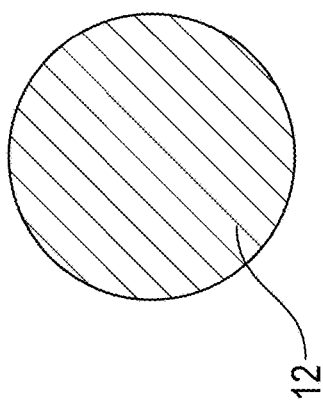
Figure 1C:
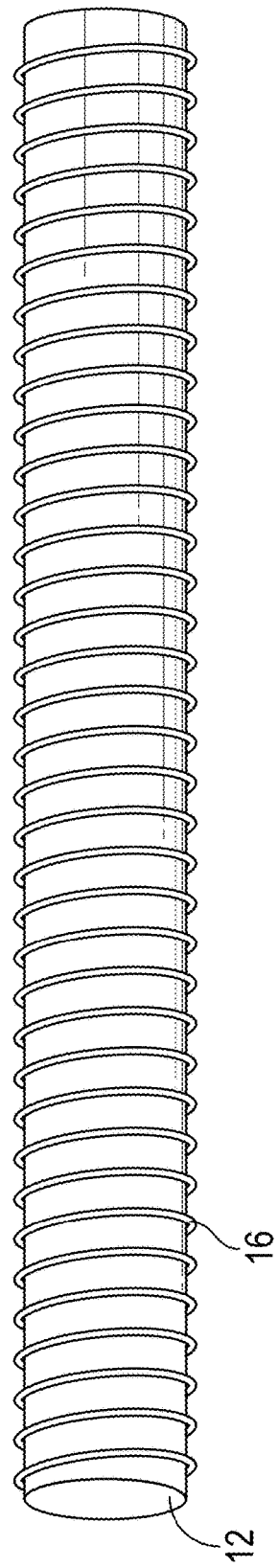
FIG. 1C illustrates a front perspective view of a first terminal with a conductive filament wrapped around it according to an embodiment of the present invention.

Referring now to FIGS. 1A to 11C, coaxial supercapacitor 10 of an embodiment of the present invention (also referred to herein as a "cable supercapacitor", "cable-based supercapacitor" or simply as a "supercapacitor") can be constructed as described in the following. As best illustrated in FIGS. 1A and 1B, first terminal 12 is preferably provided. This first terminal can serve as the core of supercapacitor 10 and is preferably formed from a conductive metal wire. Although the figures illustrate first terminal 12 as having a round cross section, a different cross-sectional shape can optionally be used.

Figure 2A:
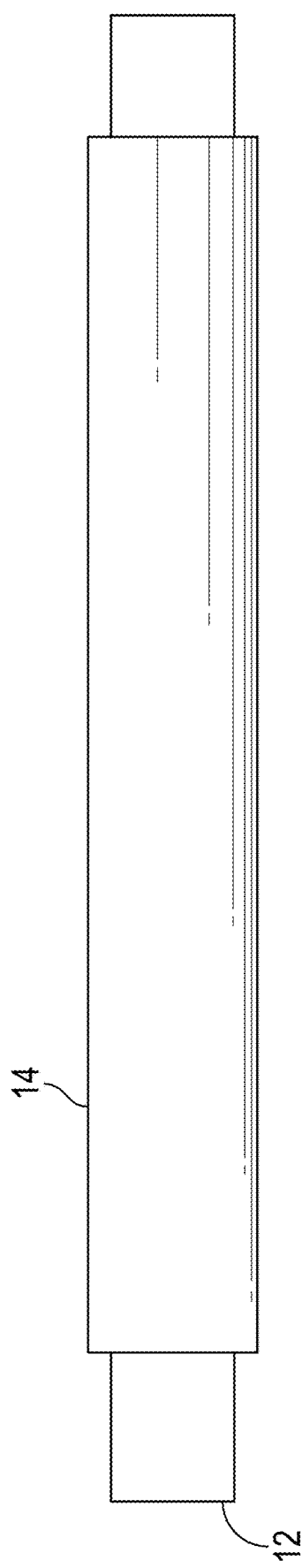
FIGS. 2A and 2B respectively illustrate a front perspective view and a cross sectional view of a first electrode attached to the first terminal of a supercapacitor according to an embodiment of the present invention.
Figure 2B:
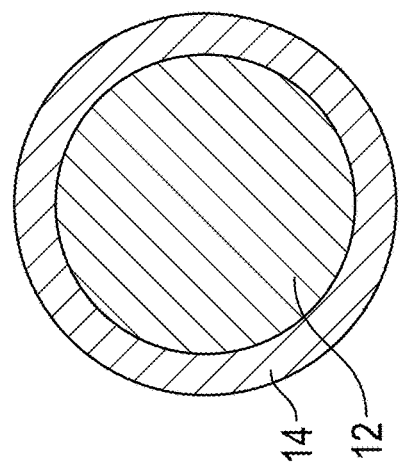

As illustrated in FIGS. 2A and 2B, first electrode 14, which can either be a cathode or anode, is preferably applied to core conductor (first terminal 12). In a most preferred embodiment, first electrode 14 is preferably provided as a sheet and is wrapped around first terminal 12. In one embodiment, first electrode 14 is preferably provided as a dry electrode material impregnated foam sheet, which itself can optionally be made by making a slurry, which can be spread out and allowed to dry before it is wrapped around first terminal 12. The material the foam is impregnated with can be selected to provide a desired capacitor polarity. For example, a metal foam, which can include a metal oxide, can be used or an activated carbon can be used. For the cathode, the metal foam is impregnated with $MnO_2$, and for the anode, the metal foam is preferably impregnated with activated carbon.

Figure 3A:
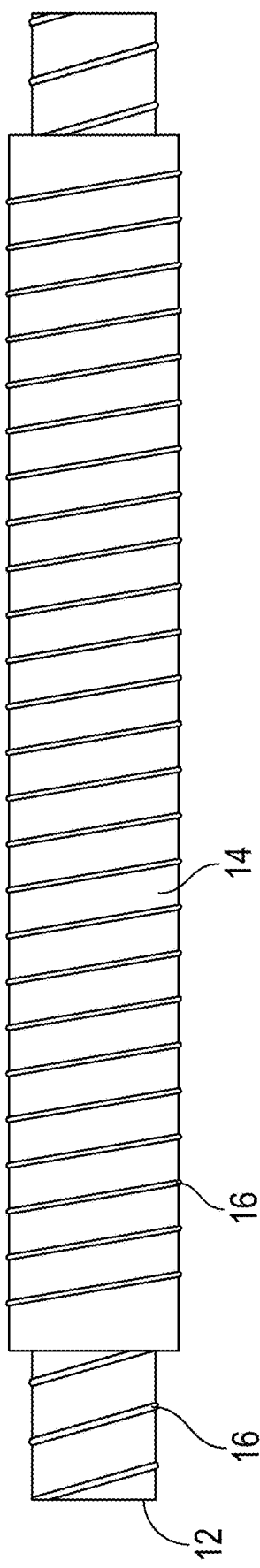
FIGS. 3A and 3B respectively illustrate a front perspective view and a cross sectional view of a first electrode wrap applied to a first electrode of a supercapacitor according to an embodiment of the present invention.
Figure 3B:
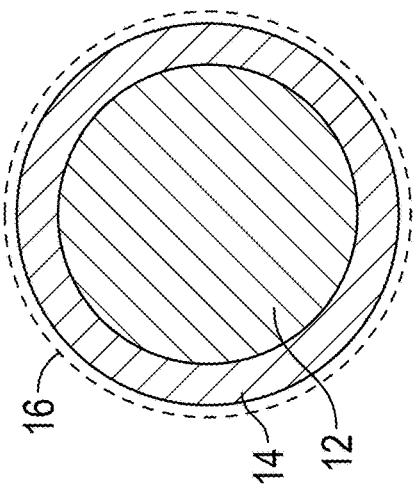
Figure 4A:
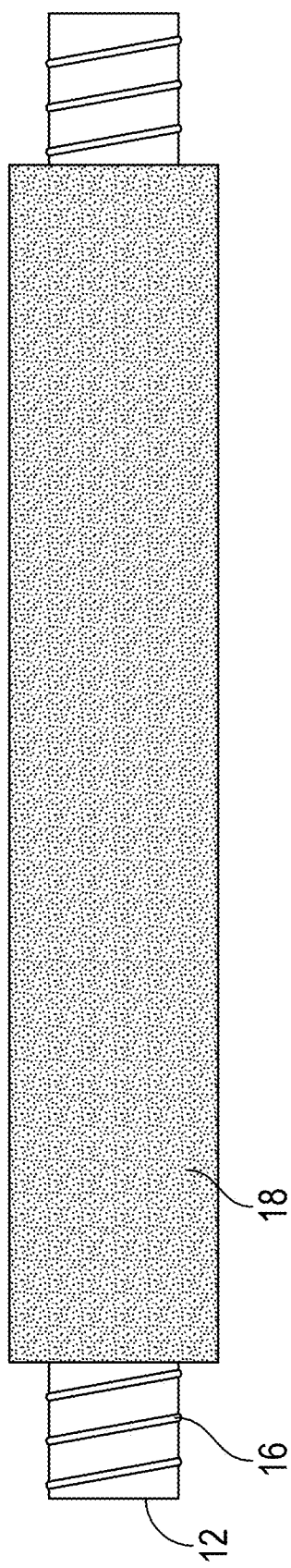
FIGS. 4A and 4B respectively illustrate a front perspective view and a cross sectional view of a separator applied to an electrode wrap according to an embodiment of the present invention.
Figure 4B:
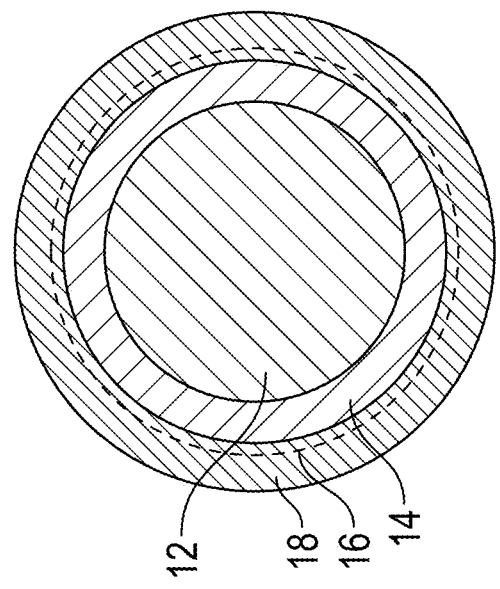
Figure 5A:
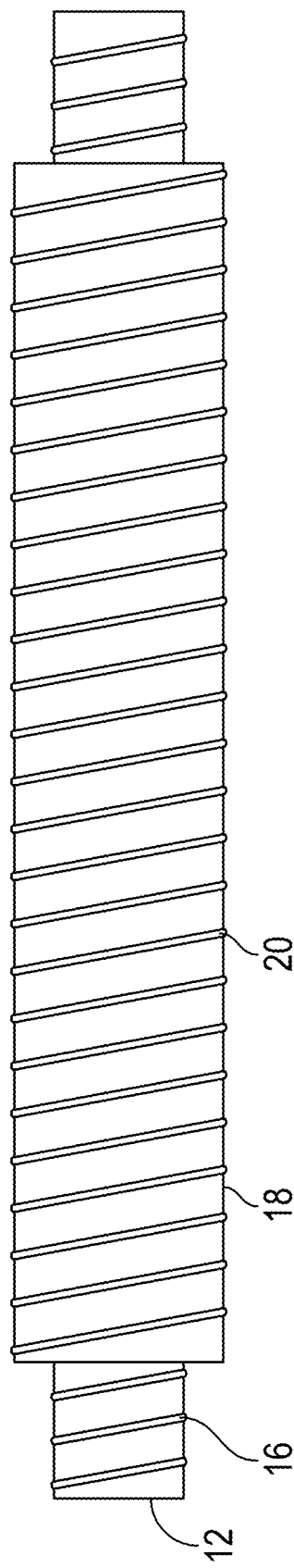
FIGS. 5A and 5B respectively illustrate a front perspective view and a cross sectional view of an assembly where a separator is applied to a separator of a supercapacitor according to an embodiment of the present invention.
Figure 5B:
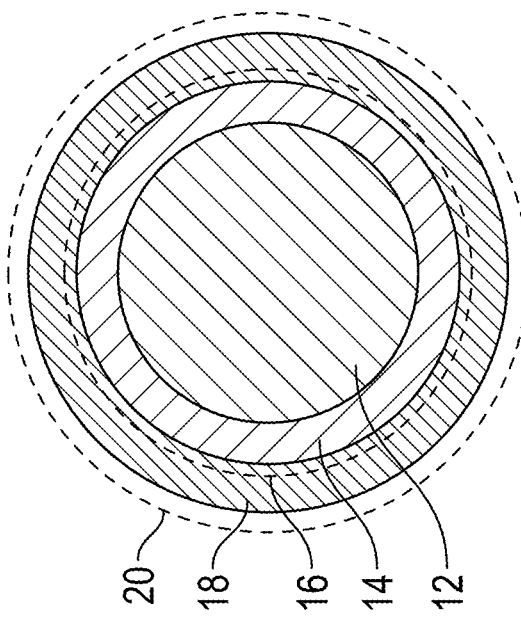
Figure 11C:
FIG. 11C is a drawing which illustrates a front perspective view of end sealant that has been applied to the end portions of the enclosure.

Per FIGS. 3A and 3B, first conductive filament 16 is preferably tightly wrapped over first electrode 14, this forces first electrode 14 tight against first terminal 12 and it increases the electrical contact surface area on the outside of first electrode 14. Optionally, first conductive filament 16 can be wrapped around first terminal 12 before first electrode 14 is provided and first conductive filament 16 can be wrapped around first electrode 14 as previously discussed. Although any desired diameter of first conductive filament 16 can be used to wrap around first terminal 12, in one embodiment, the diameter of first conductive filament 16 is preferably about 0.01 inches in diameter to about 0.1 inches in diameter and is more preferably about 0.02 inches in diameter to about 0.06 inches in diameter, and most preferably about 0.04 inches in diameter. This effectively increases the surface area of electrical contact between first terminal 12 and first electrode 14, thus effectively reducing the internal resistance of supercapacitor 10. Next, as illustrated in FIGS. 4A and 4B, separator 18 is disposed over first conductive filament 16. Optionally, separator 18 can be soaked with electrolyte 19. In one embodiment, electrolyte 19 can comprise a liquid and/or a gel disposed therein and/or thereon. Although such soaking can happen at any desired time in the construction of supercapacitor 10, in one embodiment, it most preferably happens toward the end of the manufacturing process—as best illustrated in FIG. 11C and as noted below. Separator 18 can optionally comprise a solid-state electrolyte material. For non-solid-state electrolyte materials, separator 18 preferably absorbs electrolyte 19. In one embodiment, if a liquid or gel electrolyte is to be used, separator 18 is most preferably formed from an insulative material, which can optionally include a fabric. In one embodiment, absorbent cotton tissue material that contains a blend of polyester and elastane has been found to provide particularly desirable results. As best illustrated in FIGS. 5A and 5B, depending on the material used for separator 18, in one embodiment, separator 18 can optionally be wrapped, most preferably tightly wrapped, with nonconductive filament 20 to secure separator 18 such that it surrounds and/or encapsulates the first electrode 14 (and first conductive filament 16 if provided). Although nonconductive filament 20 can comprise any desired nonconductive material, in one embodiment, nonconductive filament 20 preferably comprises a yarn or thread material.

Figure 6:
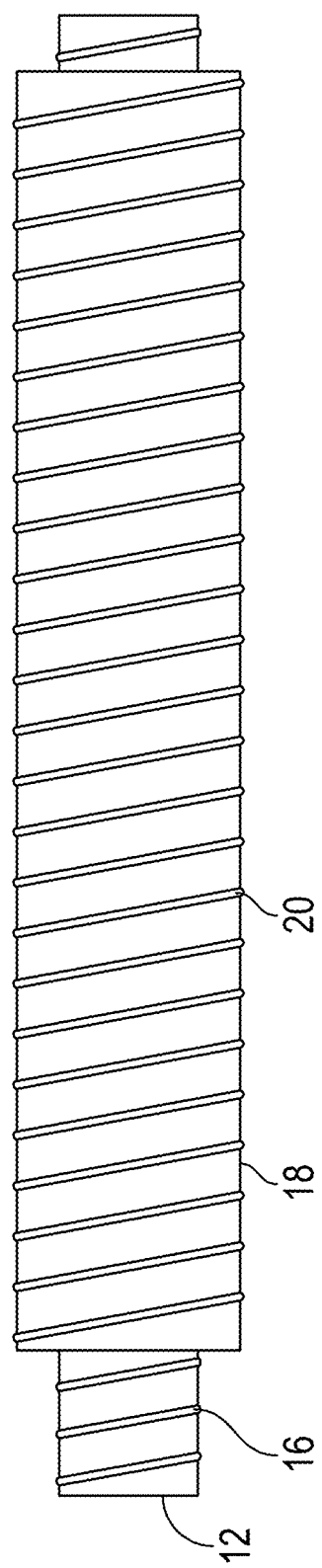
FIG. 6 illustrates a front perspective view wherein a terminal end portion of a first electrode of a supercapacitor has been removed (compare vs FIG. 4A), according to an embodiment of the present invention.

Referring now to FIG. 6, one end of first terminal 12 is most preferably removed. Next, as illustrated in FIGS. 7A and 7B, insulating material 22 is preferably applied to each end-portion of the assembly to help protect against shorts. Any desired insulating material can be used, but in one embodiment, insulating material 22 preferably comprises a heat-shrink material, and/or an insulative material that can be painted on. However, in one embodiment, insulating material 22 can include pre-formed endcaps can optionally be slid into place. Although such endcaps can be formed from any desired non-conductive material, if they are provided, they are most preferably formed from a plastic and/or elastic material, which can include for example natural or synthetic rubber.

Figure 8A:
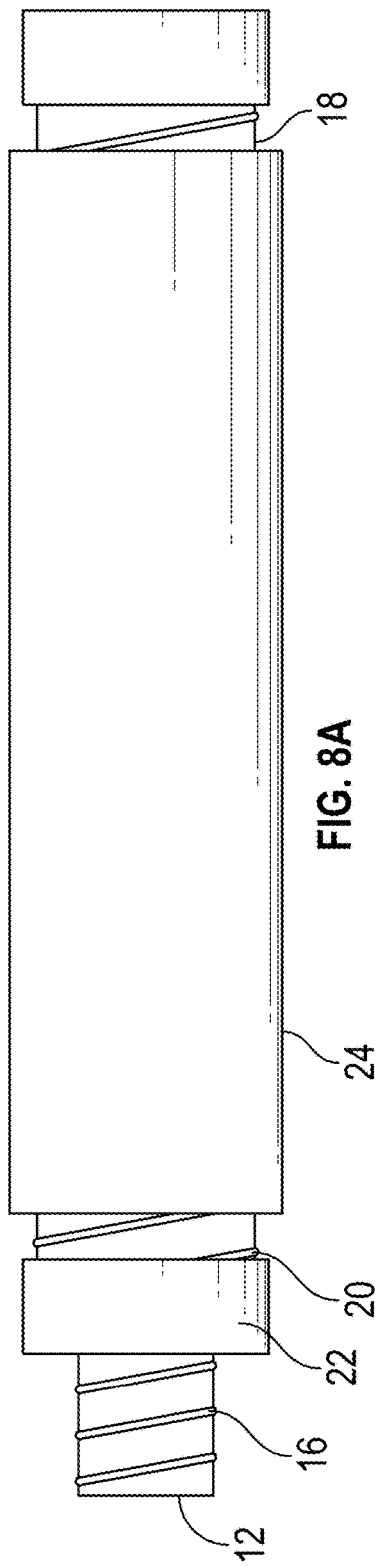
FIGS. 8A and 8B respectively illustrate a front perspective view and a cross sectional view wherein a second electrode has been applied over the separator between the insulators according to an embodiment of the present invention.
Figure 8B:
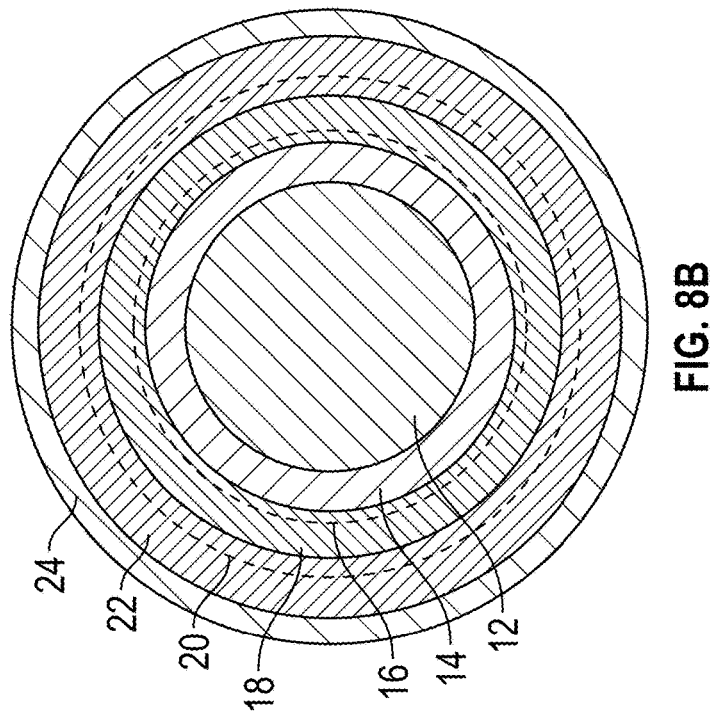

As illustrated in FIGS. 8A and 8B, second electrode 24 can be provided. As with the first electrode, second electrode 24 can also optionally be formed as an anode or cathode, depending on the material used for both electrodes. In one embodiment, second electrode 24 is preferably provided as a sheet, which is wrapped around separator 18 (and non-conductive filament 20 if provided). Second electrode 24 can optionally be formed by spreading a slurry and allowing it to dry into a sheet. If a metal foam containing metal oxide material is used for first electrode 14, second electrode 24 most preferably has metal foam containing an activated carbon material. Thus, in one embodiment, first electrode 14 can be formed as an anode or as a cathode and second electrode 24 can likewise be formed as a cathode or as an anode. Or, if an activated carbon material is used for first electrode 14, then a metal oxide material is most preferably used for second electrode 24. However, in one embodiment the same material can be used for both first electrode 14 and second electrode 24.

Figure 9C:
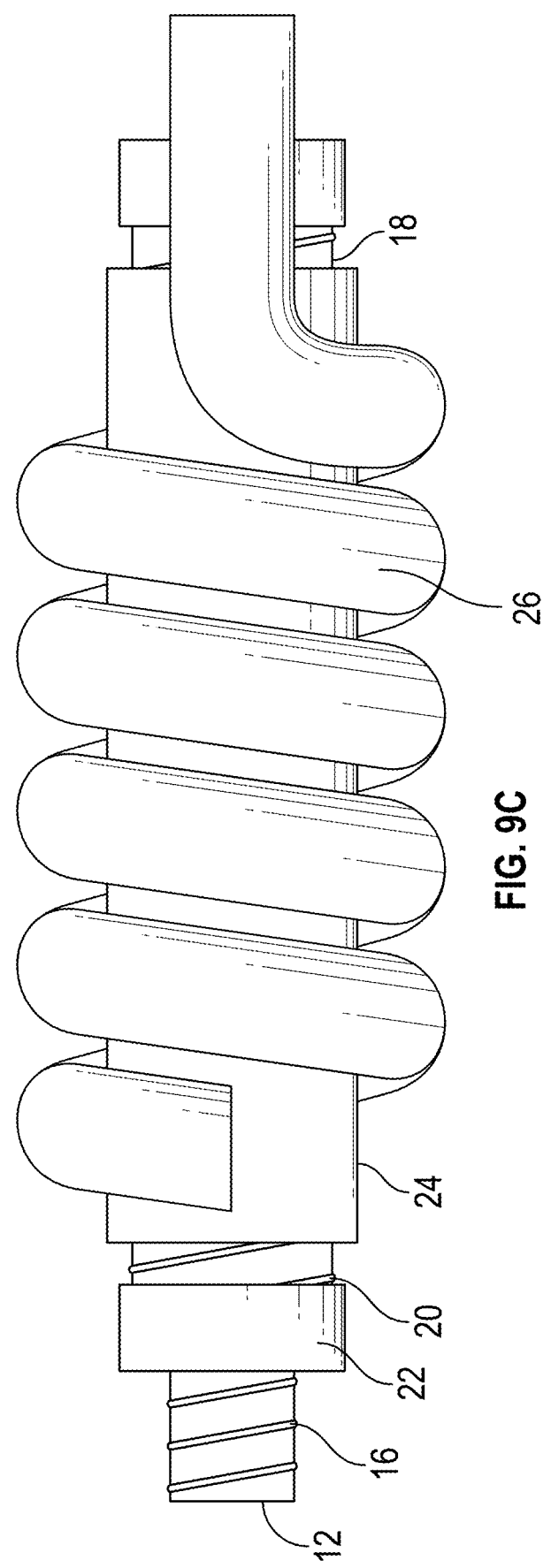
FIG. 9C is a front perspective view wherein a second terminal has been wrapped around the second electrode of a supercapacitor according to an embodiment of the present invention.

Second terminal 26 is then preferably placed in contact with second electrode 24. In a preferred embodiment, second terminal 26 is placed alongside second electrode 24 as illustrated in FIG. 9A, such that its primary axis is at least substantially parallel with a primary axis of second electrode 24. For this embodiment, (as illustrated in FIGS. 10A and 10B) second conductive filament 28 is preferably wrapped around the second electrode 24 and second terminal 26 such that it is lashed to and thus tightly binds the two together. Second conductive filament 28 not only binds the second electrode and second terminal together but also increases the electrical contact surface area between the two. In one embodiment, first conductive filament 16 and second conductive filament 28 can be, and most preferably are, formed from the same material. In addition to increasing electrical surface area and thus reducing resistance, first and second conductive filaments also keep the electrodes held tight against their respective terminals such that when supercapacitor 10 is bent, they remain in tight contact such that the various components do not slide around with respect to one another and thus become loose. Optionally, instead of being positioned with its primary axis at least substantially parallel with a primary axis of second electrode 24, second terminal 26 can itself be wrapped around second electrode 24 as best illustrated in FIG. 9C. In this embodiment, although second conductive filament 28 can still be used, it preferably is not used.

As illustrated in FIGS. 11A, and 11B, the entire assembly is preferably sealed. With encasement 30. Optionally, this can be done by adding a first insulative encasement, which can optionally include for example shrink tubing, over the entire assembly. As best illustrated in FIG. 11B, electrolyte 19, can optionally be added after applying a tubular encasement portion and before completely sealing encasement 30. In one embodiment, as best illustrated in FIG. 11C, if tubular encasement 30 is used, sealant 32 is preferably used to seal end portions of encasement 30. For example, sealant 32 can comprise an insulative paint, dip, adhesives, (which can optionally include for example a curable adhesive, including but not limited to an ultraviolet curable adhesive), epoxy, rubber end caps, or any other material or device or combination thereof which is capable of sealing the end portions of encasement 30. In one embodiment, if a first encasement portion is formed by using heat-shrink tubing, electrolyte 19 is preferably poured or otherwise disposed within the heat-shrink tubing before heat is applied to shrink it down tight against the rest of supercapacitor 10.

In one embodiment, first terminal 12 of supercapacitor 10 preferably extends away from the rest of the supercapacitor in a first direction and second terminal 26 preferably extends away from the rest of the supercapacitor in an opposing direction such that resulting supercapacitor 10 comprises an elongated cable-like construction with its respective terminals disposed at respective ends thereof and such that supercapacitor 10 can be physically be used in place of a wire in an electrical circuit. A plurality of cable supercapacitors can be placed and connected in series to power devices and circuits that a single cable supercapacitor is not capable of powering.

Likewise, a plurality of cable supercapacitors can be connected in parallel to power a device or circuit for duration of time that is longer than single cable supercapacitor can. Thus, if a plurality of cable supercapacitors are connected in parallel, when fully charged can optionally be used to operate a drone and other devices for a good length of time. In one embodiment, supercapacitor 10 does not comprise nanofeatured electrodes. In one embodiment, nanostructures are not deposited or otherwise formed on the electrodes of supercapacitor 10. In one embodiment sputter coating is not used to deposit material onto either of the electrodes. In one embodiment, electrodeposition is not used in forming either of the electrodes. In one embodiment, metal oxide is not grown as part of the process for forming either of the two electrodes of supercapacitor 10. In one embodiment, both electrodes of supercapacitor 10 are comprise a tubular shape. In one embodiment, a first electrode is not extruded onto a first terminal. Although a dry foam is most preferably used for one or both of first electrode 14 and/or second electrode 24, in one embodiment, one or both of them can instead be formed from a foil or mesh material.

The following discussion highlights a few of the many unique applications that supercapacitors 10 can be used in. Because supercapacitors 10 have space saving placement advantages and can be used as an energy storage component, supercapacitors 10 can be used as a filter, to level loads, to provide backup power, inject additional power (for example for peak power complement), and to absorb intermittent sources of energy.

Figure 28B:
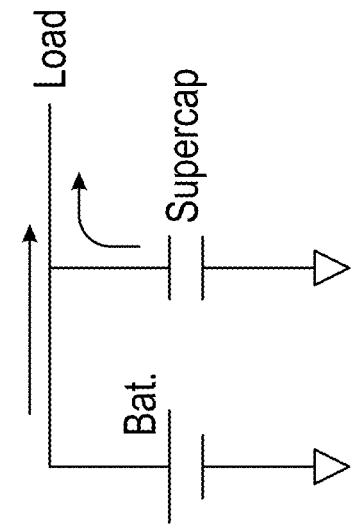
FIGS. 28A and 28B respectively illustrate a power vs time graph of a supercapacitor used to increase peak power and of a circuit configured for such use according to an embodiment of the present invention.
Figure 28A:
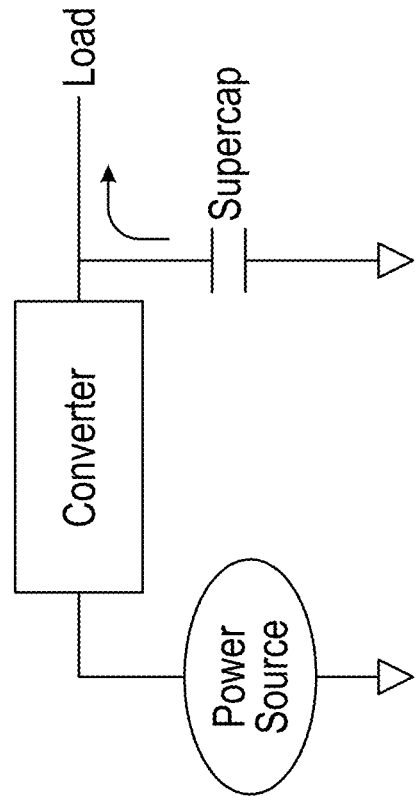
Figure 29B:
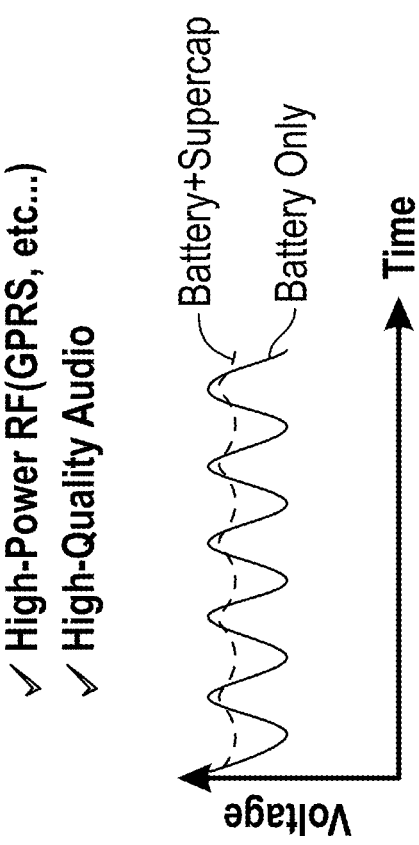
FIGS. 29A and 29B respectively illustrate a chart showing voltage vs time wherein a supercapacitor is used to smooth power delivery from a batter to a high power device and of an electrical circuit for such power smoothing according to an embodiment of the present invention.
Figure 29A:
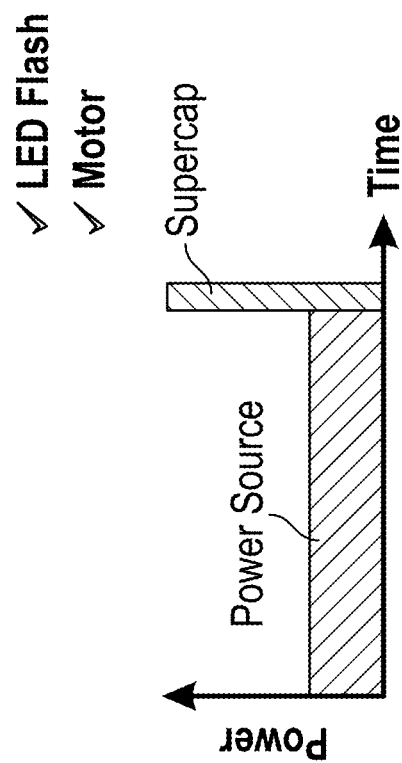
Figure 30A:
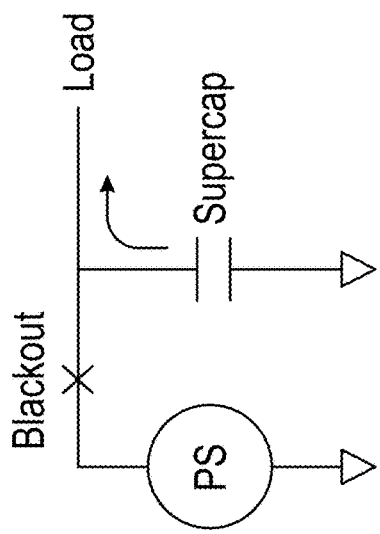
Figure 30A:
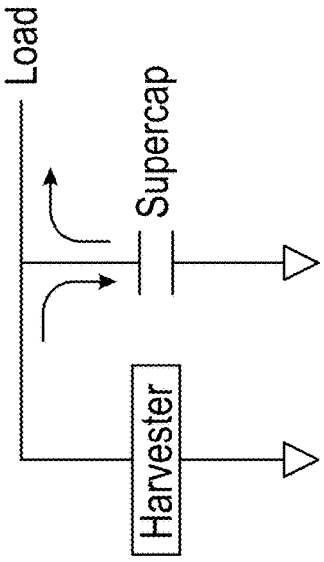
Figure 30A:
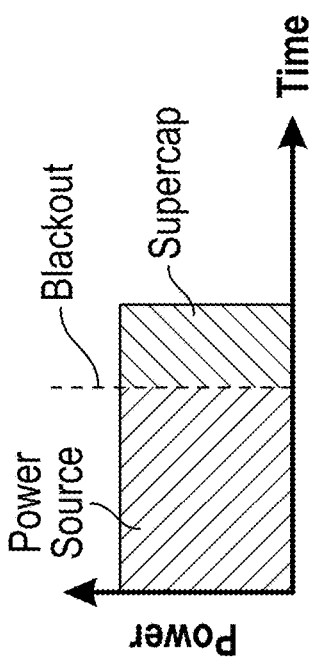
Figure 31A:
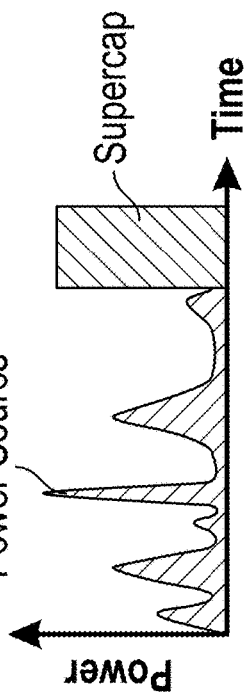

As illustrated in FIGS. 28A and 28B, when the power source cannot deliver the power required by the load, supercapacitor 10 can support it. Surges like this are common when turning on certain loads. In FIGS. 29A and 29B, when electrical loads are unstable or are too high for the battery, supercapacitor 10 can assist it and decrease the overall load seen by the battery, thus improving power quality and efficiency. As best illustrated in FIGS. 30A and 30B, supercapacitor 10 can provide backup power to extend operations, as well as during unexpected shutdowns. Thus, supercapacitor 10 can reduce blackout/brownout vulnerabilities. As best illustrated in FIGS. 31A and 31B, supercapacitor 10 can be charged and discharged quickly, thus enabling it to absorb minute power fluctuations. This is ideal for energy harvesting applications—for example as are often encountered when harvesting renewable energy.

Supercapacitors 10 preferably provide electrical characteristics and/or functions, which are substantially the same as other supercapacitors, but are in a much more unique formfactor, which enables them to be used in unique applications. Because supercapacitor 10 is wire-shaped and flexible, it can be installed on printed circuit boards (like other supercapacitors are) or it can be used off-circuit board and inside the product or system's infrastructure, enclosure, housing, (or even outside from the enclosure and/or housing) or wiring infrastructure where more space is available. In each application, supercapacitor 10 is providing a similar electrical function that that of a traditional supercapacitor but can be installed in various ways specific to that application where it offers some kind of space or aesthetic advantage over traditional supercapacitors. Supercapacitor 10 can be used on printed circuit boards where other supercapacitors are installed. The advantage of this is that supercapacitor 10 requires less surface area on the board than traditional supercapacitors do.

Figure 32A:
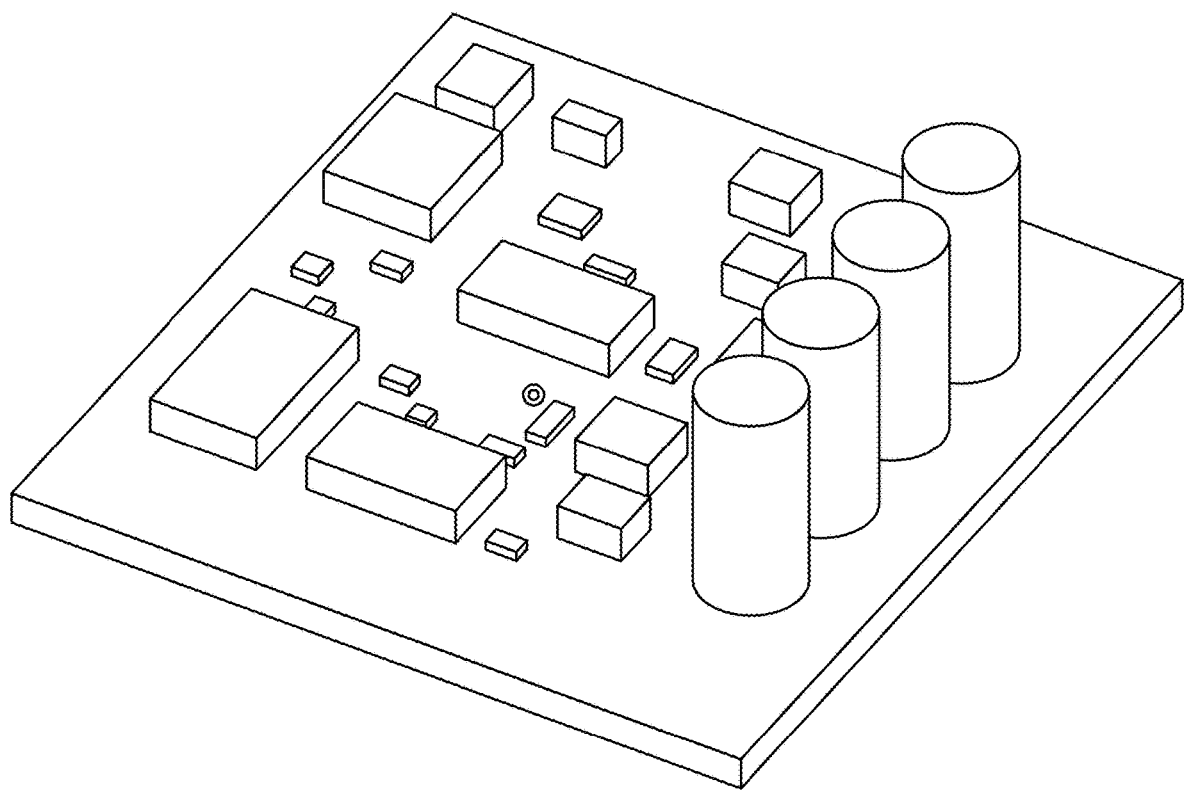
FIG. 32A, illustrates a circuit and a bank of conventional supercapacitors disposed on a printed circuit board.
Figure 32B:
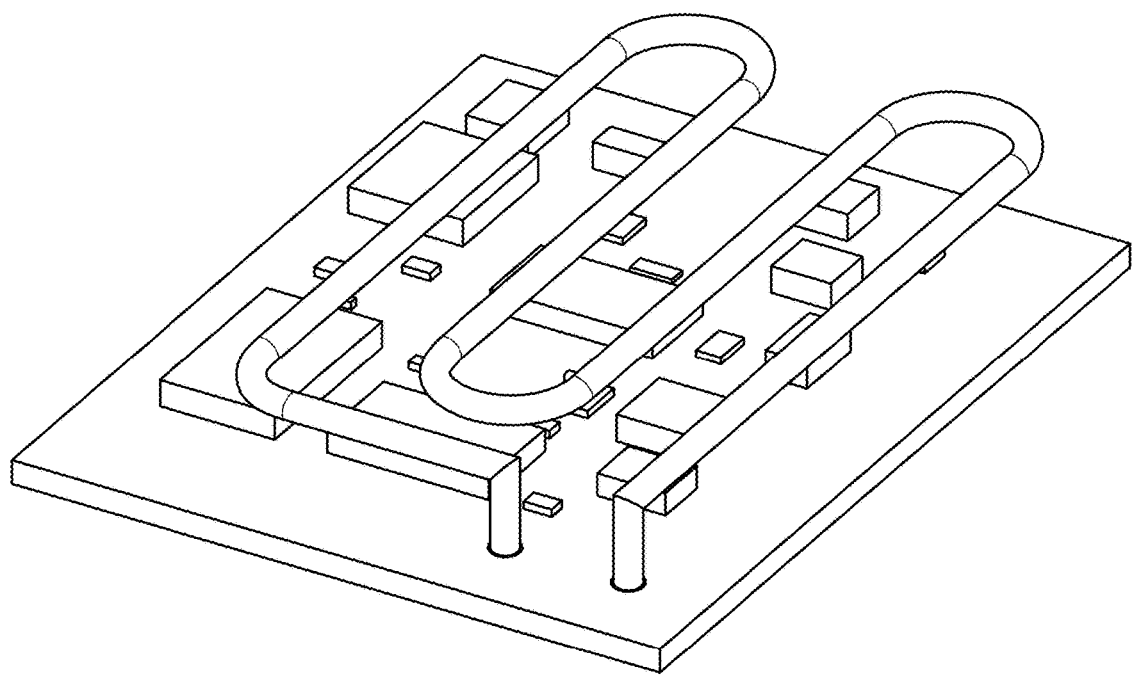
FIGS. 32B, 32C, and 32D illustrate the same circuit of FIG. 32A, but with a cable supercapacitor of an embodiment of the present invention used in place of the traditional supercapacitors and which cable supercapacitor is positioned in a number of different configurations to illustrate space savings and the ease with which positioning and configuration can be provided with supercapacitor of an embodiment of the present invention.
Figure 32C:
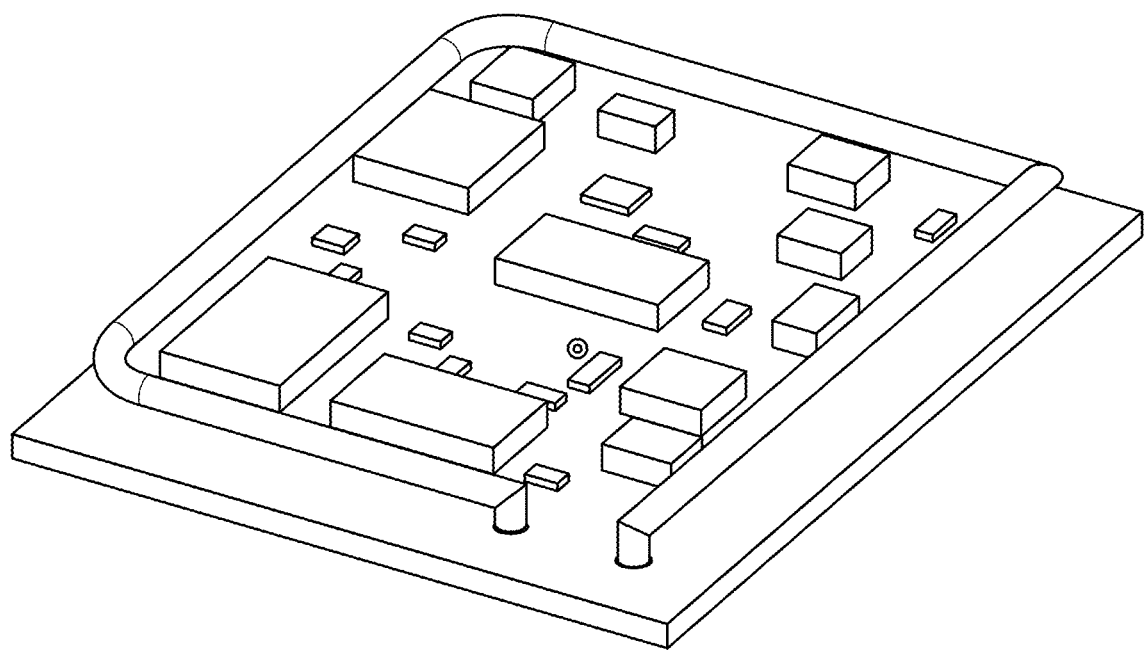
Figure 32D:
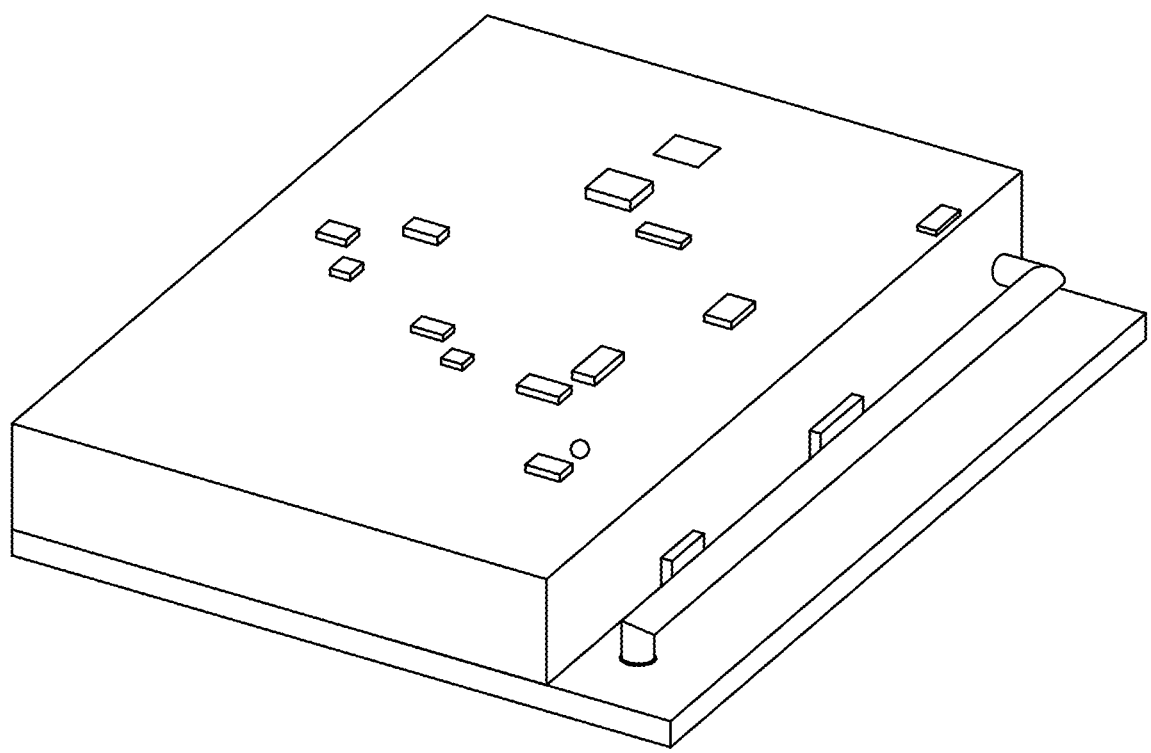

As best illustrated in FIGS. 32A-D, supercapacitor 10 can be used in place of, or to replace, a traditional supercapacitor bank on a circuit board. As a result, as seen by comparing traditional supercapacitor bank circuit of FIG. 32A with an equivalent circuit using supercapacitor 10, this results in a space savings of about 20%. These circuits illustrate how the connection points of supercapacitor 10 require less surface area than even a single traditional supercapacitor does. This can be applied to any supercapacitor application. For example, as seen in FIGS. 32B-D, supercapacitor 10 can be installed in numerous different configurations for any given circuit. For example, supercapacitor 10 can be positioned to float above the rest of the circuit so that valuable surface area if a printed circuit board ("PCB") is not used. This enables designers to add new features or make a product smaller. Supercapacitor 10 can be used in a variety of ways on a PCB, for example, it can be routed around areas where there is free space to help the circuit fit inside a smaller housing or enclosure. New three-dimensional ("3D") printed circuit board technologies can also have supercapacitor 10 routed or installed inside the circuit board, rather than on its surface.

Figure 33:
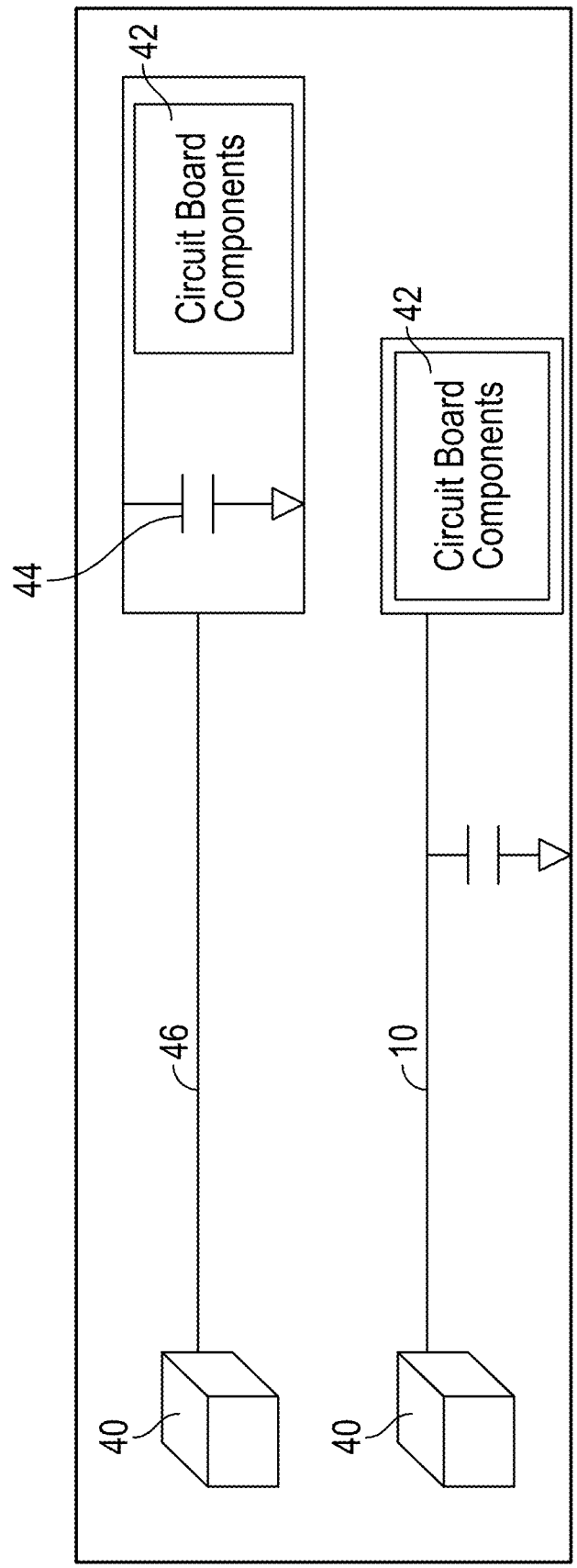
FIG. 33 is a figure which illustrates the significant space savings that can be achieved within a circuit when using a supercapacitor of an embodiment of the present invention.
Figure 34:
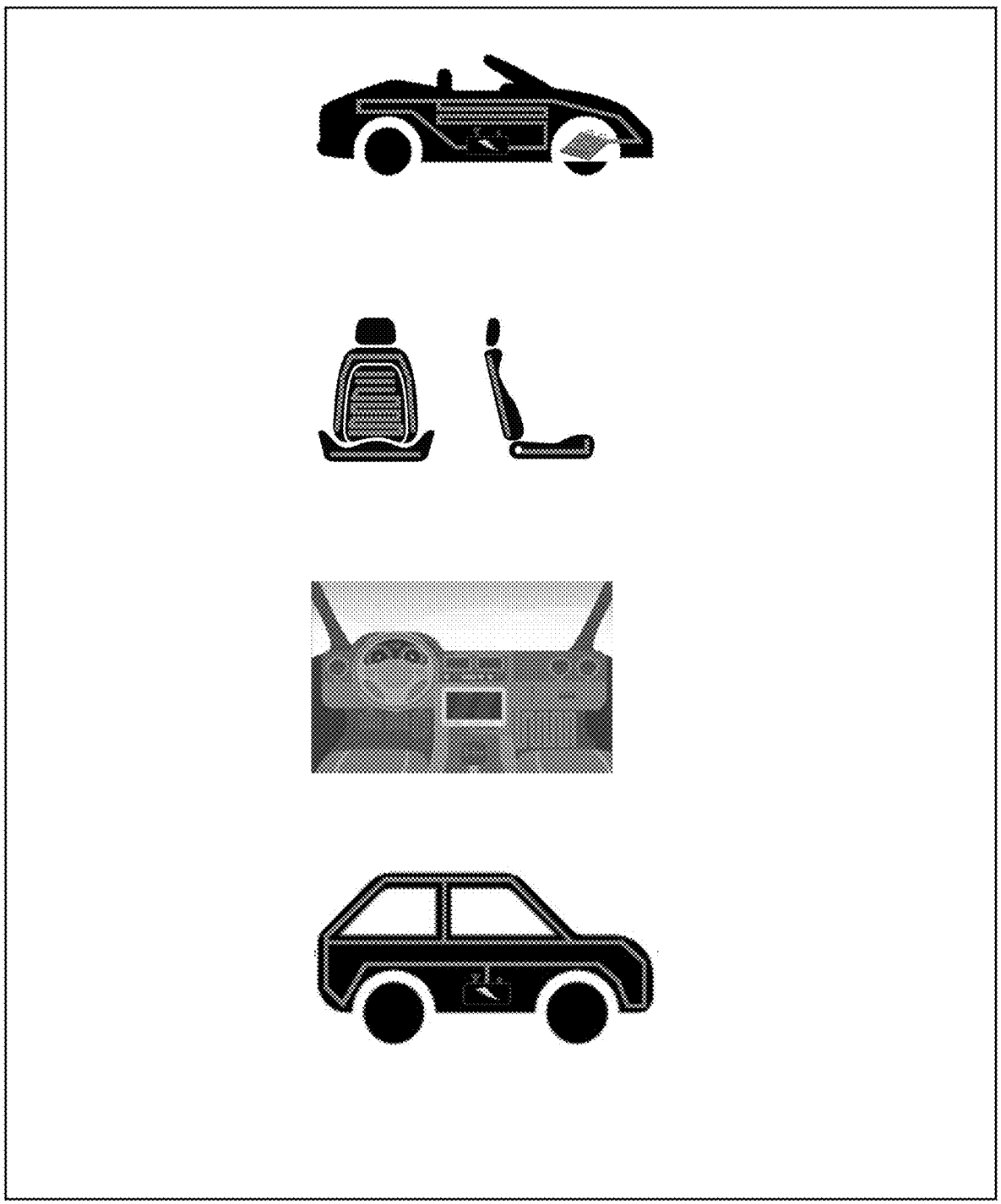
FIG. 34 is a drawing which illustrates a few of the various positions that a supercapacitor according to an embodiment of the present invention can be disposed within and/or upon an automobile.
Figure 35:
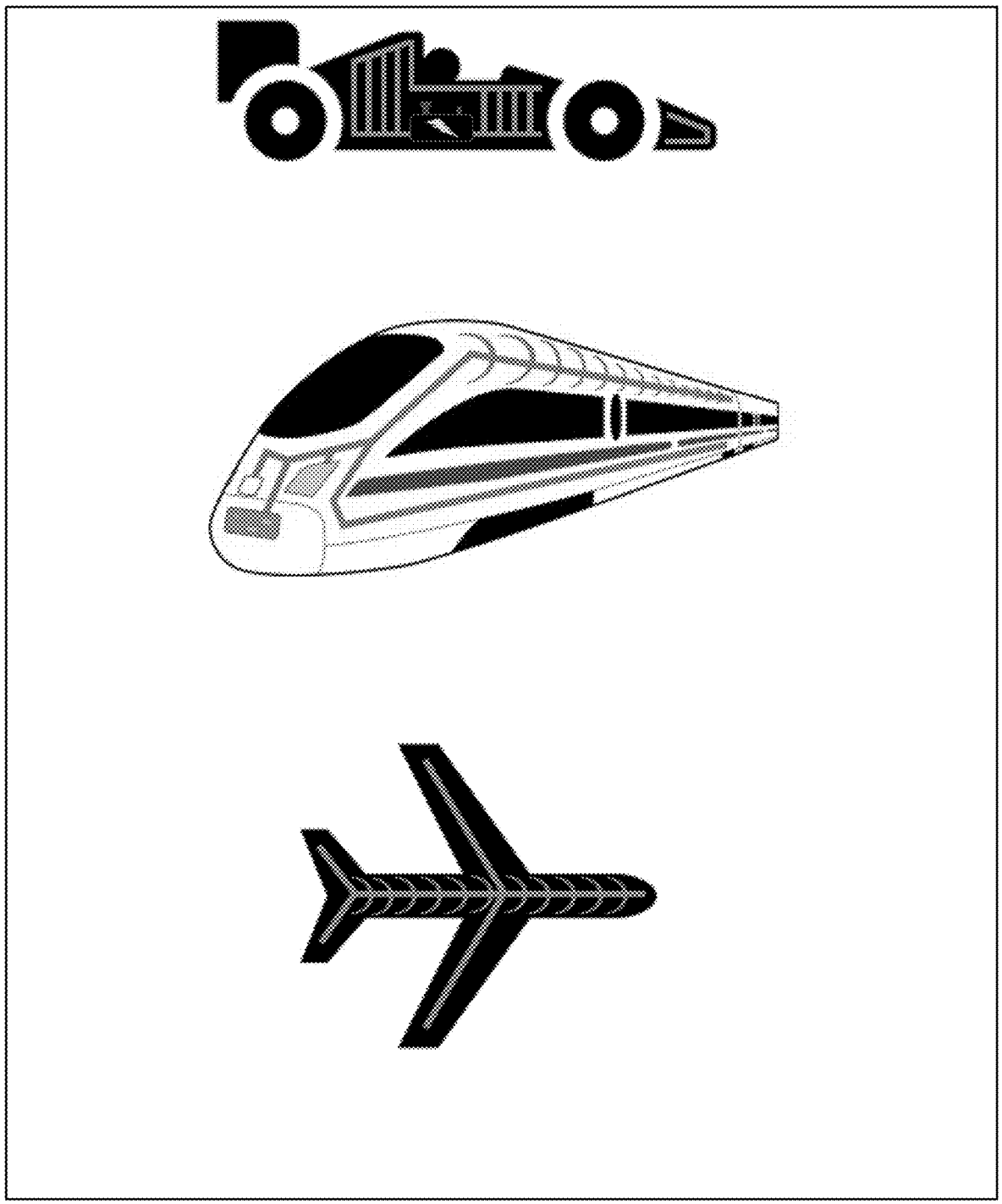
FIG. 35 is a drawing which illustrates possible placement of a supercapacitor on plains, trains, and automobiles according to an embodiment of the present invention.
Figure 36:
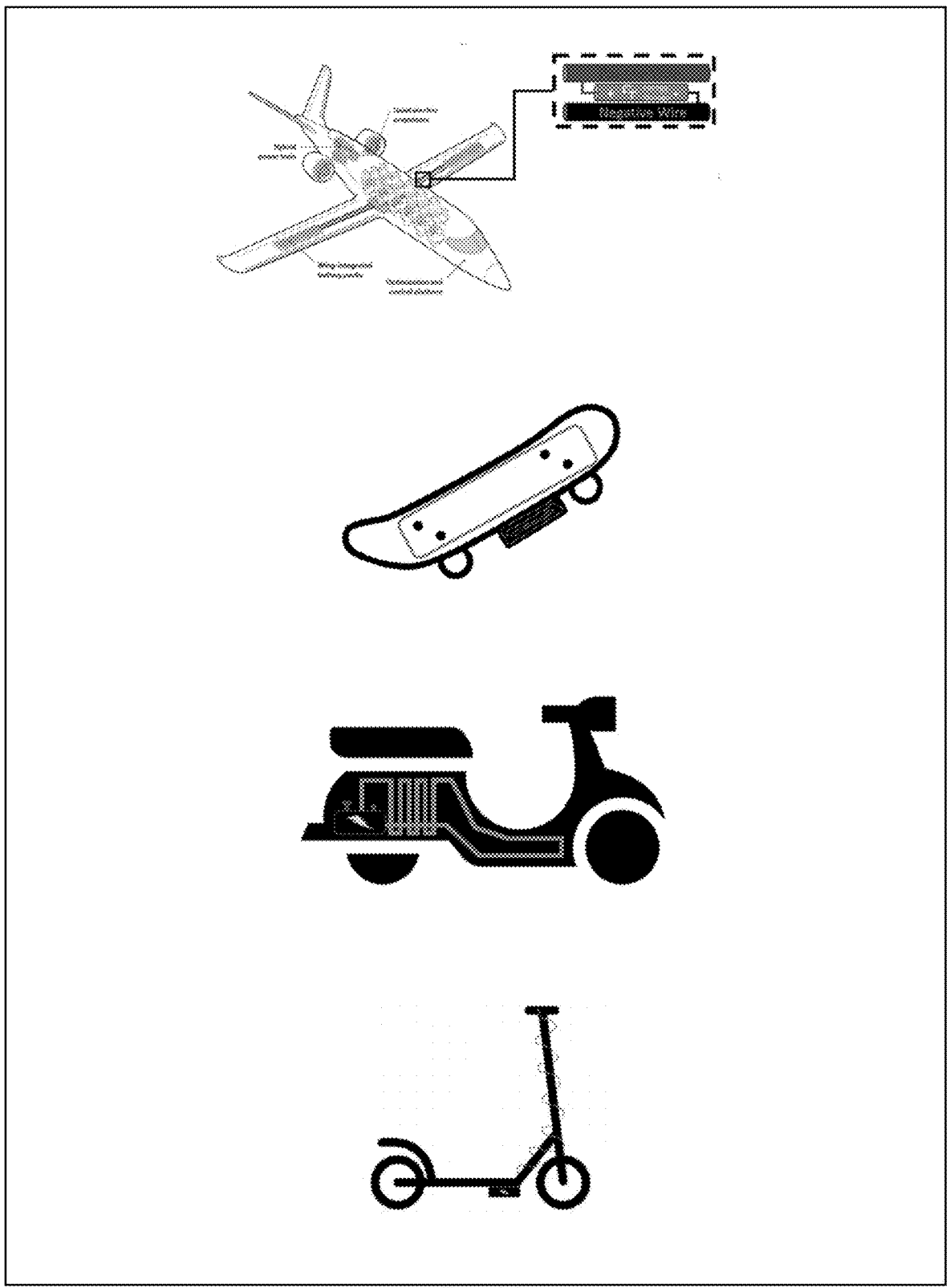
FIG. 36 is a drawing which illustrates possible placements and configurations that a supercapacitor of an embodiment of the present invention can be used for an electric airplane, an electric skateboard, a sit-down electric scooter, and a stand-on electric scooter.
Figure 37:
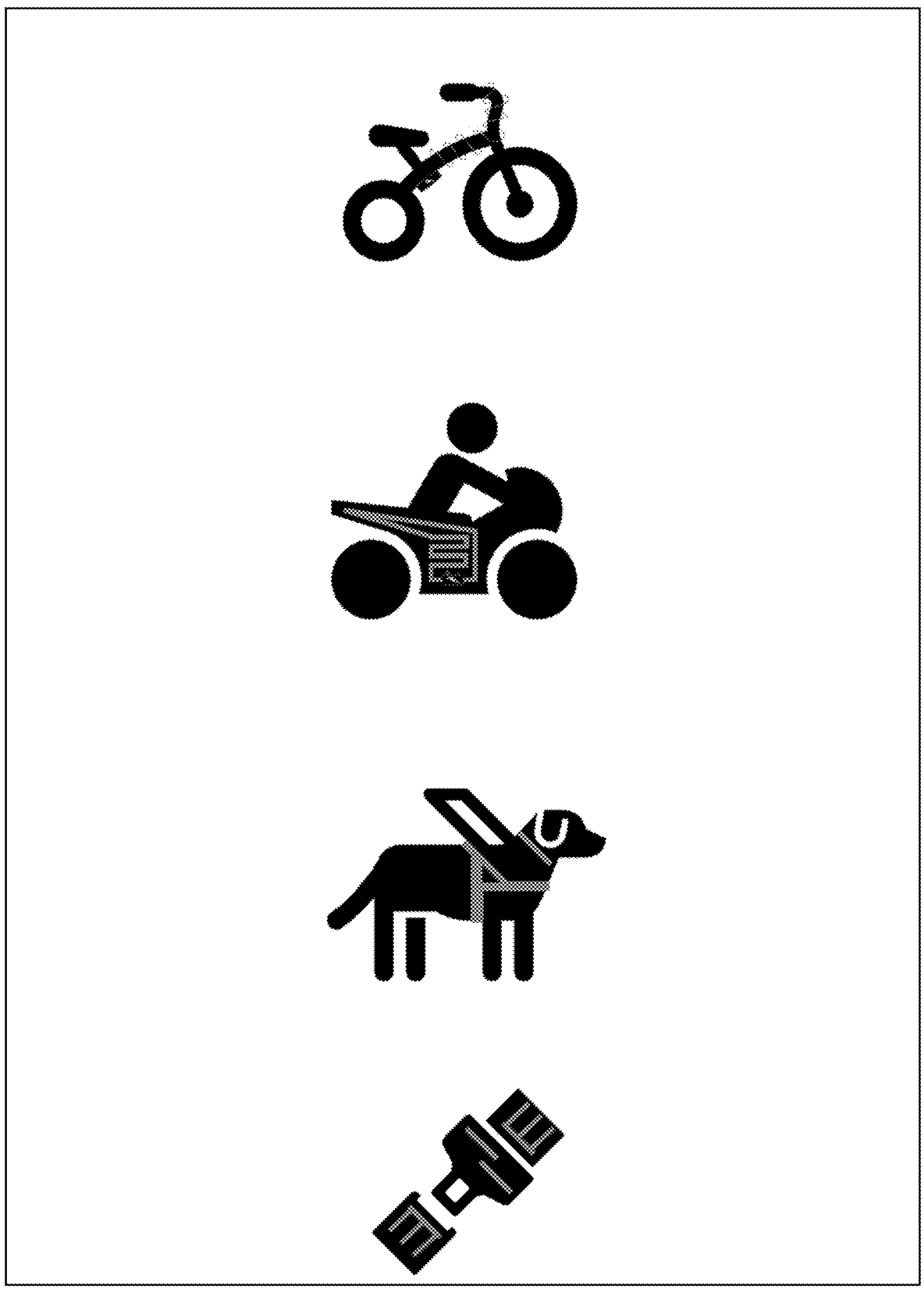
FIG. 37 is a drawing which illustrates possible placements and configurations that a supercapacitor of an embodiment of the present invention can be used for a bike or trike, a motorcycle, an animal harness, and a strap and buckle assembly.
Figure 38:
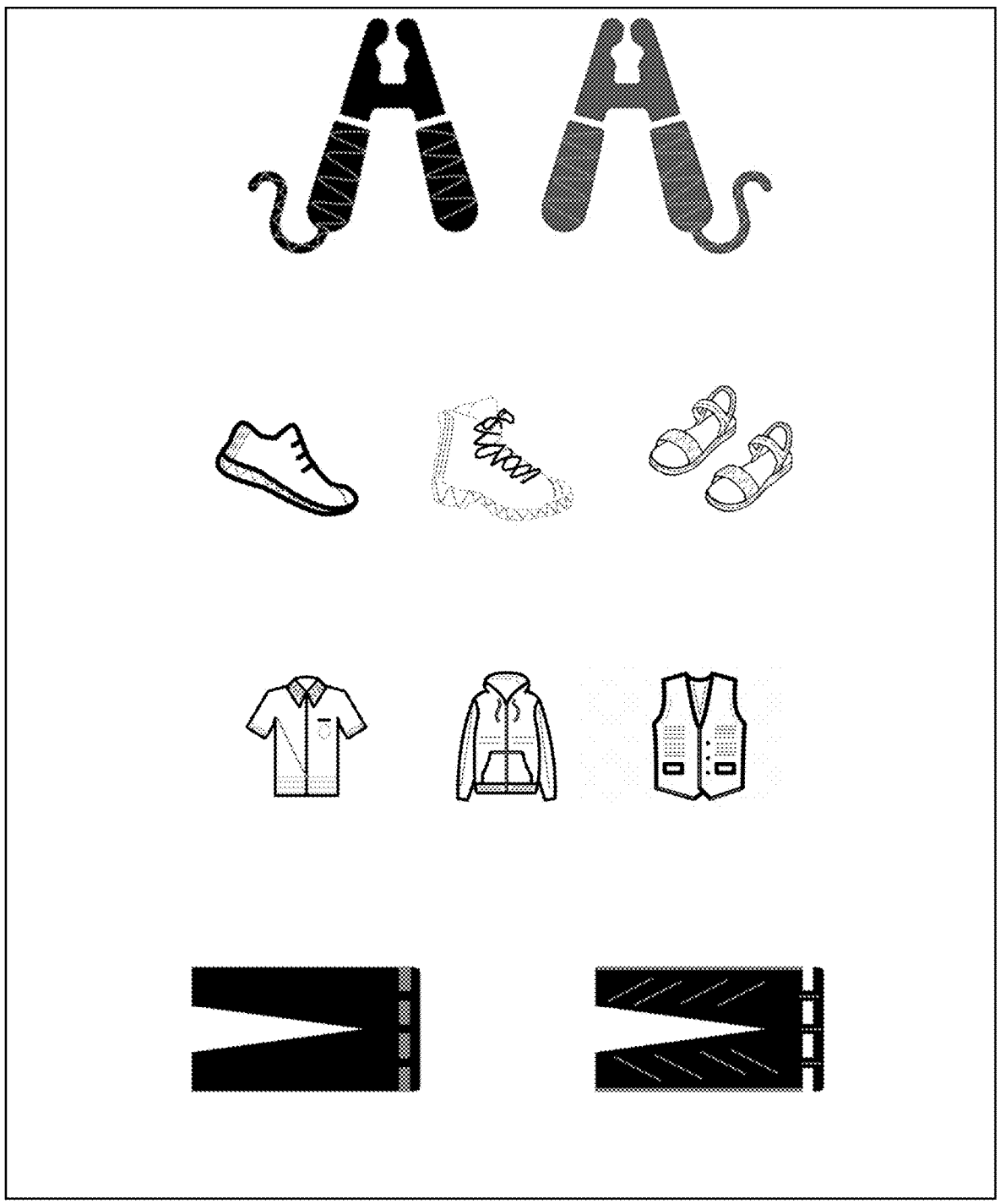
FIG. 38 is a drawing which illustrates possible placements and configurations that a supercapacitor of an embodiment of the present invention can be used for a pair of jumper cables, footwear, shirts, jackets, vests, pants, and a belt.
Figure 39:
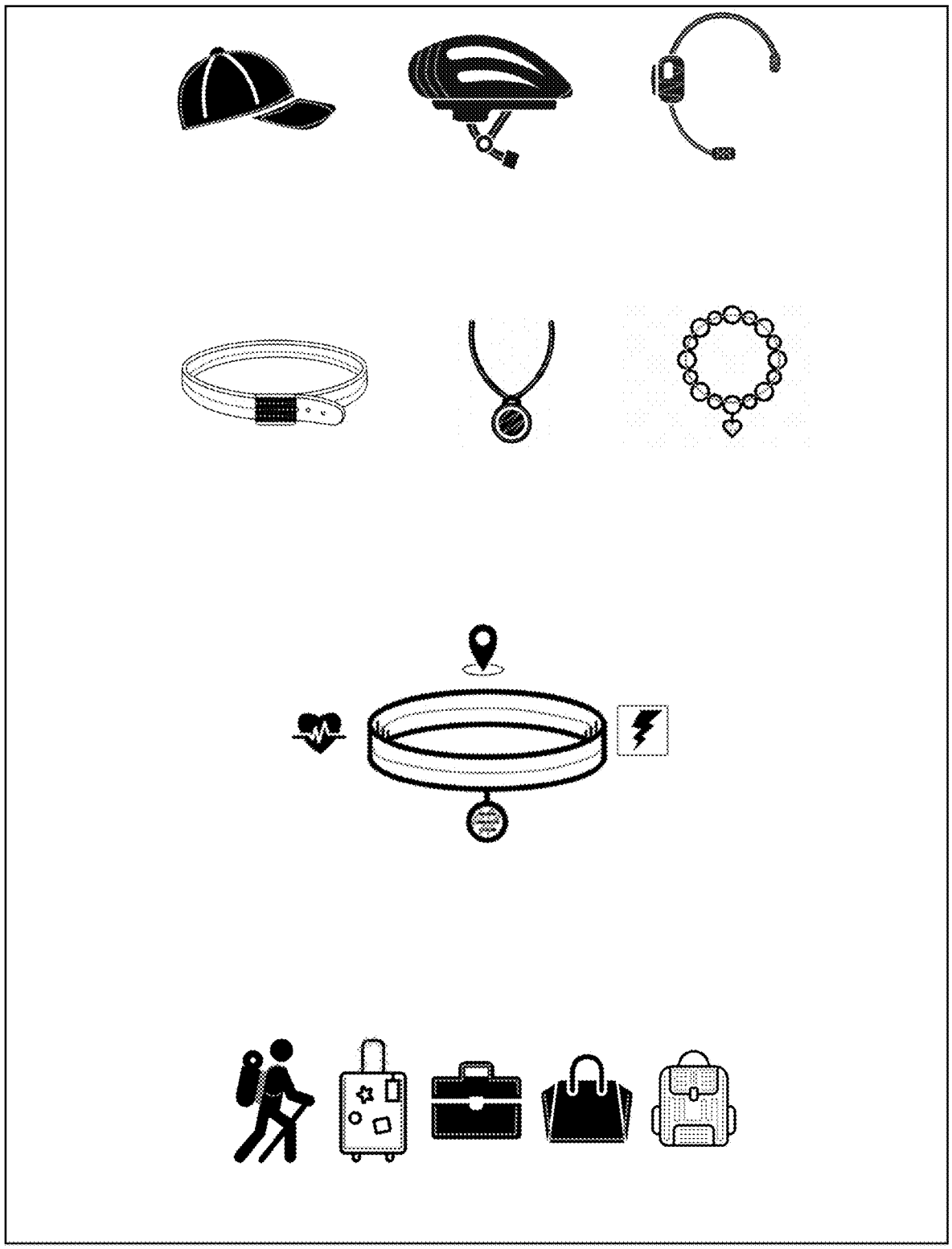
FIG. 39 is a drawing which illustrates possible placements and configurations for a supercapacitor of an embodiment of the present invention for hats, helmets, headsets, belts, necklaces, bracelets, animal collars, backpacks, luggage, bags, purses, and packs.
Figure 40:
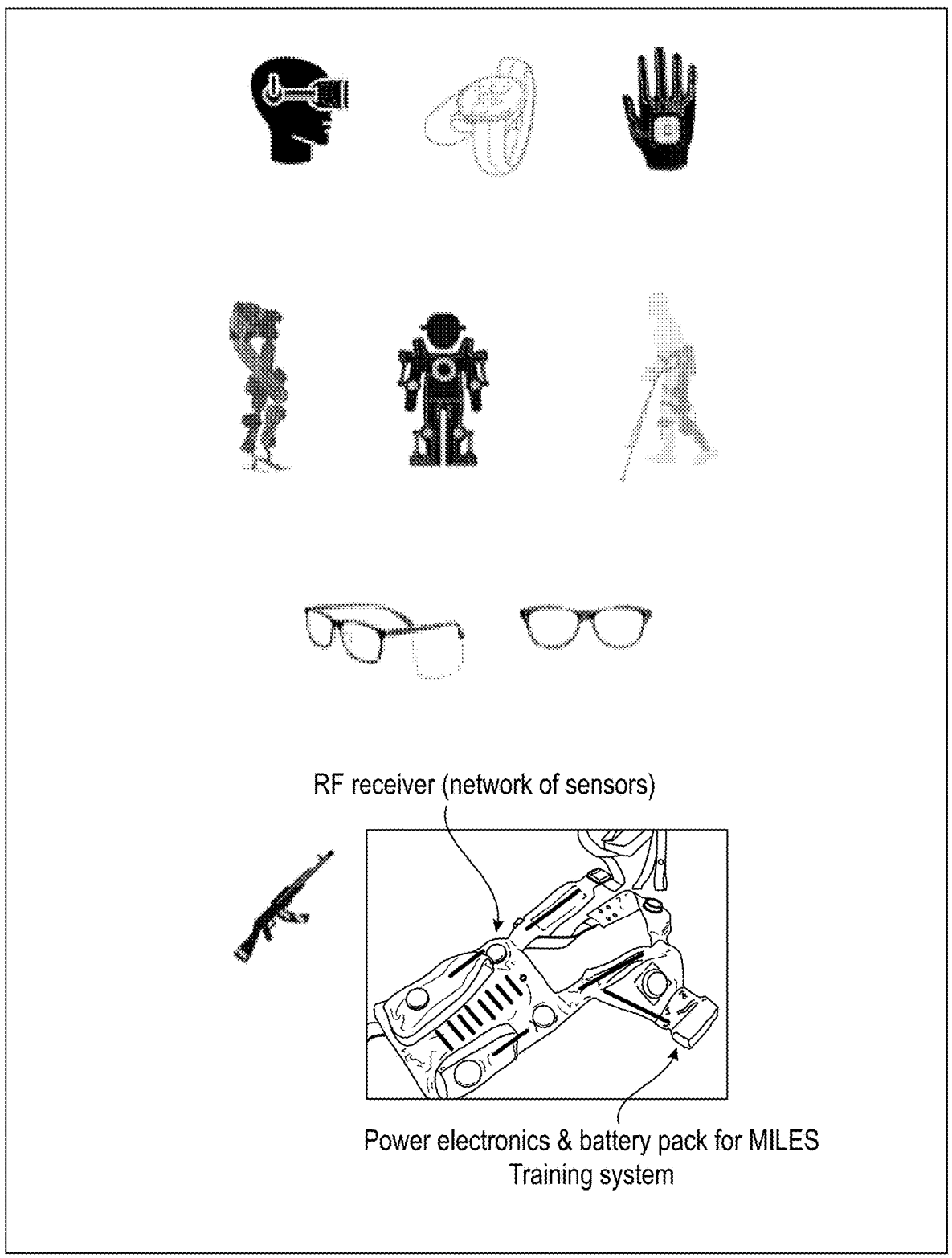
FIG. 40 is a drawing which illustrates possible placements and configurations for a supercapacitor of an embodiment of the present invention for virtual and augmented reality input and output devices, exoskeletons, and eyewear.
Figure 41:
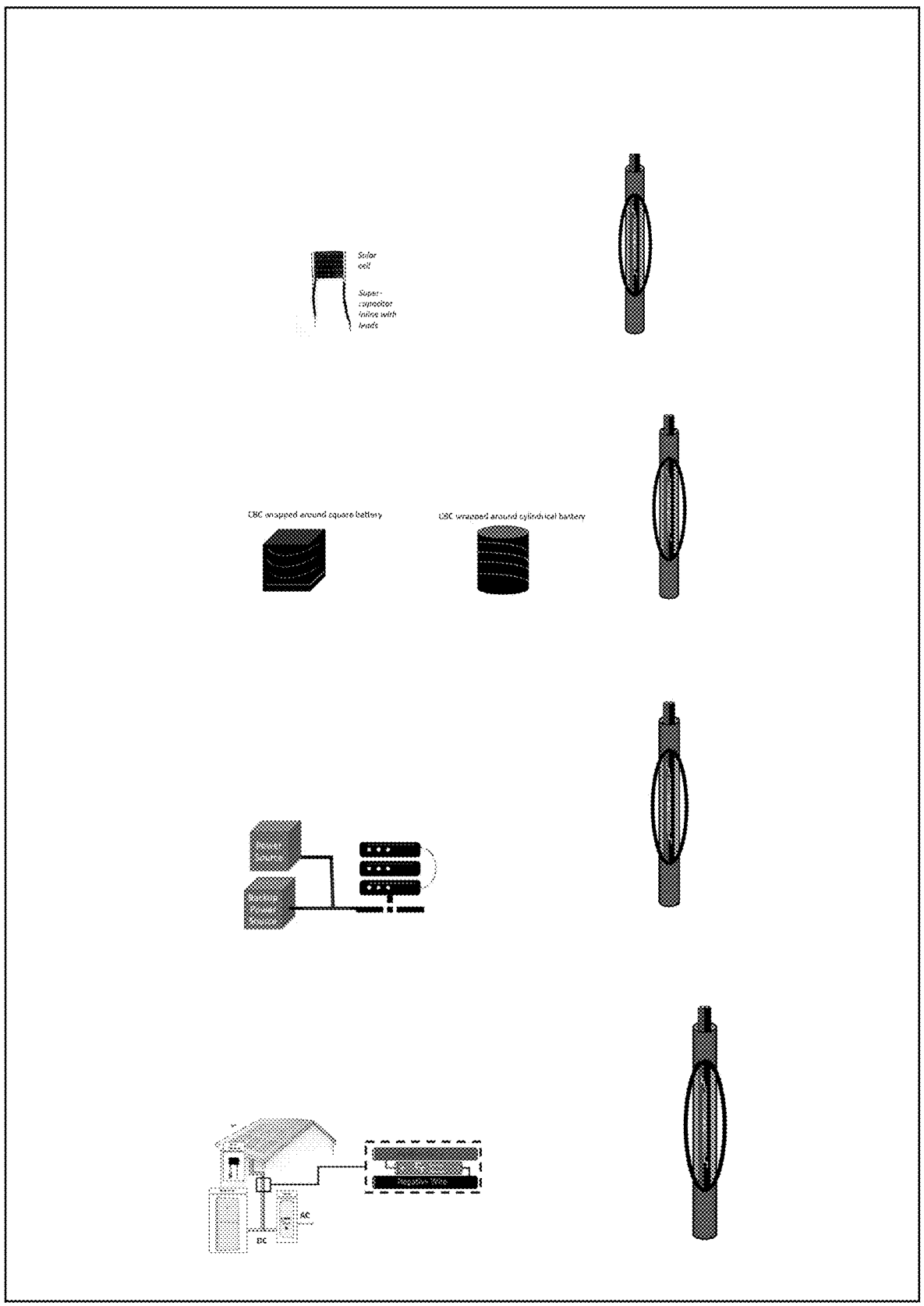
FIG. 41 is a drawing which illustrates possible placements and configurations for a supercapacitor of an embodiment of the present invention for energy harvesting, energy storage, on information technology equipment, and for solar power systems.
Figure 42:
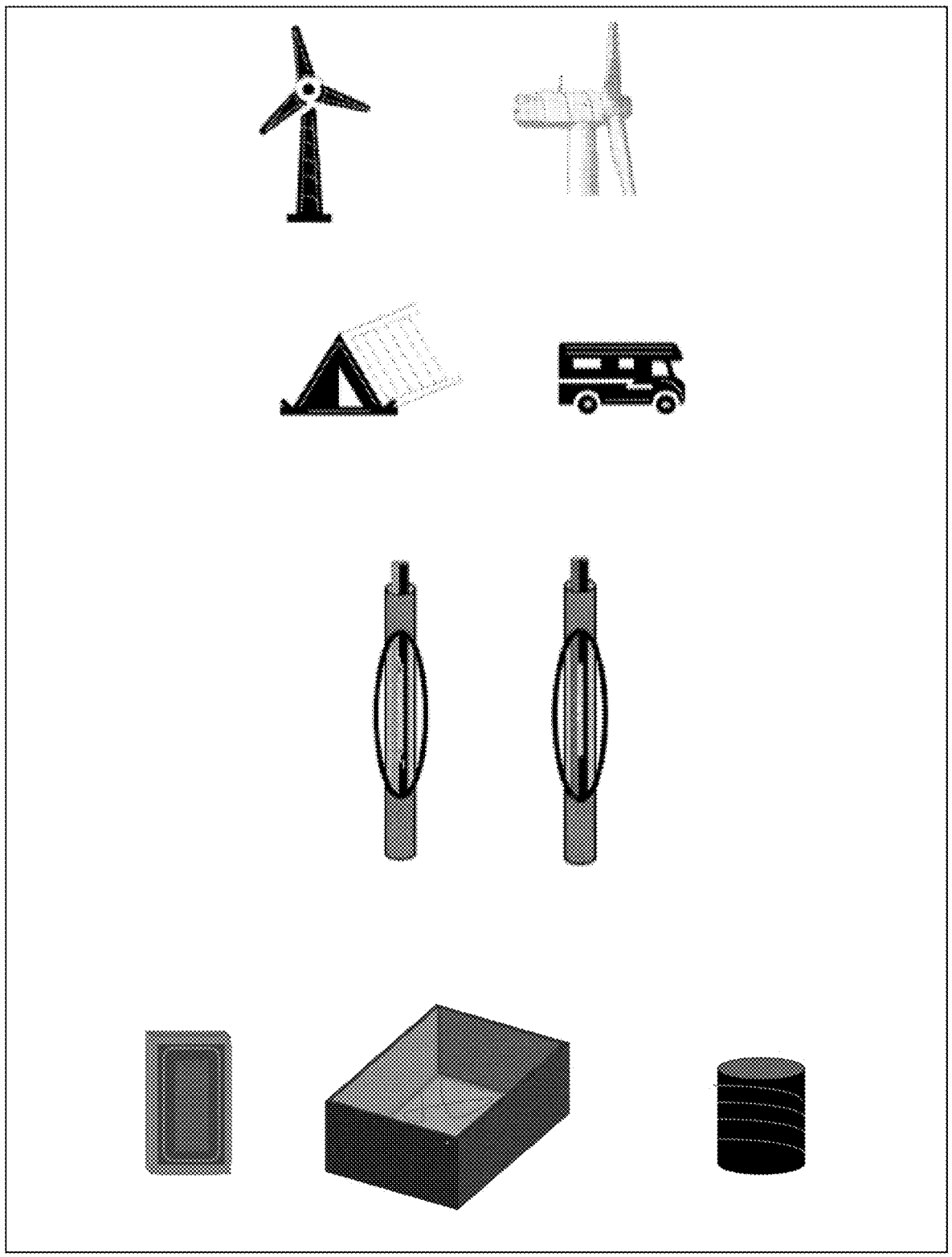
FIG. 42 is a drawing which illustrates possible placements and configurations for a supercapacitor of an embodiment of the present invention for wind turbines, tents and recreational vehicles, wires and/or cords, and on or in enclosures for electronics.
Figure 43:
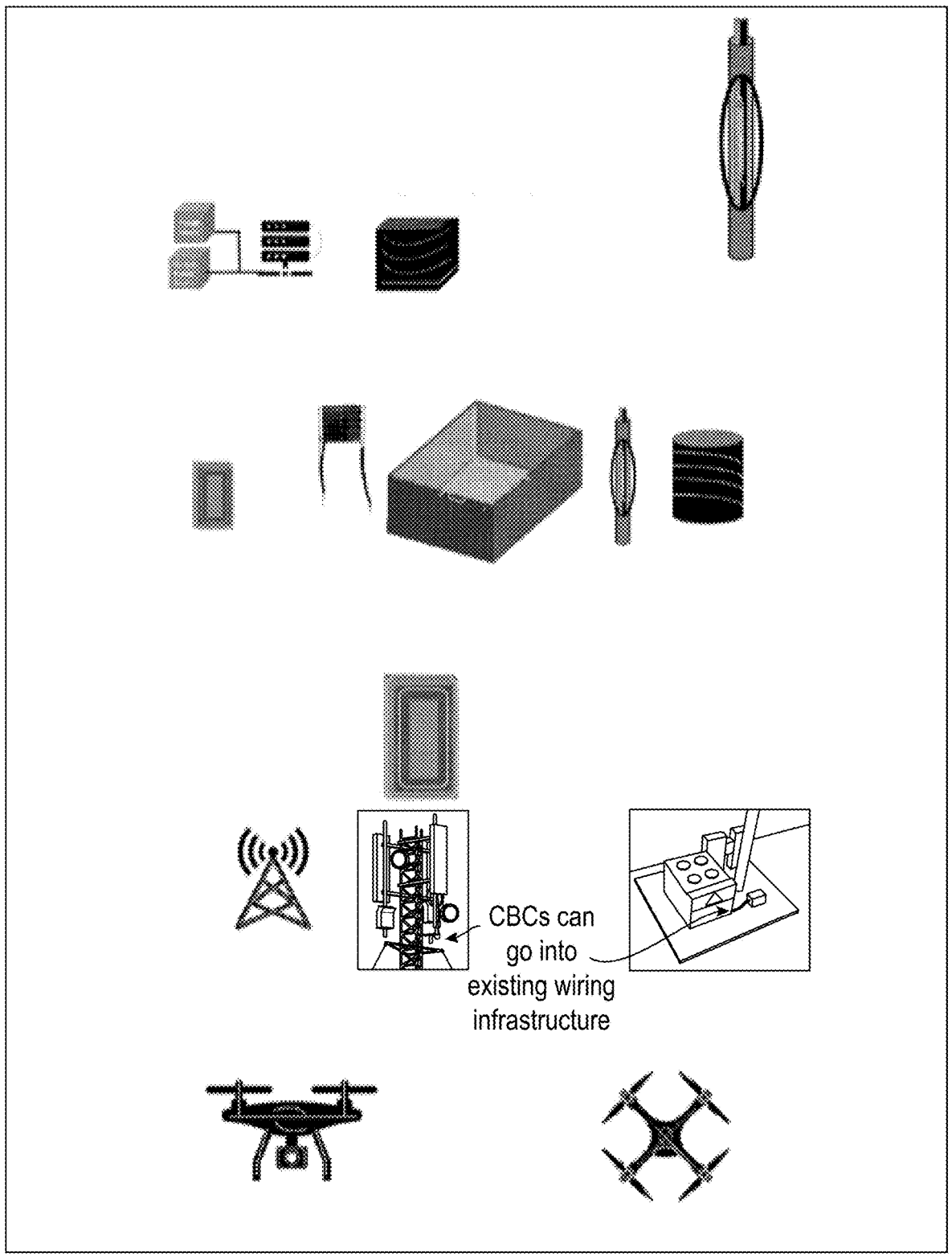
FIG. 43 is a drawing which illustrates possible placements and configurations for a supercapacitor of an embodiment of the present invention for Internet of things, energy harvesting, energy storage, cell tower and telecom equipment, and drones.
Figure 44:
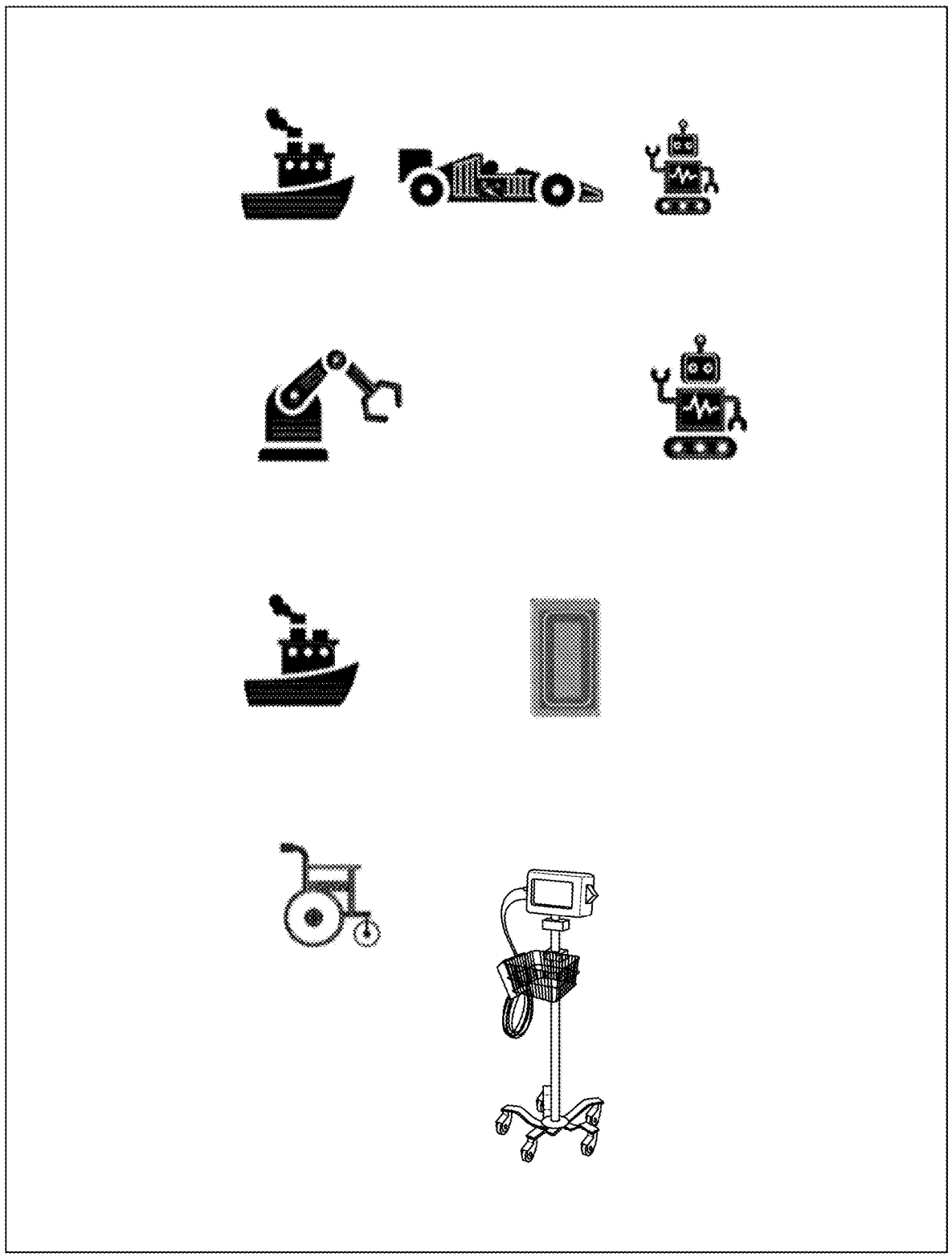
FIG. 44 is a drawing which illustrates possible placements and configurations for a supercapacitor of an embodiment of the present invention for remote controlled cars, boats, toys, robots and marine systems, as well as medical equipment.
Figure 45:
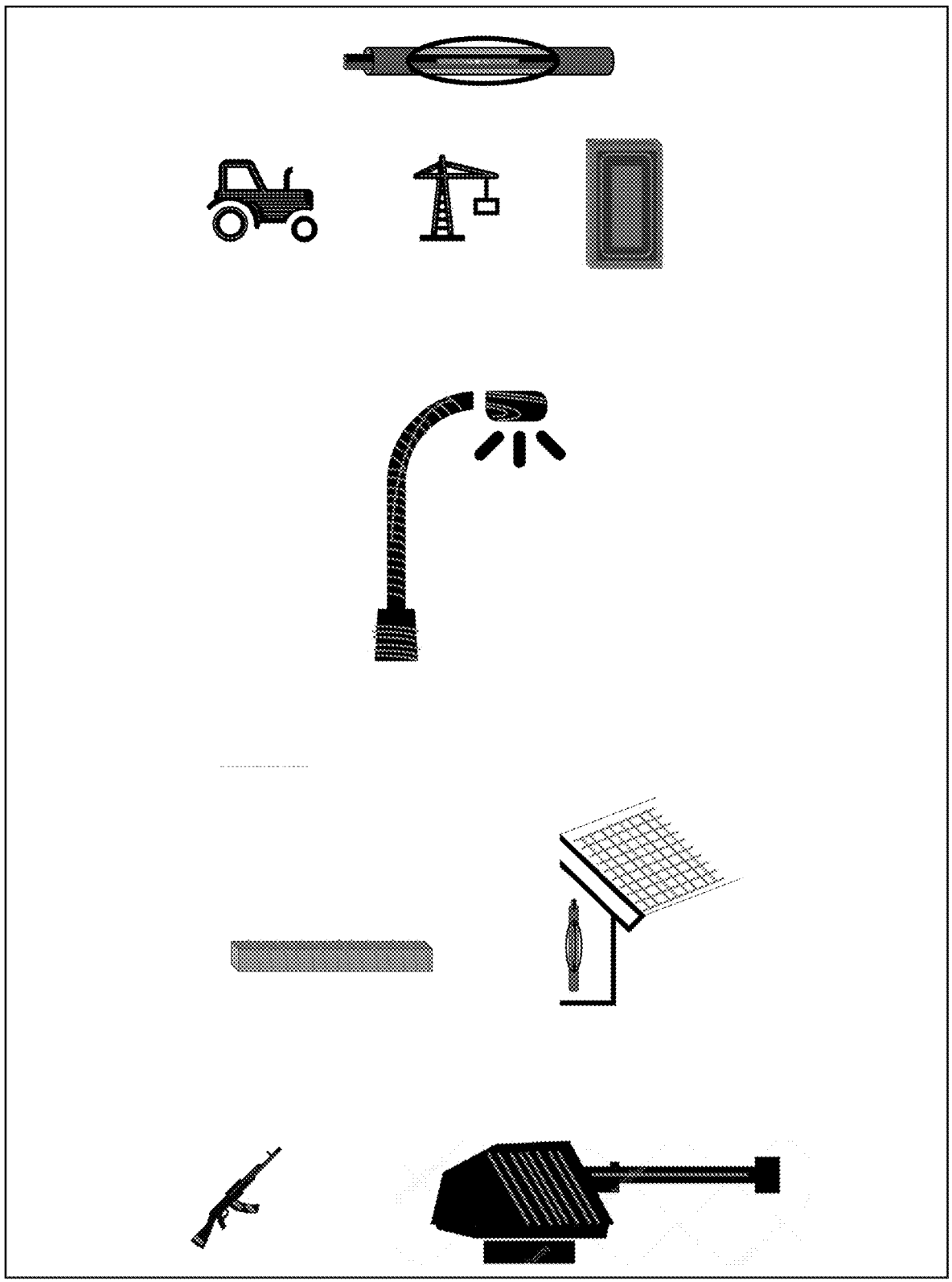
FIG. 45 is a drawing which illustrates possible placements and configurations for a supercapacitor of an embodiment of the present invention for industrial systems, streetlamps, buildings, advanced sensors, remote sensors, smart meters, rail guns and electromagnetic guns.

The following is a brief list of but a few of the applications where supercapacitor 10 can be installed in a circuit to offer a space saving advantage over traditional supercapacitors: 1)
1) camera flash systems;
2) toys and games;
3) memory backup;
4) server backups;
5) telecom product backups;
6) energy harvesting;
7) global-positioning systems;
8) global system for mobile communications;
9) global packet radio service applications;
10) uninterruptable power supplies;
11) industrial settings;
12) wireless alarms;
13) remote and/or advanced meters;
14) scanners;
15) backup power applications;
16) actuators and/or other robotics;
17) emergency lighting;
18) telematics and/or Internet of things ("IoT");
19) security equipment;
20) wearables;
21) exoskeletons;
22) drones;
23) solar power systems;
24) wind turbine systems;
25) renewable energy;
26) automotive systems;
27) peak power applications;
28) radio frequency communications, other communications, and/or radar devices:
29) controllers;
30) power over internet systems;
31) pumps and/or compressors;
32) motors;
33) avionics;
34) marine systems;
35) electric transportation, including but not limited to bullet trains and/or electric planes;
36) electric mobility, including but not limited to electric scooters and/or electric bikes;
37) medical devices and/or implants;
38) wireless connectivity; and/or
39) pulse power applications:

As best illustrated in FIG. 33, wherein a conventional circuit constructed with conventional on-board supercapacitors is compared with a circuit constructed with supercapacitor 10 in its wiring. In this figure, power source 40 connects, with wiring 46 to circuit board 42, which in one embodiment has an existing conventional supercapacitor 44, whereas in the embodiment which uses an embodiment of supercapacitor 10 to connect power source 40 to circuit board 42, the space savings on and/or around circuit board 42 are dramatic and easily visible. Thus, as illustrated in this illustrative figure, in some applications, as may be decided by a user, supercapacitor 10 can be electrically connected to the circuit board, but mechanically installed somewhere else. This provides a more dramatic advantage for certain supercapacitor applications, particularly with regard to space savings.

Supercapacitor 10 can be electrically connected the same way as a traditional supercapacitor, but mechanically installed in another part of the product or system; for example in wiring harnesses, power cords, shoes and other wearables, as well as inside and/or outside of electronics enclosures. This flexibility makes it possible to add supercapacitors to products for additional performance or to add supercapacitors to new products that didn't have space for them previously. This technique is not limited to only large power connections. Instead, supercapacitors 10, can be formed as small interconnecting wires, which can be used to make electrical connections to specific parts of the circuit board and/or to one or more individual components or groups thereof. Optionally, if large capacitance is needed between specific parts of a circuit board or components thereof, a connection, which can include for example a PCB trace, can be connected to supercapacitor 10, which itself can be entirely or partially disposed and/or connected separate from the PCB.

Although the term "filament" is used to refer to the various conductive and/or non-conductive materials that are used to bind things together in this application, the term "filament" can include any elongated structure which is capable of being wrapped, in a spiral, around the desired component(s). Note that in the specification and claims, "about" or "approximately" means within twenty percent (20%) of the amount or value given.

INDUSTRIAL APPLICABILITY

The invention is further illustrated by the following non-limiting examples.

Example 1

The inventive method was used to create an about 100 millimeters ("mm") long, about 4 mm wide coaxial cable energy storage device with about 25-50 mm long terminal leads on each end. Components included: about 0.02" diameter nickel wire (core wire), $MnO_2$-impregnated Ni foam (cathode), about 0.01" diameter nickel wire (conductive filament), cotton tissue or wipe (separator), sewing thread (nonconductive filament), activated carbon impregnated Ni foam (anode), about 0.02" nickel wire (second terminal core wire), about 0.01" diameter nickel wire (conductive filament), about ⅛" diameter 2:1 shrink ratio heat shrink polymer tubing, about 3/16" diameter 2:1 shrink ratio heat shrink polymer tubing, solid transfer tape adhesive [PLIB-HMA30, MTI Corp, 860 S. 19th Street, Richmond, CA 94804-3809], and $NaClO_4$ aqueous electrolyte. The central core was about 200 mm in length of about 0.02" diameter nickel wire (alternatively, Ni clad Cu wire is acceptable).

A cathode was made by impregnating Ni foam with $MnO_2$ powder (the foam was coated, using a traditional slurry coating method, with a slurry containing $MnO_2$ nanoparticles, with about 10% conductive carbon, about 5% multiwall carbon nanotube, about 5% PVDF dissolved in NMP solvent; cured at about 200° C., and calendared to a thickness of about 50 μm]. A strip of about 100 mm×about 5 mm of this $MnO_2$ cathode was wrapped around the core wire, leaving about 50 mm of the core wire extending on either end. The cathode was secured to the core wire by over wrapping (winding) with about 0.01" diameter nickel wire along the entire length, so that the cathode was secured to the core wire ensuring a good electrical connection.

A cotton separator of about 110 mm in length was wrapped around the secured cathode material and secured in place by winding over with fine sewing thread. The thread was only wrapped/wound on top of the separator. Before wrapping the anode onto the cell, one end of the core wire was cut off to prevent a potential short circuit (optionally, such cut can be placed on the core wire—most preferably just past the end of the separator). A short length of about ⅛" diameter 2:1 shrink ratio heat shrink tubing was placed on both ends of the cell. The heat shrink encapsulated the separator and the cathode inside. A length of about 90 mm long activated carbon coated Ni foam anode material (this was also made using traditional slurry coating method, with a slurry containing activated carbon, with about 10% conductive carbon, about 5% multiwall carbon nanotube, about 5% PVDF dissolved in NMP solvent; cured at about 200° C. and calendared to a thickness of about 50 μm) was wrapped around the middle of the separator between the two pieces of heat shrink tubing.

A length of about 0.02" diameter nickel wire formed the second terminal. It ran along the length of the anode material and extended past the body of the cell on the side that the core wire was cut, thereby forming the terminal on that end of the device. The anode material was wrapped with about 0.01" diameter nickel wire that continued to the end of the second terminal wire. The device was placed inside an about 3⁄16" diameter 2:1 shrink ratio heat shrink tube and one terminal was partially secured (one side of the heat shrink) and adhesives were disposed around that end. An aqueous electrolyte was fed into the opposite (open) end and allowed to stand so the cotton separator absorbed the electrolyte. Finally, the remaining heat shrink was closed and adhesive was placed on the second end.

Example 2

Figure 12:
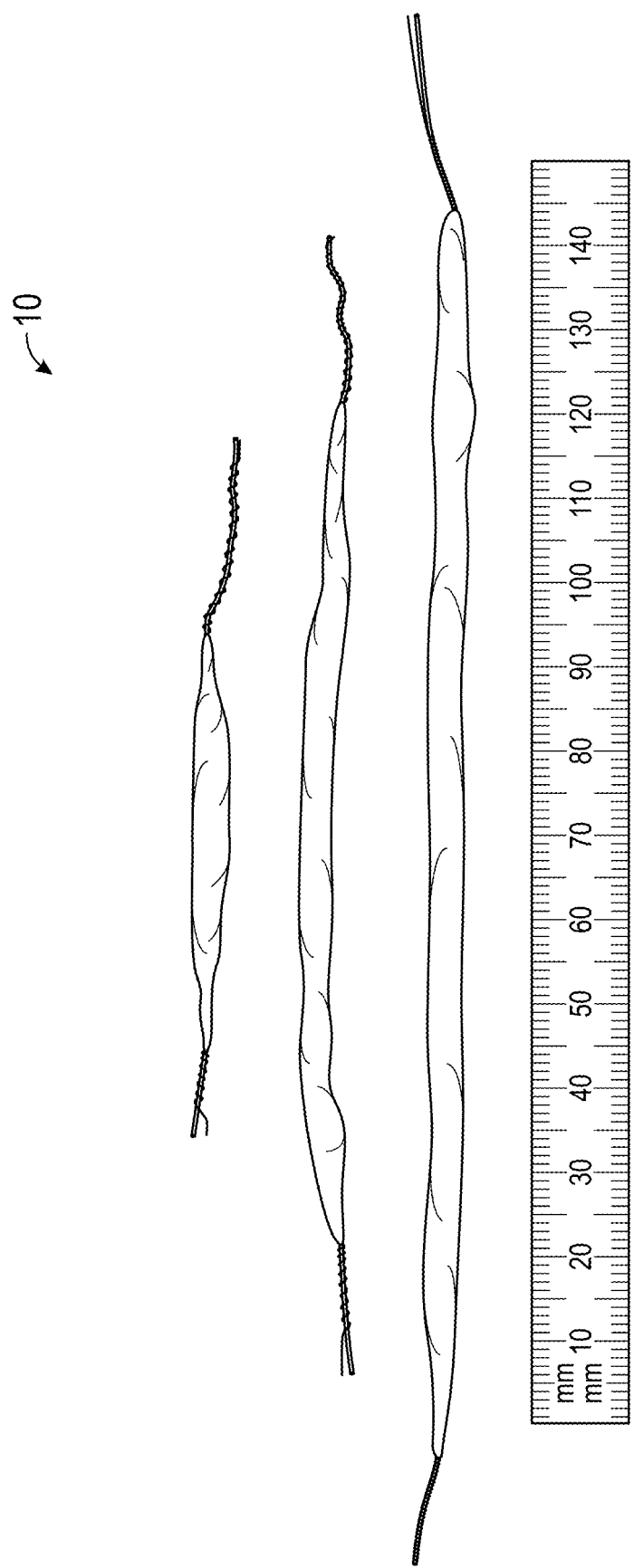
FIG. 12 is a drawing which illustrates Ni wire/Ni-mesh/$MnO_2$/Ni-mesh/Activated carbon supercapacitors, with water based $Na_2SO_4$ electrolyte that were manufactured according to an embodiment of the present invention.

As best illustrated in the sample of finished products illustrated in FIG. 12, a plurality of asymmetric cable supercapacitors 10 were manufactured in lengths of about 1 cm to about 10 cm long "$MnO_2$/Activated carbon" using manufacturable processes. The supercapacitors, independent of length, had an average capacitance of about 200 mF/cm. When water based $Na_2SO_4$ electrolyte was used, a single supercapacitor was able to be charged up to about 1.6 V. Higher voltage, about n×1.6 V, was able to be achieved by connecting the supercapacitors in series, where n was the number of supercapacitors in series. When super saturated water based $NaClO_4$ electrolyte was used, a single cable supercapacitor was able to be charged up to about 2.2 V. At about 100 mA charge/discharge current, the cable supercapacitor was tested for about 30,000 cycles, which it successfully achieved with about 70% capacity retention. The supercapacitor was able to be bent, coiled-up, and twisted without affecting its performance. The cable supercapacitor was also shown to have a very low self-discharge.

Figure 13A:
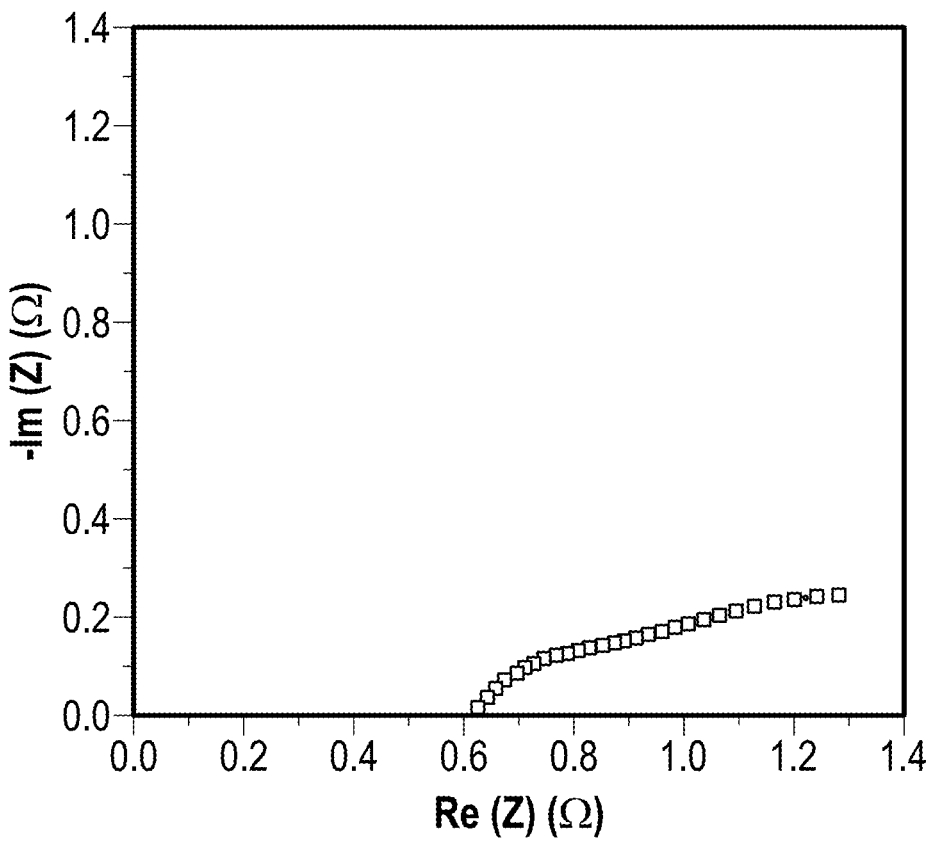
FIGS. 13A and 13B are graphs which respectively illustrate AC impedance measurements and capacitance-voltage profiles for a Ni wire/Ni foam/$MnO_2$/Ni foam/Activated carbon supercapacitor, with water based $Na_2SO_4$ electrolyte, and length of about 5 centimeters ("cm") according to an embodiment of the present invention.
Figure 13B:
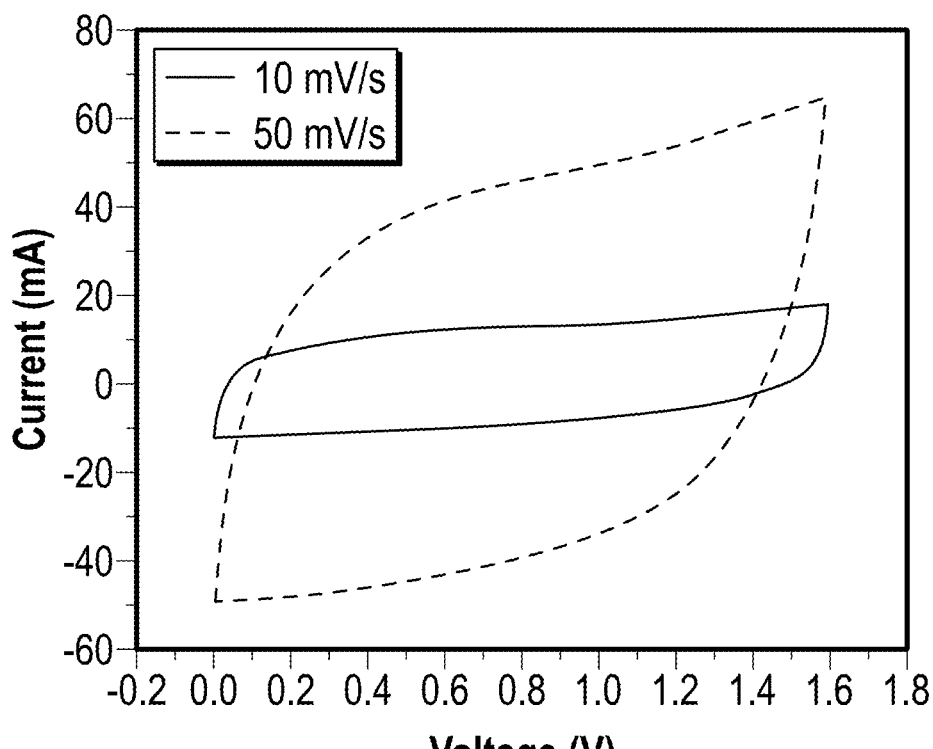

The AC impedance measurement plot or the Nyquist plot of FIG. 13A shows that the supercapacitor resistance is about 0.3 Ohm for a supercapacitor constructed according to the teachings of an embodiment of the present invention. The CV plot of FIG. 13B shows a curve that is rectangular in shape, typical of an ideal supercapacitor. FIG. 13B also shows that the supercapacitor can be charged up to 1.6 V.

Figure 14A:
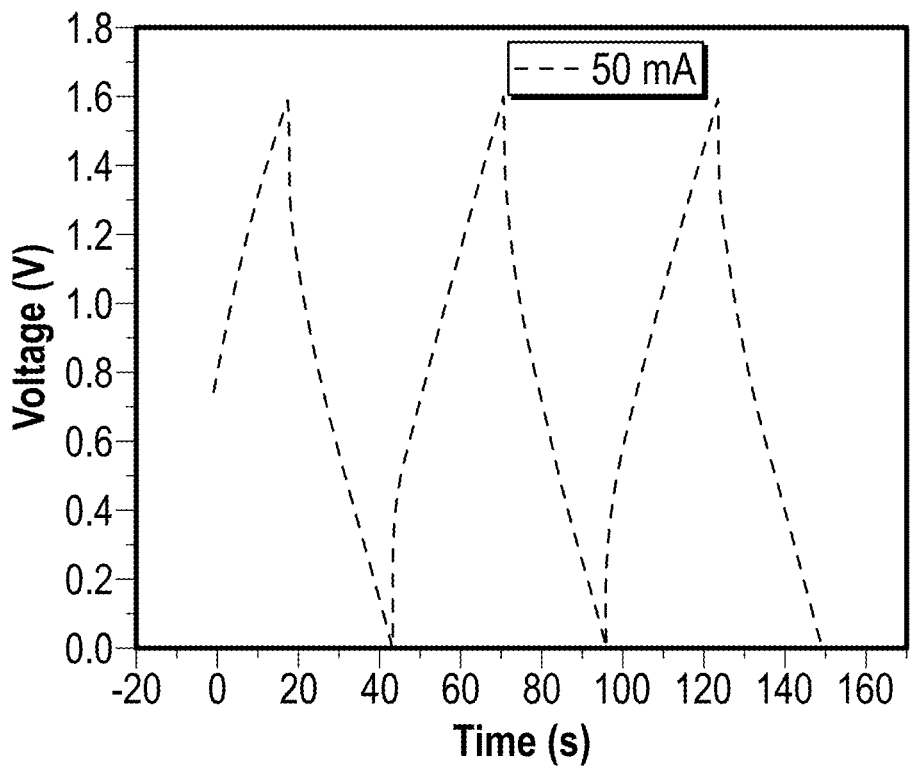
FIGS. 14A and 14B are graphs which respectively illustrate galvanostatic charge/discharge cycles for an approximately 5 cm long supercapacitor according to an embodiment of the present invention at a charge/discharge current of about 50 mA (FIG. 14A) and at a charge/discharge current of about 10 milliamps ("mA") (FIG. 14B)
Figure 14B:
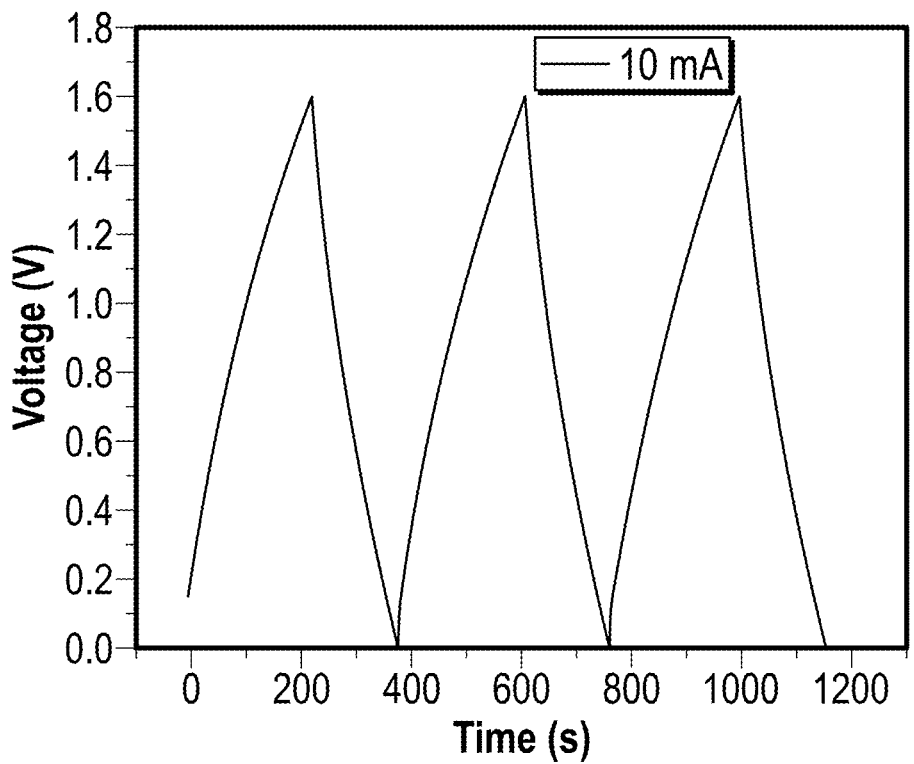

FIG. 14A shows a representative charge/discharge voltage profile for the cable supercapacitors 10 of this example, over several cycles at about 50 mA. FIG. 14B is the charge/discharge voltage profile over several cycles of the same supercapacitor at 10 mA. The capacitance at about 50 mA was calculated to be about 812 mF, which is about 162 mF/cm, and that at about 10 mA is about 1187 mF, which is about 240 mF/cm. The charge/discharge Coulombic efficiency in both cases is about 100% when the supercapacitor is charged up to about 1.6 V and discharge to 0 V. All these performances compared favorably to the best standard supercapacitors in the market today. Other supercapacitors were also manufactured and all of them had similar performance, indicating that the fabrication processes are highly reproducible.

Also fabricated were about 1 cm long and about 10 cm long "Ni wire/Ni foam/$MnO_2$/Ni foam/Activated carbon" cable supercapacitors with water based $Na_2SO_4$ electrolyte. FIGS. 15A, 15B, 16A, and 16B summarize test results of the about 1 cm long supercapacitor constructed in this Example 2, while FIGS. 17A, 17B, 18A, and 18B summarize test results of the about 10 cm long supercapacitor constructed in this Example 2.

Figure 15A:
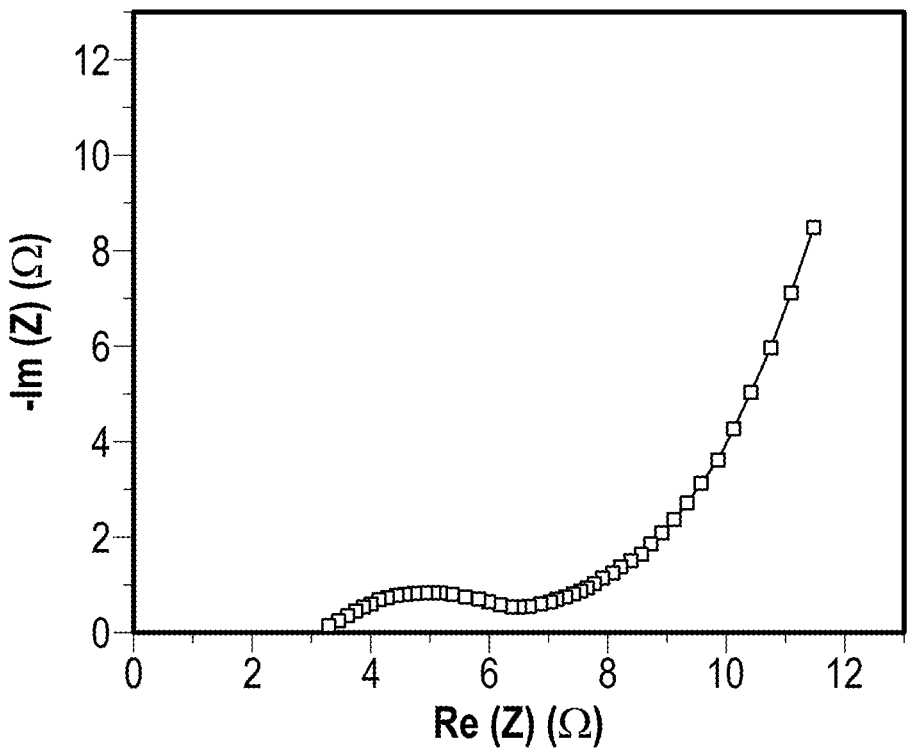
FIGS. 15A and 15B are graphs which respectively illustrate AC impedance measurements and capacitance-voltage profiling for a Ni wire/Ni foam/$MnO_2$/Ni foam/Activated carbon supercapacitor with water based $Na_2SO_4$ electrolyte, and length of about 1 cm of an embodiment of the present invention.
Figure 15B:
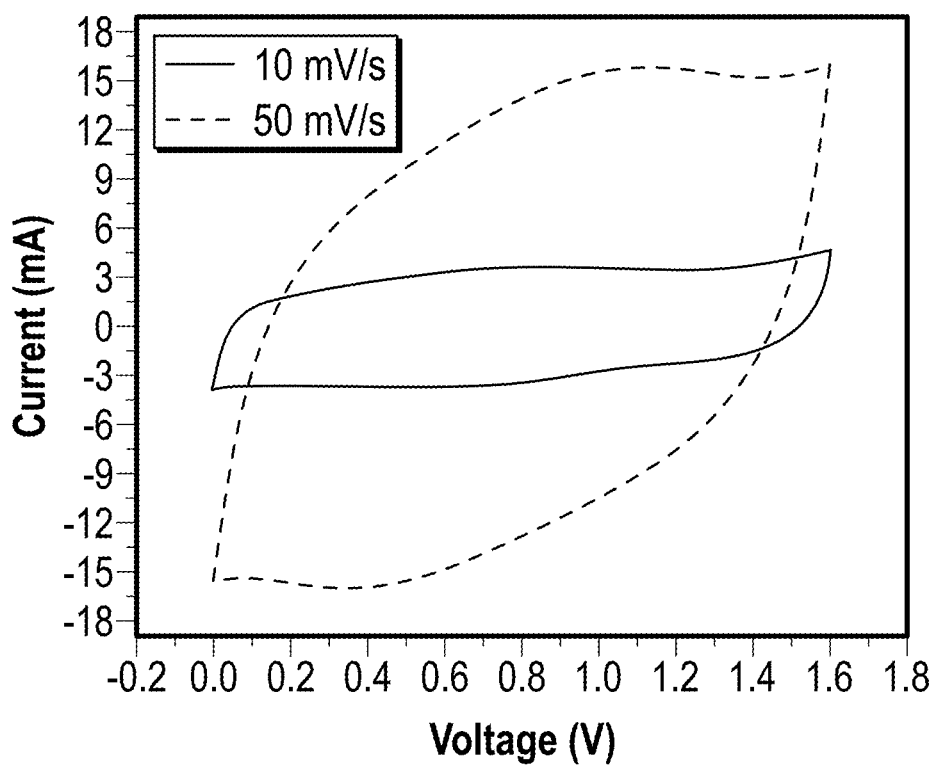

While the equivalent series resistance ("ESR") from FIG. 15A for 1 cm long supercapacitor is about 3.3 Ohm, the CV voltammogram of FIG. 15B still maintains the ideal capacitor shape observed in FIG. 13B.

Figure 16A:
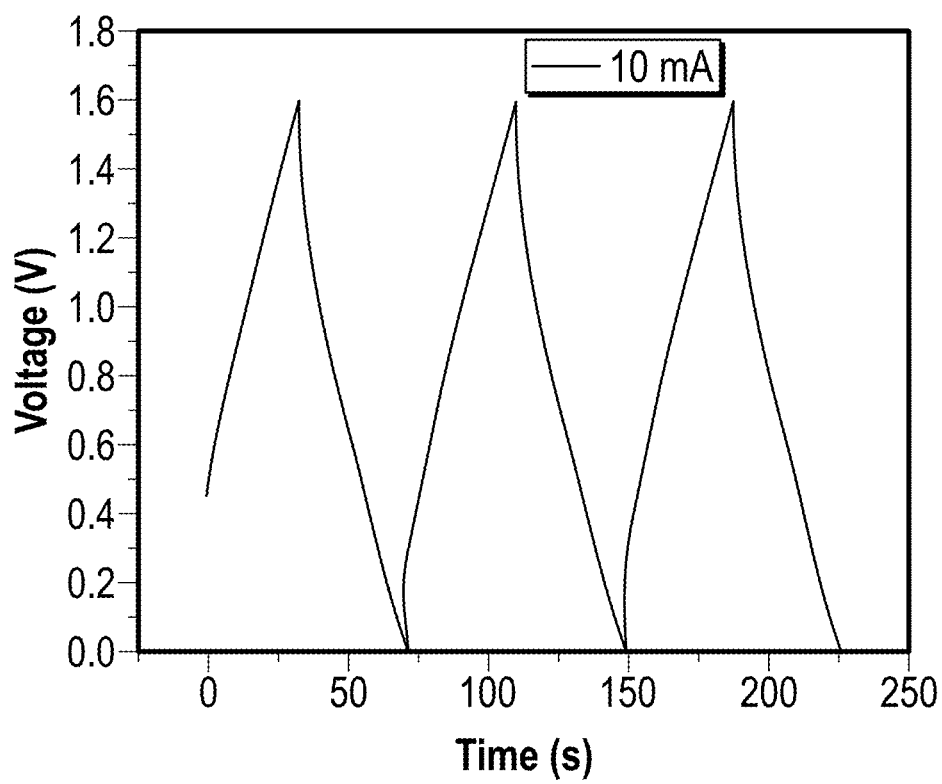
FIGS. 16A and 16B are graphs which respectively illustrate galvanostatic charge/discharge cycles for an approximately 1 cm long supercapacitor of an embodiment of the present invention at a charge/discharge current of about 10 mA (FIG. 16A) and at a charge/discharge current of about 5 mA (FIG. 16B)
Figure 16B:
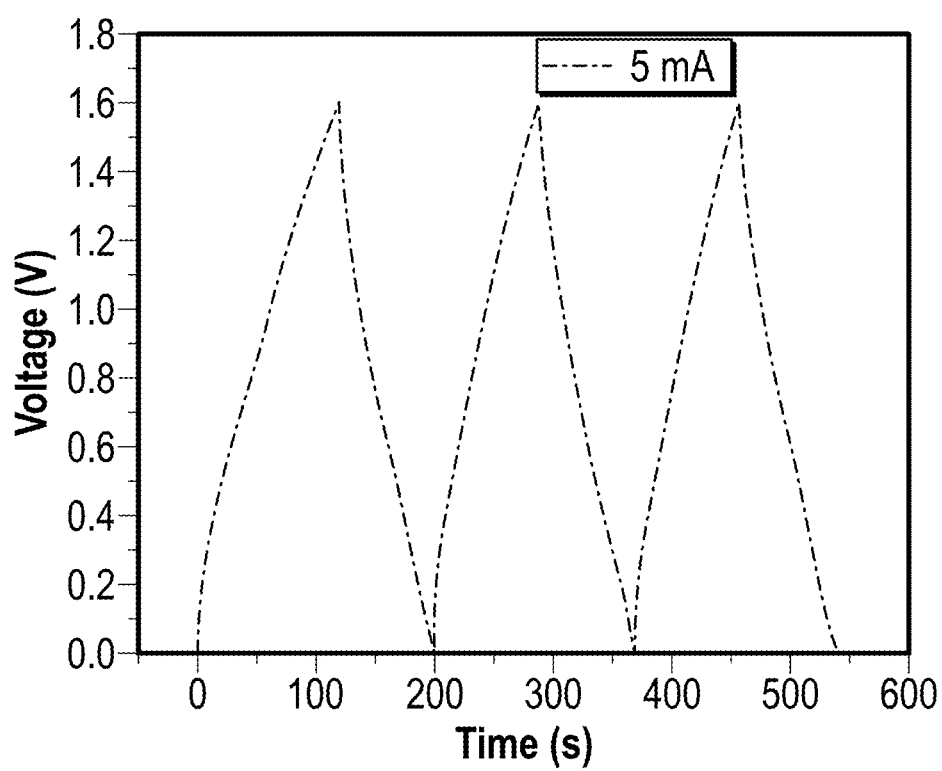

The charge/discharge cycles of FIGS. 16A and 16B indicate that the capacitance of the about 1 cm long supercapacitor is about 237 mF/cm when the charge/discharge current is about 10 mA, and about 265.5 mF/cm when the charge/discharge current about 5 mA.

Figure 17A:
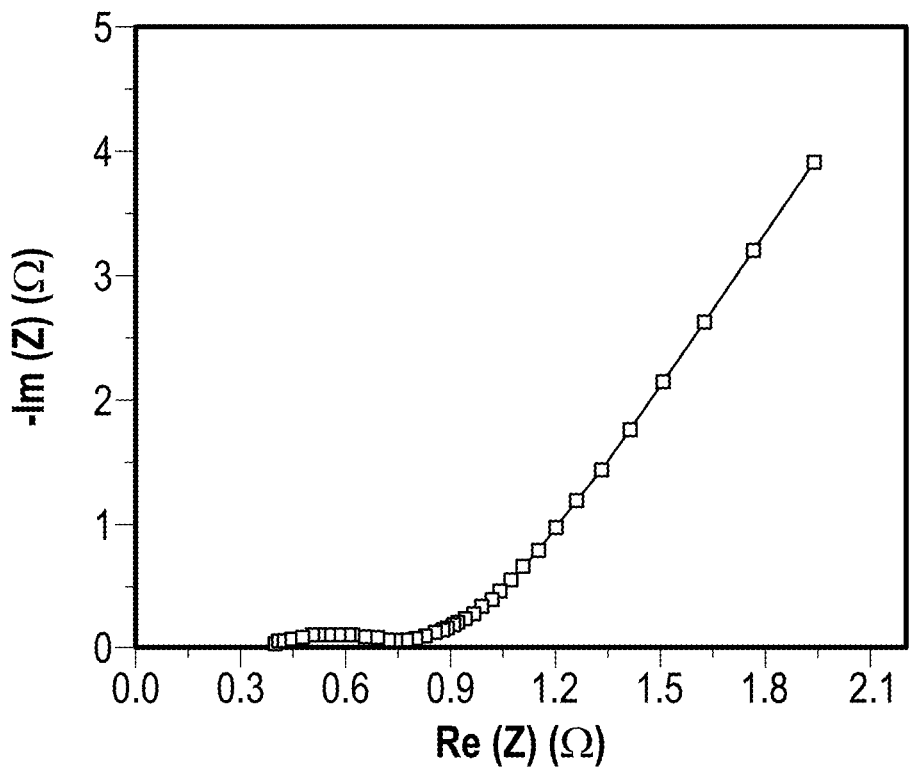
FIGS. 17A and 17B are graphs which respectively illustrate AC impedance measurements and capacitance-voltage profiling for a Ni wire/Ni foam/$MnO_2$/Ni foam/Activated carbon supercapacitor, with water based $Na_2SO_4$ electrolyte, and length of about 10 cm according to an embodiment of the present invention.
Figure 17B:
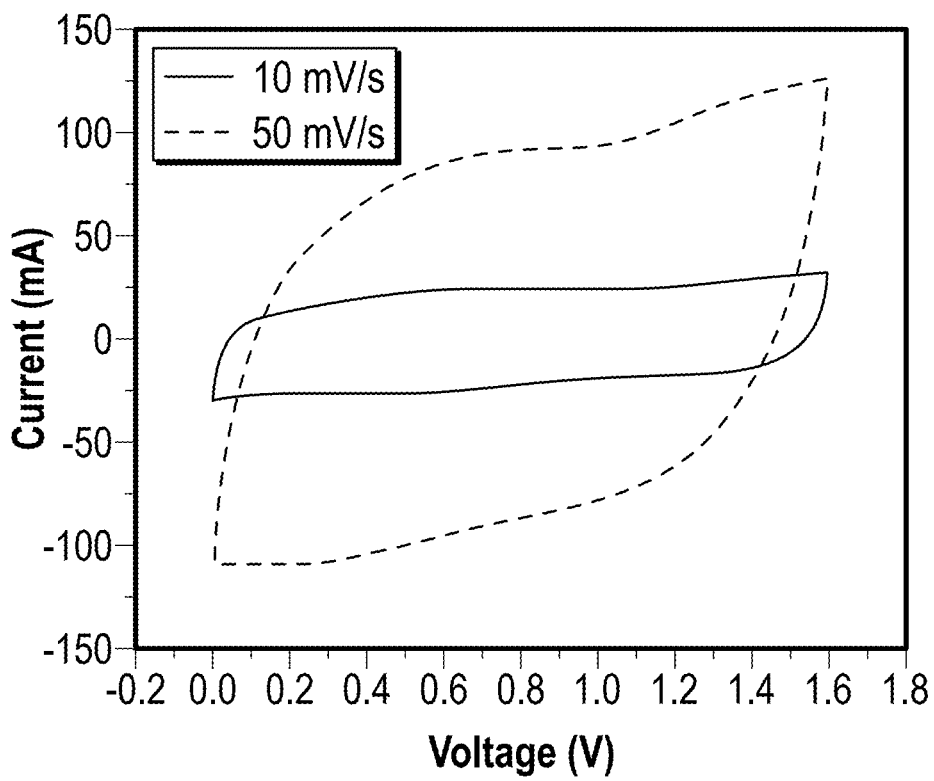
Figure 18A:
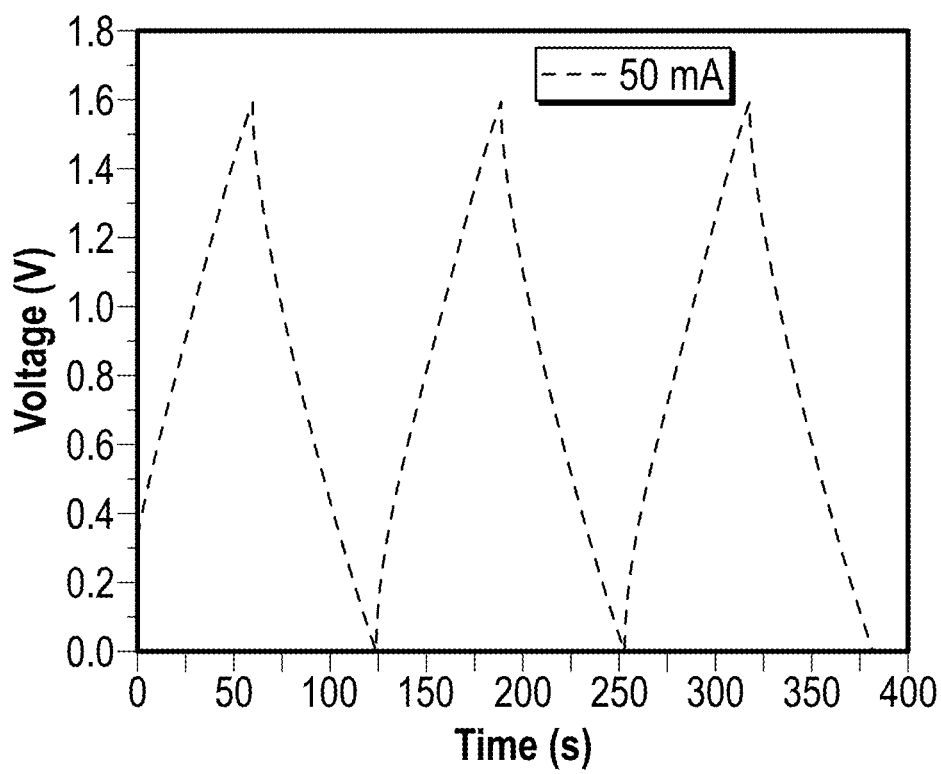
FIGS. 18A and 18B are graphs which respectively illustrate galvanostatic charge/discharge cycles for a 10 cm long supercapacitor according to an embodiment of the present invention at a charge/discharge current of about 50 mA (FIG. 18A) and at a charge/discharge current of about 10 mA (FIG. 18B)
Figure 18B:
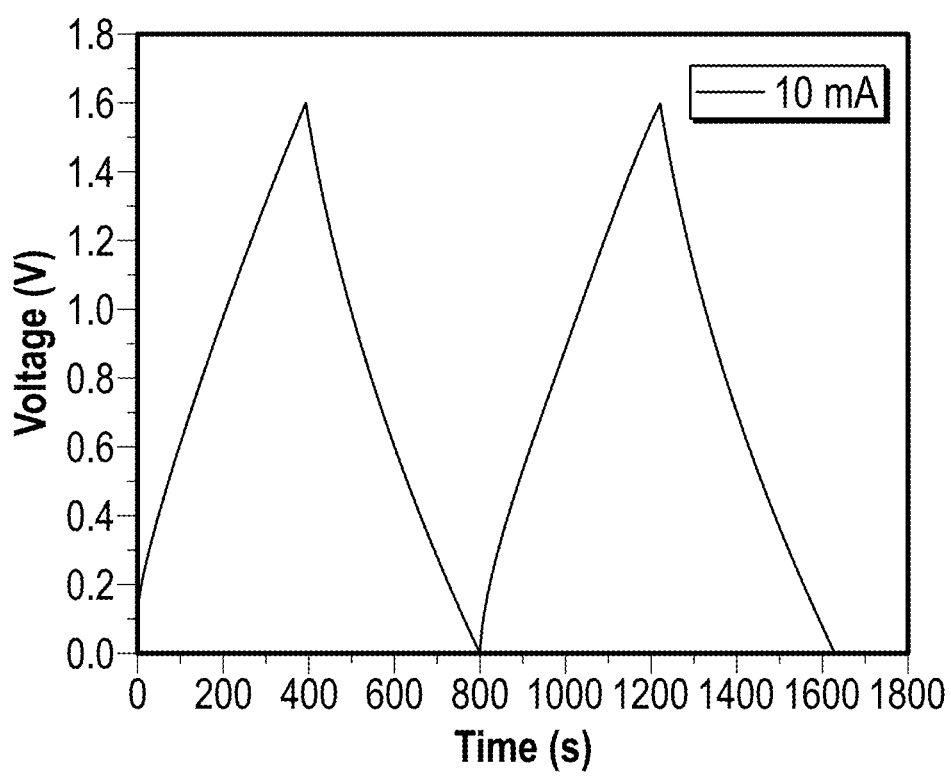

For the about 10 cm long supercapacitor, FIG. 17A illustrates that the ESR is about 0.255 Ohm. The cyclic voltammograms of FIG. 17B still maintains the rectangular shape.

The capacitance of the about 10 cm long supercapacitor is about 200 mF/cm if the charge/discharge current is about 50 mA; and about 254.3 mF/cm if the charge/discharge current is about 10 mA. All these results attest to the reproducibility of the manufacturing process described in this application.

It is noted that the ESR of about 5 cm and about 10 cm long supercapacitors are below about 1 Ohm, while that of the 1 cm long supercapacitor is above about 1 Ohm. This may be due to some parasitic resistance that are more dominant at low supercapacitor lengths. It was therefore decided to find the threshold length at which the parasitic effect drops off. To do this, supercapacitors of approximately 1 cm, 2 cm, 3 cm, and 4 cm in length were constructed and tested. The table of FIG. 19 summarizes these test results.

The ESR appears to strongly decrease with increase in length of the supercapacitor. The ESR of an approximately 2 cm long supercapacitor was found to be about half of that of an approximately 1 cm long supercapacitor. The ESR did not fall below 1 Ohm until the supercapacitor was about 5 cm long.

The table of FIG. 20 summarizes the test results of the constructed single "Ni wire/Ni foam/MnO$_2$/Ni foam/Activated carbon" supercapacitors with water based Na$_2$SO$_4$ electrolyte. These supercapacitors were rated at about 1.6 V. The results summarized in the table of FIG. 20 attest to reproducibility of a construction method of an embodiment of the present invention.

A high surface area Ni foam was used as the substrate, a composite of MnO$_2$ nanoparticles was used as the cathode material, and a composite of activated carbon nanoparticles was used as the anode material, in order to fabricate asymmetric cable-based supercapacitor, with performance similar to supercapacitors in the market, using scalable processes. The new cable-based supercapacitor thus allows miniaturization of power electronic devices.

Example 4

The cable-based supercapacitor was found to be able to operate at voltages higher than about 1.6V when the water based Na$_2$SO$_4$ electrolyte was replaced with super saturated water based NaClO$_4$ electrolyte, water-based sodium bis (fluorosulfonyl)imide (NaFSI) electrolyte, and almost all organic solvent-based electrolytes. However, the used of organic solvent-based electrolyte adds a complexity to how the supercapacitors are built and a safety concern. This is because organic solvents are moisture sensitive, requiring the supercapacitors to be assembled in a moisture free room, or glove box. Organic solvents are also flammable, thus cable supercapacitors constructed with such organic solvents are preferably handled with extra care.

Figure 21:
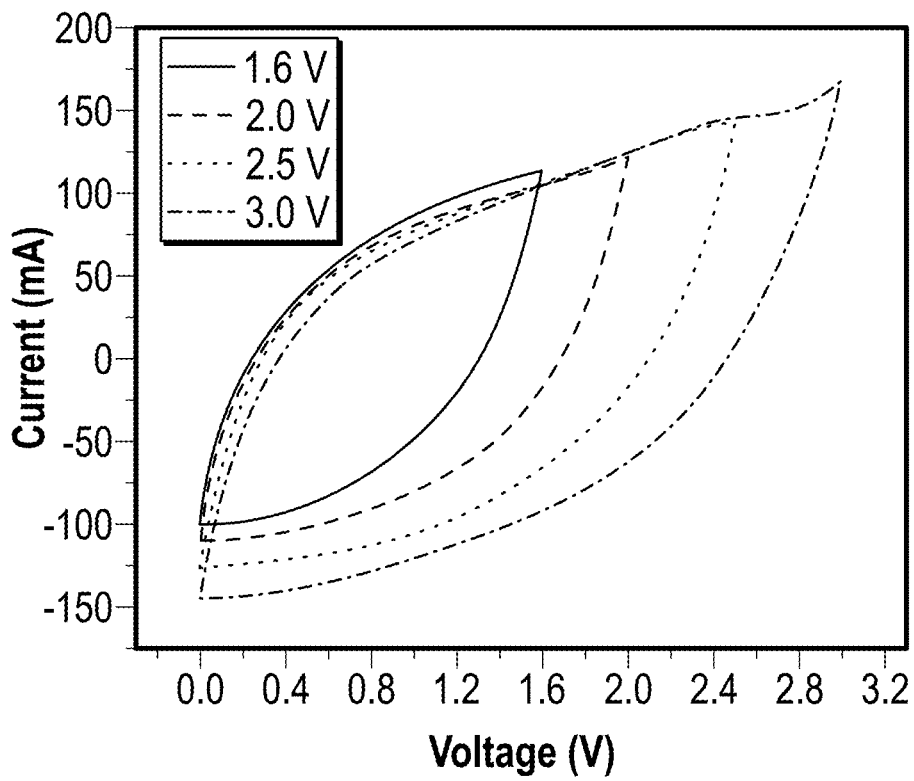
FIG. 21 is a graph which illustrates a capacitance-voltage profile of a 5 cm long Ni wire/Ni foam/$MnO_2$/Ni foam/Activated carbon supercapacitor with super saturated water based $NaClO_4$ electrolyte constructed to an embodiment of the present invention for voltages of about 1.6 volts ("V"), 2.0 V, 2.5 V, and 3.0 V.

We therefore evaluated the use of super saturated water based NaClO$_4$ electrolyte on "Ni wire/Ni foam/MnO$_2$/Ni foam/Activated carbon" supercapacitors. The CV scan with respect to different voltages is illustrated in FIG. 21.

Figure 22A:
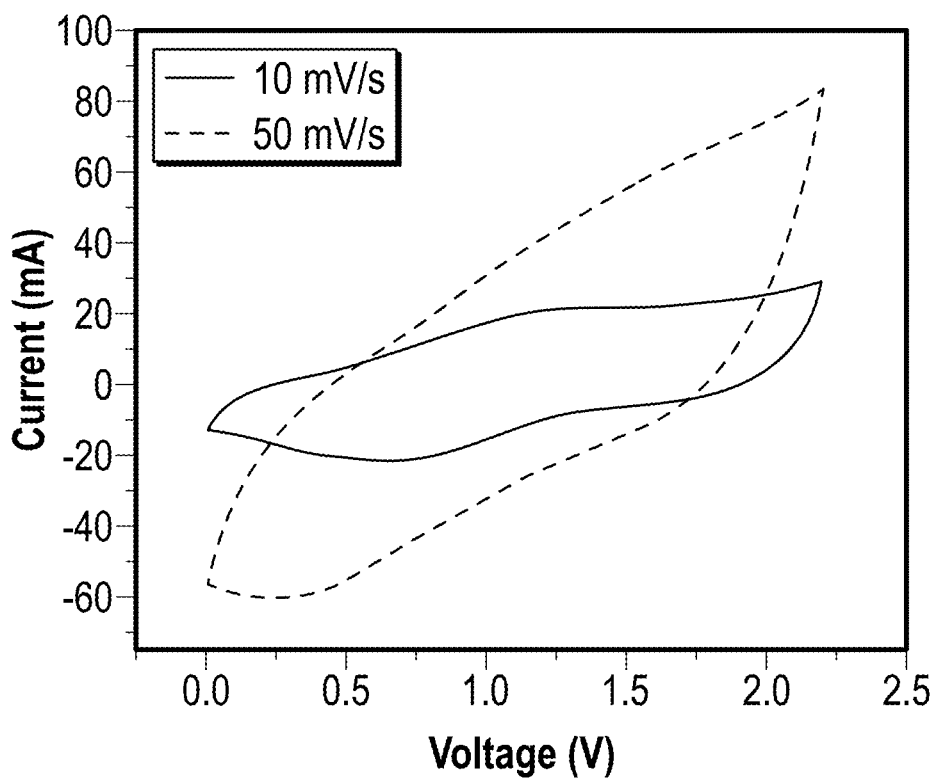
FIGS. 22A and 22B are graphs which respectively illustrate capacitance-voltage profile and a galvanostatic charge/discharge test at 10 mA for a 5 cm long Ni wire/Ni foam/$MnO_2$/Ni foam/Activated carbon cable supercapacitor, with super saturated water based $NaClO_4$ electrolyte according to an embodiment of the present invention.

Onset of rapid rise in current is observed at about 2.5 V, while the CV curves for about 1.6 V and about 2.0 V appears normal. The galvanostatic charge/discharge experiments carried out show that the cell could be cycled at about 2.2 V with acceptable coulombic efficiency as illustrated in FIGS. 22A and 22B.

Figure 22B:
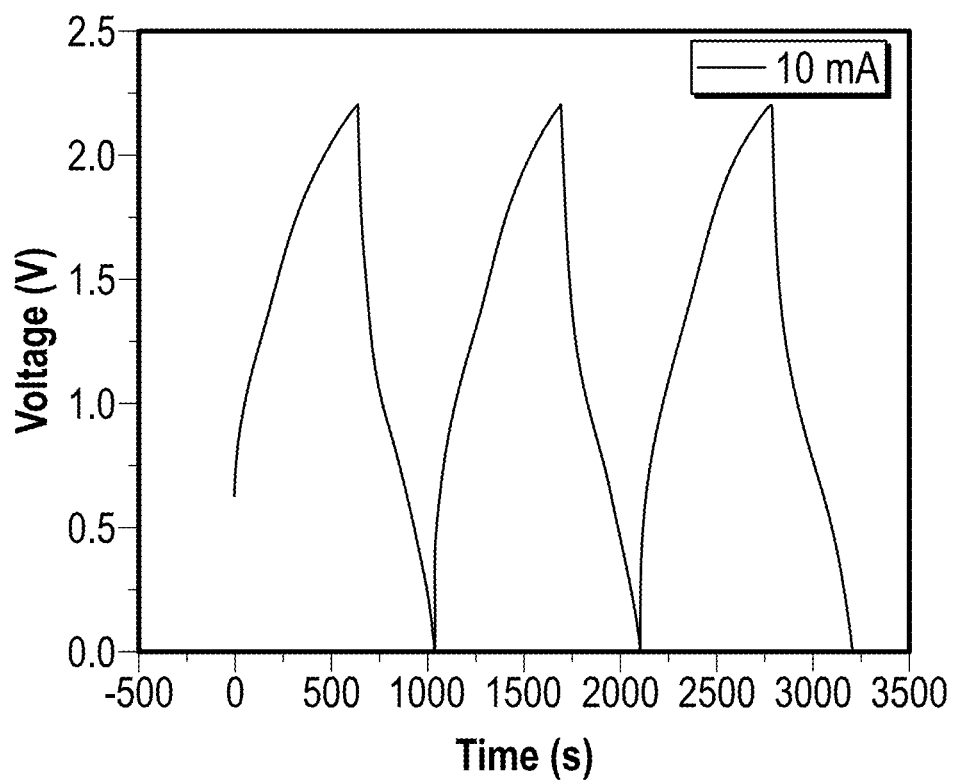

The calculated capacitance from FIG. 22B is about 1886 mF. Most supercapacitors fabricated with super saturated water based NaClO$_4$ electrolyte showed an average linear capacitance that was more than about 350 mF/cm.

Example 3

Figure 23:
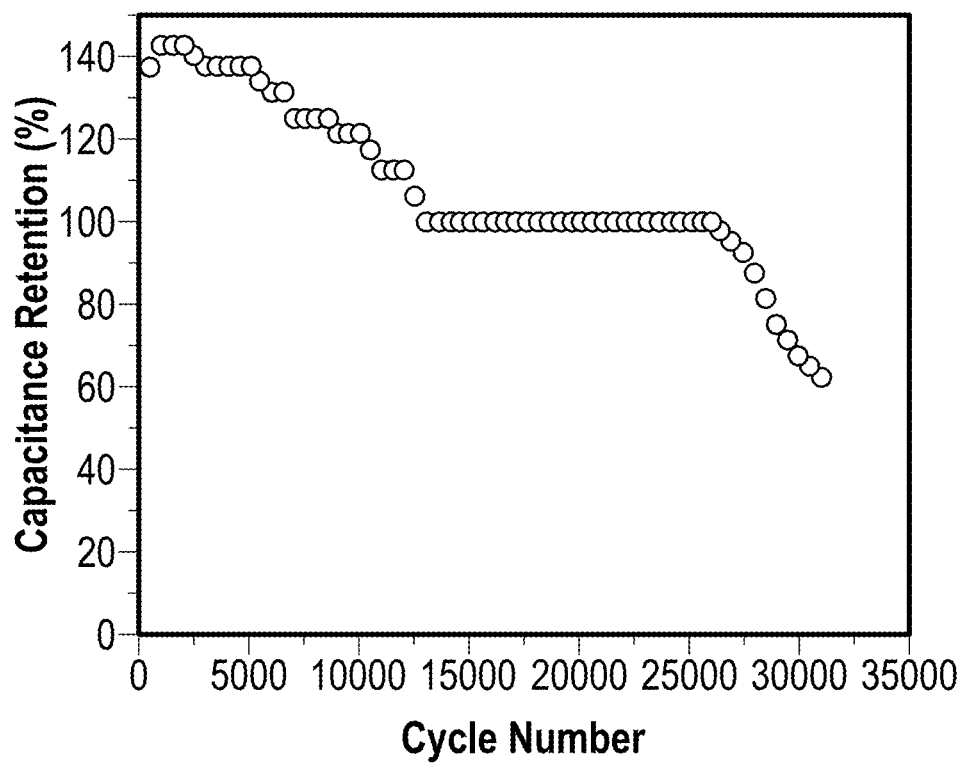
FIG. 23 is a graph which illustrates a life cycle for a supercapacitor constructed according to an embodiment of the present invention at about a 100 mA charge/discharge current.

FIG. 23 illustrates the capacitance retention of an approximately 5 cm long supercapacitor that was subjected to an approximately 100 mA charge/discharge current. The graph of FIG. 23 shows about 70% capacitance retention after about 30,000 cycles.

Example 4

Figure 24:
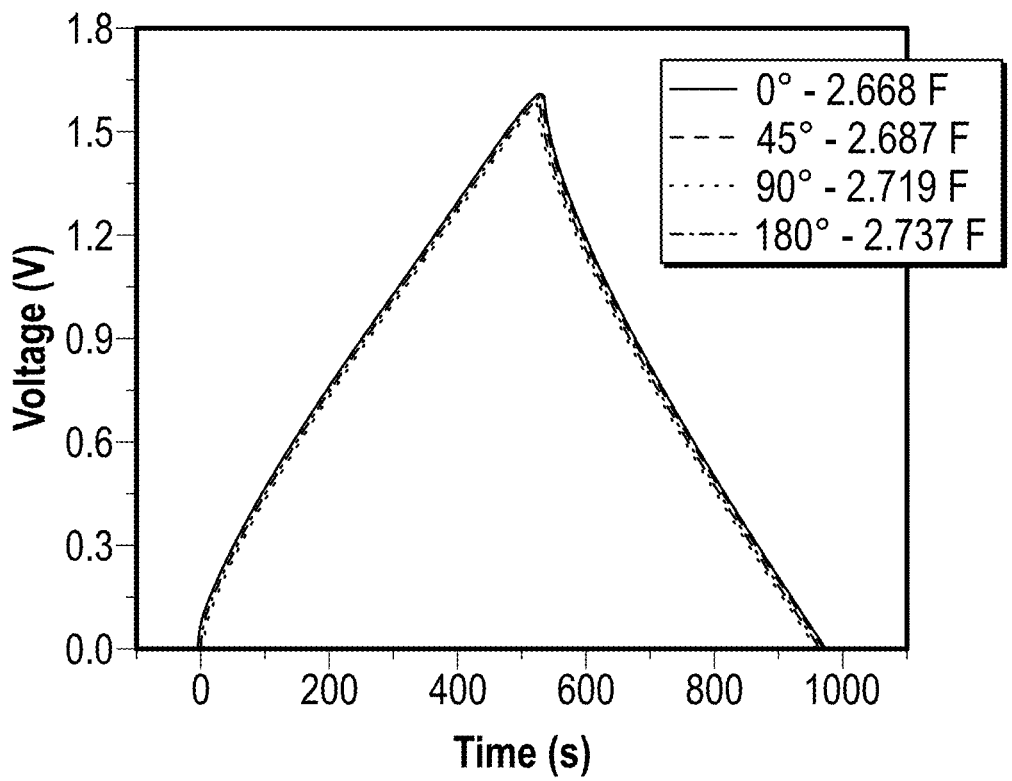
FIG. 24 is a graph which illustrates galvanostatic charge/discharge cycles of a 10 cm long supercapacitor, according to an embodiment of the present invention, at different bending angles.

The supercapacitor was bent at different angles from about 0° to about 180° and the charge/discharge was carried out at about 10 mA. FIG. 24 summarize the test results. The calculated capacitance of the supercapacitor at each bent condition, also illustrated in FIG. 24, shows almost no change in value.

Figure 25:
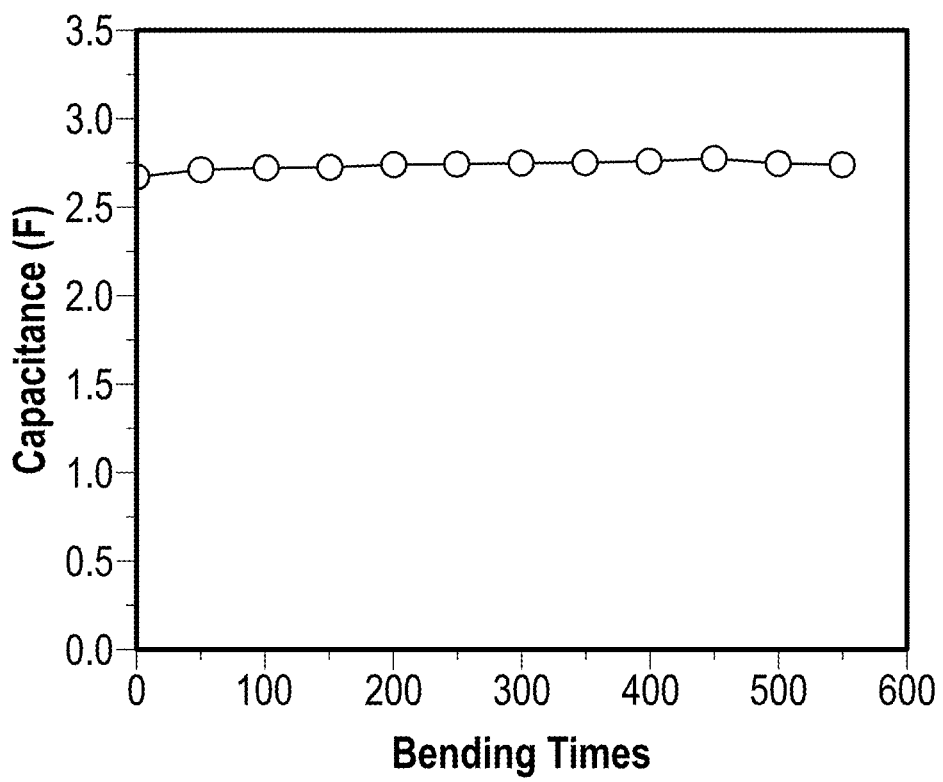
FIG. 25 is a graph which illustrates supercapacitor capacitance retention as function of the number 180-degree bending operations for an approximately 10 cm long cable constructed according to an embodiment of the present invention.
Figure 27A:
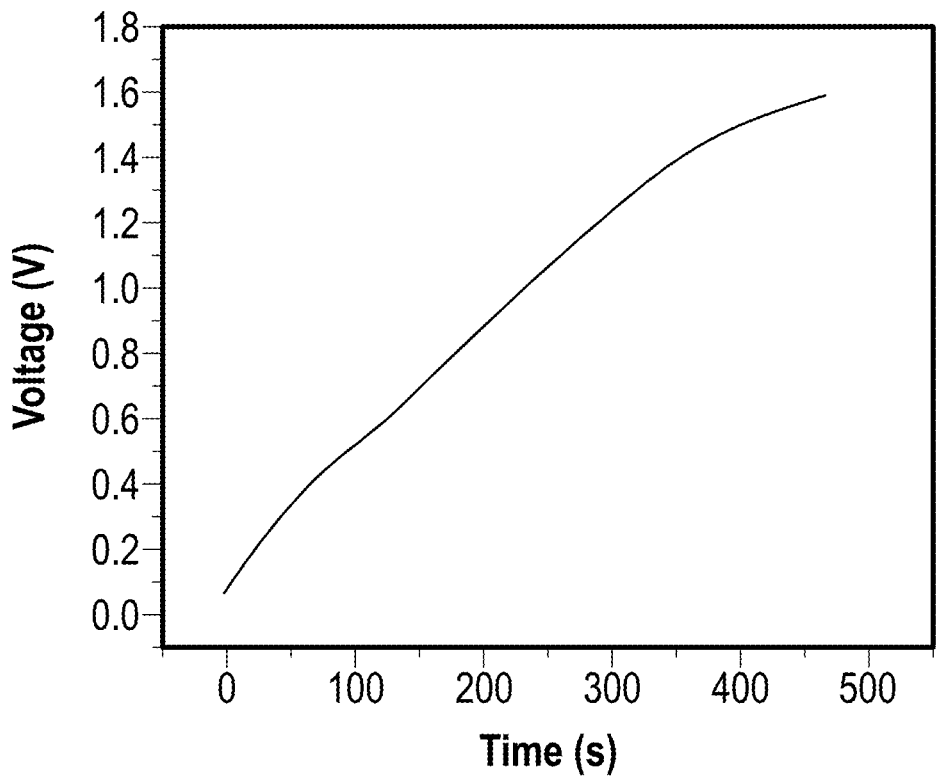
FIGS. 27A and 27B are graphs which respectively illustrate charging of a cable supercapacitor up to about 1.6 V and a graph of the open circuit voltage of the supercapacitor after the charging source has been removed.
Figure 27B:
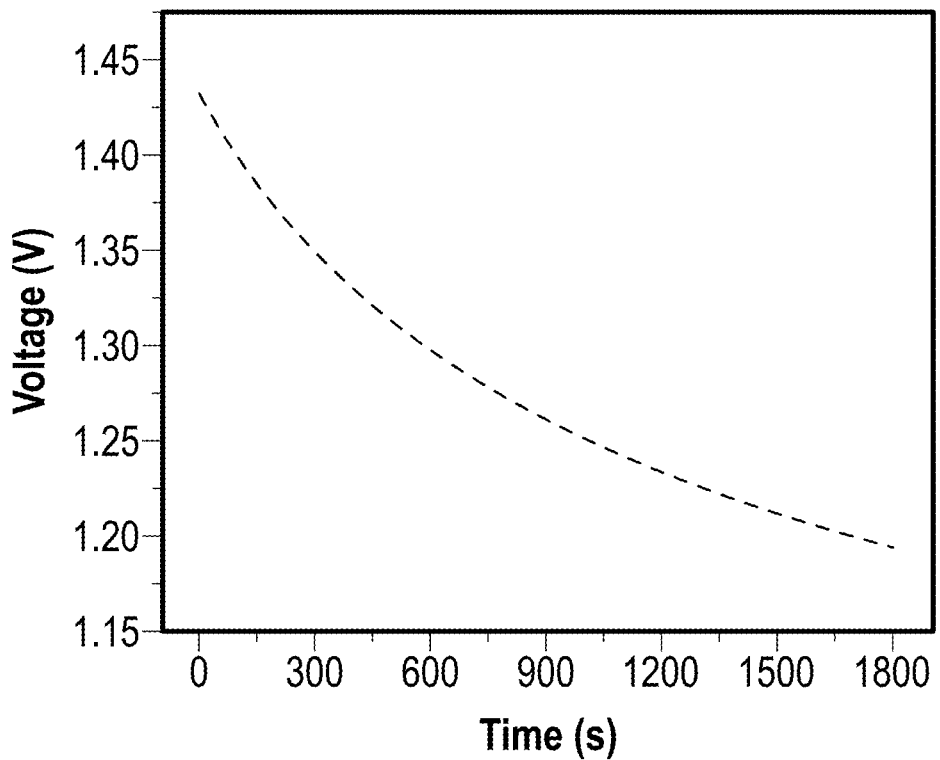

Also, the cable supercapacitor was able to survive more than 500 bending operations at 180° with no change in its capacitance as illustrated in FIG. 25.

Example 5

Of course, cable-based supercapacitors of embodiments of the present invention can be connected in series and in parallel just like all other traditional capacitors. The table of FIG. 26 summarizes results obtained on some cable supercapacitors connected in series in-situ or and ex-situ.

As expected, the tables of FIGS. 20 and 26 confirm that if n similar supercapacitors are connected in series, the net voltage is about 1.6*n, the net equivalent series resistance is about n*ESR, and the net capacitance is about C/n.

Example 6

In this example, a cable supercapacitor according to an embodiment of the present invention was charged up to about 1.6 V; the charging source was disconnected and the open circuit voltage ("OCV") of the supercapacitor monitored over a period of time.

As illustrated in FIG. 28B, the OCV of the cell immediately fell to about 1.43 V from about 1.6 V due to the cell's ESR. The subsequent gradual reduction in the OCV was the result of leakage current. It was observed that it took about 1800 seconds for the voltage to fall from about 1.43 V to about 1.2 V (although not specifically tested, the voltage decay below about 1.2 V is likely to be much slower). This data indicates that the self-discharge of cable supercapacitors of embodiments of the present invention are very low, and that the leakage current is also very low.

Example 7

Referring now to FIGS. 34-45, which illustrate various possible placements and configurations for one or more supercapacitors 10 on numerous devices, the following paragraphs of this Example 7 illustrate numerous optional exemplary uses for one or more supercapacitors 10 of an embodiment of the present invention:

For automotive systems, one or more supercapacitors 10 can be installed in circuit boards for the automotive system or installed in a wiring harness distributed throughout parts, and/or throughout any portion of the entirety of a vehicle. Applications include one or more supercapacitors 10 used for or with the main power source, regenerative braking systems, switching power supplies, connective sensors, active suspensions, control, monitoring, communication devices, and/or infotainment centers.

For automotive accessories, one or more supercapacitors 10 can be installed inside the steering wheel, seats, and/or general upholstery of the vehicle. Applications include but are not limited to control, monitoring, communication devices, sensors, energy harvesting, heating elements, and/or infotainment systems, including but not limited to display screens.

For automotive infrastructure, one or more supercapacitors 10 can be installed inside of and/or around glass panels, inside support beams or structures, including but not limited to the chassis, or through other areas of the vehicle where space is available, including for example the external body of the car. Applications include but are not limited to control, monitoring, communication devices, sensors, energy harvesting, screens, infotainment centers, communication devices, and general components and/or systems, including those previously discussed.

For bullet trains, one or more supercapacitors 10 can be installed in circuit boards for the system or installed in a wiring harness, distributed throughout parts, if not the entire, train. Applications include but are not limited supercapacitors used for or with the main power source, regenerative braking systems, switching power supplies, connective sensors, active suspensions, infotainment centers, magnetic levitation, cold start systems, control, monitoring, communication devices, combinations thereof and the like.

For electric planes, one or more supercapacitors 10 can be installed in circuit boards for the system and/or installed in a wiring harness distributed throughout parts, if not the entire, plane. Applications include supercapacitors used for or with the main power source, regenerative braking systems, switching power supplies, connective sensors, active suspensions, infotainment centers, magnetic levitation, cold start systems, control, monitoring, communication devices, combinations thereof and the like.

For electric skateboards, one or more supercapacitors 10 can be installed in circuit boards for the system and/or installed in a wiring harness distributed throughout parts, if not the entire, board. One or more supercapacitors 10 can be embedded inside the material forming the board too. Applications include supercapacitors used for or with the main power source, regenerative braking systems, switching power supplies, connective sensors, active suspensions, control, monitoring, communication devices, and/or infotainment centers.

For electric scooters, one or more supercapacitors 10 can be installed in circuit boards for the system and/or installed in one or more wiring harnesses distributed throughout parts of, if not the entire, scooter. One or more supercapacitors 10 can be embedded inside the material forming the scooter too. Applications for electric scooters can include one or more supercapacitors 10 used for or with the main power source, regenerative braking systems, switching power supplies, connective sensors, active suspensions, control, monitoring, communication devices, and/or infotainment centers.

For electric bikes, one or more supercapacitors 10 can be installed in circuit boards for the system and/or installed in one or more wiring harnesses distributed throughout parts of, if not the entire, bike. One or more supercapacitors 10 can be embedded inside the material forming the bike too, including but not limited to the bike frame. Applications for electric bikes can include one or more supercapacitors 10 used for or with the main power source, regenerative braking systems, switching power supplies, connective sensors, active suspensions, control, monitoring, communication devices, and/or infotainment centers.

For electric motorcycles, one or more supercapacitors 10 can be installed in circuit boards for the system and/or installed in one or more wiring harnesses distributed throughout parts of, if not the entire, motorcycle. Applications for electric motorcycles can include one or more supercapacitors 10 used for or with the main power source, regenerative braking systems, switching power supplies, connective sensors, active suspensions, control, monitoring, communication devices, and/or infotainment centers.

For jumper cables, one or more supercapacitors 10 can be installed in a pair of jumper cables to provide a jolt of energy to turn an engine over when battery power alone is not sufficient to do so.

Wearables (Including Both Human and Non-Human)

For shoes, boots, sandals, and/or flipflops: one or more supercapacitors 10 can be integrated into parts of wearables to increase physically flexibility of wearable devices. This can be used for energy harvesting, motors, sensors, control, monitoring, communication devices, GPS, trackers, combinations thereof and the like. The one or more supercapacitors 10 can be used around the outside of a shoe, inside its sole, wrapped around the top of the foot, or in any other desired location.

For shirts, jackets, vests, and/or harnesses, one or more supercapacitors 10 can be integrated into parts of wearables to increase physically flexibility of wearable devices. This can be used for energy harvesting, motors, sensors, control, monitoring, communication devices, GPS, trackers, combinations thereof and the like. The one or more supercapacitors 10 can be used around the edges of the shirt, around the collar of the shirt, wrapped back and forth across open areas of the shirt, in the sleeves of the shirt and/or in any other desired location.

For animal vests and/or harnesses, one or more supercapacitors 10 can be integrated into parts of wearables to increase physically flexibility of wearable devices. The one or more supercapacitors 10 can be used for energy harvesting, motors, sensors, control, monitoring, communication devices, GPS, trackers, combinations thereof and the like. The one or more supercapacitors 10 can be used around the edges of a vest or harness, around the collar, wrapped back and forth across open areas of the vest, in line with harness straps, and/or in any other desired location.

For pants and/or waders, one or more supercapacitors 10 can be integrated into parts of wearables to increase physically flexibility of wearable devices. This can be used for energy harvesting, motors, sensors, control, monitoring, communication devices, GPS, trackers, combinations thereof and the like. The one or more supercapacitors 10 can be used around the edges of pants, around the belt line, in seams, wrapped back and forth across open areas, and/or in any other desired location.

For hats, helmets headgear, and/or headsets, one or more supercapacitors 10 can be integrated into parts of wearables to increase physically flexibility of wearable devices. The one or more supercapacitors 10 can be used for energy harvesting, motors, sensors, control, monitoring, communication devices, GPS, trackers, screens/displays, virtual reality, augmented reality, flight helmets, charging systems for medical implants, combinations thereof and the like. The one or more supercapacitors 10 can be used around the edges of a hat, around the brim or visor, in line with harness to headsets in seams, wrapped back and forth across open areas and/or in any other desired location.

For belts, necklaces, and/or bracelets, one or more supercapacitors 10 can be integrated into parts of wearables to increase physically flexibility of wearable devices. This can be used for energy harvesting, motors, sensors, control, monitoring, communication devices, GPS, trackers, screens/displays, medical devices, alert devices, and others. The one or more supercapacitors 10 can be used in line with a necklace, in line with a strap to sunglasses, in line with a belt, in line with a strap to a bracelet or watch, wrapped back and forth in open space and/or in any other desired location.

For animal collars, one or more supercapacitors 10 can be integrated into parts of wearables to increase physically flexibility of wearable devices. The one or more supercapacitors 10 can be used for energy harvesting, motors, sensors, control, monitoring, communication devices, GPS, trackers, screens/displays, and others. The one or more supercapacitors 10 can be used around the edges of a collar for an animal, wrapped back and forth across open areas, and/or in any other desired location.

For bags, backpacks, luggage, and/or straps, one or more supercapacitors 10 can be integrated into parts of wearables to increase physically flexibility of wearable devices. The one or more supercapacitors 10 can be used for energy harvesting, motors, sensors, control, monitoring, communication devices, GPS, trackers, screens/displays, and others. The one or more supercapacitors 10 can be used around the edges of a bag, the straps of a backpack, luggage, wrapped back and forth across open areas and/or in any other desired location.

For virtual reality and/or augmented reality systems and/or parts thereof, one or more supercapacitors 10 can be integrated into parts of wearables to increase physically flexibility of wearable devices. The one or more supercapacitors 10 can be used for energy harvesting, motors, sensors, control, monitoring, communication devices, GPS, trackers, screens, displays, combinations thereof and the like. The one or more supercapacitors 10 can be used around the edges of a harness, in handheld devices, in line with straps to a harness, gloves of the system, and/or in any other desired location.

For exoskeletons, one or more supercapacitors 10 can be integrated into parts of wearables to increase physically flexibility of wearable devices. This can be used for energy harvesting, motors, sensors, control, monitoring, communication devices, GPS, trackers, screens, displays, combinations thereof and the like. The one or more supercapacitors 10 can be used around the edges of a harness, in power cords connecting parts of the product, in infrastructure, routed back and forth across panels, inside support beams, and/or in any other desired location.

For glasses, one or more supercapacitors 10 can be integrated into parts of wearables to increase physically flexibility of wearable devices. This can be used for energy harvesting, motors, sensors, control, monitoring, communication devices, GPS, trackers, screens/displays, and others. The one or more supercapacitors 10 can be used along the top of the glasses frame, around lenses, inside straps connected to the temple tips, and/or in any other desired location.

For multiple integrated laser engagement systems, one or more supercapacitors 10 can be integrated into parts of wearables to increase physically flexibility of wearable devices. The one or more supercapacitors 10 can be used for energy harvesting, motors, sensors, control, monitoring, communication devices, GPS, trackers, screens, displays, combinations thereof and the like. The one or more supercapacitors 10 can be used around the edges of a harness, in handheld devices, in line with straps to a harness, inside power distribution from source to loads and/or in any other desired location.

Other Applications:

For energy harvesting, one or more supercapacitors 10 can be integrated with energy harvesting modules including but not limited to solar cells, vibration, kinetic, heat, and/or radio frequency energy harvesting modules. The one or more supercapacitors 10 can be wrapped around the body of the module, used on circuit boards connected to the module, integrated to the wiring, terminals, leads of modules, and/or in any other desired location.

For energy storage, one or more supercapacitors 10 can be paired with other energy storage devices including but not limited to batteries of any desired chemistry, fly wheels, and/or fuel cells. The one or more supercapacitors 10 can be wrapped around the body of the module, used on circuit boards connected to the module, integrated to the wiring, terminals, leads of modules, and/or in any other desired location.

For information technology equipment, one or more supercapacitors 10 can be used inside or outside of telecom equipment including but not limited to Wi-Fi routers, switches, and/or computer servers in datacenters. The one or more supercapacitors 10 can be integrated into direct current power lines that bring power to the device or power to different modules inside of the device. The one or more supercapacitors 10 can also be wrapped around the body of the module, used on circuit boards connected to the module, integrated to the wiring, terminals, leads of modules, and/or in any other desired location.

For solar power systems, one or more supercapacitors 10 can be used with solar power systems in solar farms, homes, vehicles, and/or mobile solar cells. The one or more supercapacitors 10 can be wrapped around the body of the module, used on circuit boards connected to the module, integrated to the wiring, terminal, leads of modules, combinations thereof and the like. The one or more supercapacitors 10 can be connected between batteries, solar cells, inverters, power point trackers, and/or any other parts of the infrastructure.

For wind turbines one or more supercapacitors 10 can be used with wind turbine systems including but not limited for blade pitch tuning and as a filter for generated power. The one or more supercapacitors 10 can be wrapped around the body of the module, used on circuit boards connected to the module, integrated to the wiring, terminals, leads of modules, combinations thereof, and the like. The one or more supercapacitors 10 can be connected and disposed throughout the turbine's tower, thus creating a massive energy storage source for the grid.

For tents and/or recreational vehicles, one or more supercapacitors 10 can be integrated into the fabrics and/or structural elements of tents and recreation vehicles. For systems with electrical infrastructure, the one or more supercapacitors 10 can be part of the wiring infrastructure running to pumps, condensers, motors, and/or equipment. The one or more supercapacitors 10 can be wrapped around the body of the module, used on circuit boards connected to the module, integrated to the wiring, terminals, leads of modules, combinations thereof and the like.

For direct current power cords, for peak power, and/or for backup power, one or more supercapacitors 10 can be integrated inside power cords. In direct current power cords, the one or more supercapacitors 10 can be connected in parallel with the positive and negative voltage lines creating a backup power source, complement, and/or filter between the source and the load. For alternating current power cords, the one or more supercapacitors 10 can be installed in the wiring infrastructure but electrically connected elsewhere.

For uninterruptable power systems, one or more supercapacitors 10 can be integrated inside products or as part of wiring infrastructure for telecom uninterruptible power supply products, typically operated by batteries or fly wheels. The one or more supercapacitors 10 can also be connected inside of servers and/or computers, thus creating a micro-ups type system for a specific part or module within the server, as well as the entire server. The one or more supercapacitors 10 can be wrapped around the body of the module, used on circuit boards connected to the module, integrated into the wiring, terminals, and/or leads of modules, and/or in any other desired location.

For IoT, one or more supercapacitors 10 can be integrated into the product enclosure or housing of an IoT device, which can optionally be used for asset tracking, edge computing, environmental sensing, combinations thereof and the like. The one or more supercapacitors 10 can be connected to the power source, the wiring between the power source and the device, or on the circuit board. The one or more supercapacitors 10 can be wrapped around the body of the module, used on circuit boards connected to the module, integrated to the wiring, terminals, leads of modules, and/or at any other desired location.

For enclosures for electronics, one or more supercapacitors 10 can be integrated into the body of product enclosures or housing for a variety of applications and electrically connected to the system through extension wires.

For cell tower telecom equipment, one or more supercapacitors 10 can be integrating into wiring infrastructure of telecom equipment for communication systems, power systems, and/or for information technology processing equipment. The one or more supercapacitors 10 can be wrapped around the body of the module, used on circuit boards connected to the module, integrated to the wiring, terminals, leads of modules, and/or at any other desired location.

For drones, one or more supercapacitors 10 can be integrated into the body of drones. The one or more supercapacitors 10 can be integrated into wiring infrastructure, the arms of drones, or other parts. The one or more supercapacitors 10 can be wrapped around the body of the module, used on circuit boards connected to the module, integrated to the wiring, terminals, leads of modules, and/or at any other desired location.

For remote-controlled cars, boats, planes, and/or toys, one or more supercapacitors 10 can be integrated into the body of electric mobile toys. The one or more supercapacitors 10 can be integrated into wiring infrastructure, the body of the vehicle, or other parts. The one or more supercapacitors 10 can be wrapped around the body of the module, used on circuit boards connected to the module, integrated into the wiring, terminals, leads of modules, and/or at any other desired location.

For robots, one or more supercapacitors 10 can be integrated into the body thereof. The one or more supercapacitors 10 can be integrated into wiring infrastructure, the arms of a robot, and/or other structural parts. The one or more supercapacitors 10 can be wrapped around the body of the module, used on circuit boards connected to the module, integrated to the wiring, terminals, leads of modules, and/or at any other desired location.

For marine systems, one or more supercapacitors 10 can be installed in circuit boards for the system and/or installed in one or more wiring harnesses distributed throughout parts of, if not the entire, boat. Applications include one or more supercapacitors 10 used for or with the main power source, switching power supplies, connective sensors, control, monitoring, communication devices, and infotainment centers. The one or more supercapacitors 10 can be wrapped around the body of the module, used on circuit boards connected to the module, integrated to the wiring, terminals, leads of modules, combinations thereof and the like.

For medical equipment, one or more supercapacitors 10 can be installed in circuit boards for the system or installed in one or more wiring harnesses distributed throughout parts of, if not the entire, medical equipment. Applications include one or more supercapacitors 10 used for or with the main power source, backup power, peak power, connective sensors, control, monitoring, communication devices, and infotainment centers or human machine interfaces for medical equipment. Medical resonance imaging machines and mobile vitals machines are but a couple of the many examples medical equipment that embodiments of the present invention can be used with. The one or more supercapacitors 10 can be wrapped around the body of the module, used on circuit boards connected to the module, integrated to the wiring, terminals, leads of modules, and/or at any other desired location.

For industrial systems one or more supercapacitors 10 can be wrapped around the body of the module, used on circuit boards connected to the module, integrated into the wiring, terminals, leads of modules, and/or at any other desired location. Applications include but are not limited to active heave compensation systems and/or cold start systems for large machinery.

For streetlamps, one or more supercapacitors 10 can be integrated with streetlamps by wrapping or otherwise disposing them into the lamp post or the lamp housing, including but not limited to inside the base of the streetlamp. The one or more supercapacitors 10 can be wrapped around the body of the module, used on circuit boards connected to the module, integrated to the wiring, terminals, leads of modules, and/or at any other desired location. Applications can include but are not limited to self-powered street lighting, IoT modules on streetlamps, and renewable energy systems on streetlamps.

For buildings, one or more supercapacitors 10 can be integrated into the wiring and/or the walls of buildings. The one or more supercapacitors 10 can be wrapped around the body of the module, used on circuit boards connected to the module, integrated to the wiring, terminals, leads of modules, and/or at any other desired location. Optionally one or more supercapacitors 10 can be wrapped around support beams, which can include for example beams made of wood, metal, concreate or any other material or combination thereof. For buildings that use direct current power, the one or more supercapacitors 10 can be electrically connected at or near the one or more supercapacitors 10 or they can be electrically connected distant from their physical location. For buildings which use alternating current, the one or more supercapacitors 10 can be disposed in one location and electrically connected at a distant location.

For advanced remote and/or smart meters, one or more supercapacitors 10 can be wrapped around the body of the module, used on circuit boards connected to the module, integrated to the wiring, terminals, and/or leads of modules, and/or at any other desired location. Optionally one or more supercapacitors 10 can be used for tracking power in a building and communicating information wirelessly (for example IoT). Optionally one or more supercapacitors 10 can be wrapped around the inside and/or outside of an enclosure for any of these items.

For rail gun and/or electromagnetic gun, one or more supercapacitors 10 can be wrapped around the body of the module used on circuit boards connected to the module, integrated into the wiring, terminals, and/or leads of modules thereof and/or at any other desired location on or about the rail gun and/or electromagnetic device.

For any one or more of the foregoing which has a housing or enclosure, the one or more supercapacitors 10 can be disposed inside and/or outside of the housing or enclosure. Optionally, the one or more supercapacitors 10 can be disposed on an outside and/or on an inside surface of any of the foregoing. One or more supercapacitors 10 can optionally be incorporated into or any wiring of the foregoing devices as may be desired or useful. The preceding examples can be repeated with similar success by substituting the generically or specifically described components and/or operating conditions of embodiments of the present invention for those used in the preceding examples.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A cable supercapacitor comprising:
    a first terminal;
    a first electrode disposed around said first terminal;
    a second electrode surrounding said first electrode and coaxial therewith;
    a separator disposed between said first electrode and said second electrode;
    a second terminal in electrical contact with said second electrode;
        said second terminal extending in the opposite direction from said first terminal such that said cable supercapacitor comprises an elongated cable-like structure with said first terminal at a first end thereof and with said second terminal at an opposing end thereof; and
    a first filament, said filament spirally wrapped around at least one of said first terminal, said first electrode, said separator, and/or said second electrode,
        wherein said first filament is selected from the group consisting of: conductive filaments and nonconductive filaments.

2. The cable supercapacitor of claim 1 wherein said separator comprises a flexible solid-state electrolyte.

3. The cable supercapacitor of claim 1 wherein said separator comprises a non-conductive porous material with a liquid or gel electrolyte disposed therein.

4. The cable supercapacitor of claim 3 wherein said non-conductive porous material comprises a fabric.

5. The cable supercapacitor of claim 3 wherein said non-conductive porous material comprises an absorbent material.

6. The cable supercapacitor of claim 1 further comprising a second filament.

7. The cable supercapacitor of claim 6 wherein said first filament is spirally wrapped around said first electrode and wherein said second filament is spirally wrapped around said second electrode such that said second filament lashes said second terminal to said second electrode.

8. The cable supercapacitor of claim 7 wherein said first filament and said second filament are conductive and are formed from the same material.

9. The cable supercapacitor of claim 1 comprising a non-conductive filament spirally wrapped around said separator.

10. The cable supercapacitor of claim 1 wherein at least one of said first electrode or said second electrode comprises a dry foam impregnated with a dry electrode material.

11. The cable supercapacitor of claim 10 wherein said dry foam material comprises a metal foam impregnated with a dry electrode material.

12. The cable supercapacitor of claim 10 wherein one of said first electrode or said second electrode comprises a dry foam impregnated with a metal oxide material and the other of said first electrode or said second electrode comprises a dry foam impregnated with activated carbon.

13. The cable supercapacitor of claim 1 wherein said second terminal is wrapped around said second electrode.

14. A method for manufacturing a cable supercapacitor, the method comprising:
    disposing a first electrode around a first terminal;
    disposing a separator around the outside circumference of the first electrode and coaxial therewith;
    disposing a second electrode around the outside circumference of the separator and coaxial therewith;
    spirally wrapping at least one filament around at least one of said first terminal, said first electrode, said separator, and/or said second electrode,
        wherein said at least one filament is selected from the group consisting of: conductive filaments and non-conductive filaments; and
    placing a second terminal in electrical contact with the second electrode.

15. The method of claim 14 wherein disposing a separator around the first electrode comprises disposing a dry electrolyte around the first electrode.

16. The method of claim 14 further comprising saturating the separator with a liquid or gel electrolyte.

17. The method of claim 14 wherein placing a second terminal in electrical contact with the second electrode comprises lashing the second terminal to the second electrode with a second filament.

18. The method of claim 14 wherein disposing a first electrode around a first terminal comprises wrapping a dry foam, impregnated with a dry electrode material, around the first terminal.

19. The method of claim 14 wherein disposing a second electrode around the separator comprises wrapping a dry foam, impregnated with a dry electrode material, around the separator.

20. The method of claim 14 comprising wrapping a non-conductive filament around the separator.

21. The method of claim 14 wherein placing the second terminal in electrical contact with the second electrode comprises wrapping the second terminal around the second electrode.

* * * * *